US011379897B1

(12) United States Patent
Thomas

(10) Patent No.: US 11,379,897 B1
(45) Date of Patent: *Jul. 5, 2022

(54) COMPUTERIZED PROCESS TO, FOR EXAMPLE, AUTOMATE THE HOME SALE, MORTGAGE LOAN FINANCING AND SETTLEMENT PROCESS, AND THE HOME MORTGAGE LOAN REFINANCING AND SETTLEMENT PROCESSES

(71) Applicant: Neil Thomas, Silver Spring, MD (US)

(72) Inventor: Neil Thomas, Silver Spring, MD (US)

( * ) Notice: Subject to any disclaimer, the term of this patent is extended or adjusted under 35 U.S.C. 154(b) by 292 days.

This patent is subject to a terminal disclaimer.

(21) Appl. No.: 16/371,678

(22) Filed: Apr. 1, 2019

Related U.S. Application Data

(63) Continuation of application No. 16/020,427, filed on Jun. 27, 2018, now Pat. No. 10,269,054, which is a continuation of application No. 14/948,215, filed on Nov. 20, 2015, now Pat. No. 10,037,558, which is a continuation of application No. 13/842,205, filed on Mar. 15, 2013, now Pat. No. 9,196,007, which is a continuation of application No. 12/457,599, filed on Jun. 16, 2009, now Pat. No. 8,442,906, which is a continuation of application No. 10/979,822, filed on Nov. 3, 2004, now Pat. No. 7,548,884, which is a (Continued)

(51) Int. Cl.
*G06Q 40/00* (2012.01)
*G06Q 30/06* (2012.01)
*G06Q 40/02* (2012.01)
*G06Q 50/16* (2012.01)

(52) U.S. Cl.
CPC ......... *G06Q 30/0623* (2013.01); *G06Q 40/02* (2013.01); *G06Q 40/025* (2013.01); *G06Q 50/16* (2013.01)

(58) Field of Classification Search
None
See application file for complete search history.

(56) References Cited

U.S. PATENT DOCUMENTS 5,584,025 A   12/1996 Keithley et al.
5,611,052 A    3/1997 Dykstra et al.
(Continued)

FOREIGN PATENT DOCUMENTS

AU   WO2004107223   12/2004

OTHER PUBLICATIONS

Iproperty.com, Inc., Chorus Technology Walkthrough, www iProperty com; (c) 2001, Lexena, KS.
(Continued)

*Primary Examiner* — Olabode Akintola

(57) ABSTRACT

A computer system and method for automating and facilitating the home sale, mortgage origination, and settlement process, and the home mortgage refinancing origination and settlement process, over a geographically distributed computing network are disclosed. The system and method also allows a home buyer to search for homes offered for sale by a plurality of sellers and, using the home data conforming to the buyer purchase criteria and buyer data, search for loan pricing information for loans from a plurality of lenders, loan pricing information for a plurality of loan types, or both. The system and method then uses this information to process the sale transaction.

39 Claims, 50 Drawing Sheets

Related U.S. Application Data continuation of application No. 10/969,242, filed on Oct. 21, 2004, now abandoned.

(60) Provisional application No. 60/512,776, filed on Oct. 21, 2003.

(56) References Cited

U.S. PATENT DOCUMENTS

| | | | |
|---|---|---|---|
| 5,689,705 | A | 11/1997 | Fino et al. |
| 5,870,721 | A | 2/1999 | Norris |
| 5,930,776 | A | 7/1999 | Dykstra et al. |
| 5,940,811 | A | 8/1999 | Norris |
| 5,940,812 | A | 8/1999 | Tengel et al. |
| 6,321,202 | B1 | 11/2001 | Raveis, Jr. |
| 6,430,542 | B1 | 8/2002 | Moran |
| 6,594,633 | B1 | 7/2003 | Broerman |
| 6,606,744 | B1 | 8/2003 | Mikurak |
| 6,684,196 | B1 * | 1/2004 | Mini ............ G06Q 30/0641 705/37 |
| 6,751,596 | B1 * | 6/2004 | Hastings ........ G06Q 30/06 705/7.29 |
| 6,871,140 | B1 | 3/2005 | Florance et al. |
| 6,938,006 | B2 | 8/2005 | Ikeda |
| 6,985,886 | B1 | 1/2006 | Broadbent et al. |
| 7,016,866 | B1 * | 3/2006 | Chin ............. G06Q 30/0631 705/26.7 |
| 7,076,452 | B2 | 7/2006 | Florance et al. |
| 7,085,814 | B1 | 8/2006 | Gandhi et al. |
| 7,092,892 | B1 | 8/2006 | Sobalvarro et al. |
| 7,107,241 | B1 | 9/2006 | Pinto |
| 7,127,406 | B2 | 10/2006 | Triola |
| 7,139,728 | B2 | 11/2006 | Rigole |
| 7,146,337 | B1 | 12/2006 | Ward et al. |
| 7,287,008 | B1 | 10/2007 | Mahoney et al. |
| 7,315,841 | B1 | 1/2008 | McDonald et al. |
| 7,333,943 | B1 | 2/2008 | Charuk et al. |
| 7,340,435 | B2 | 3/2008 | McDonald et al. |
| 7,366,694 | B2 * | 4/2008 | Lazerson ........ G06Q 40/025 705/38 |
| 7,395,239 | B1 | 7/2008 | Riseman |
| 7,440,921 | B1 | 10/2008 | Rieger et al. |
| 7,454,355 | B2 | 11/2008 | Milman et al. |
| 7,478,064 | B1 | 1/2009 | Nacht |
| 7,499,885 | B2 | 3/2009 | Danpour |
| 7,526,444 | B2 | 4/2009 | Miles et al. |
| 7,548,884 | B1 | 6/2009 | Thomas |
| 7,574,400 | B1 | 8/2009 | Stokum et al. |
| 7,587,344 | B2 | 9/2009 | Harris |
| 7,596,508 | B1 | 9/2009 | McGuffie et al. |
| 7,596,509 | B1 | 9/2009 | Bryson |
| 7,596,511 | B2 | 9/2009 | Hall et al. |
| 7,945,495 | B2 | 5/2011 | Hill et al. |
| 8,897,820 | B2 | 11/2014 | Marovets |
| 10,037,558 | B1 | 7/2018 | Thomas |
| 2001/0005829 | A1 | 6/2001 | Raveis, Jr. |
| 2001/0034607 | A1 | 10/2001 | Perschbacher, III et al. |
| 2001/0047282 | A1 | 11/2001 | Ravels, Jr. |
| 2001/0047326 | A1 | 11/2001 | Broadbent et al. |
| 2002/0040304 | A1 | 4/2002 | Shenoy et al. |
| 2002/0052814 | A1 | 5/2002 | Ketterer |
| 2002/0065739 | A1 | 5/2002 | Florance et al. |
| 2003/0018558 | A1 | 1/2003 | Heffner et al. |
| 2003/0036980 | A1 | 2/2003 | Wren |
| 2003/0036995 | A1 | 2/2003 | Lazerson |
| 2003/0149656 | A1 | 8/2003 | Magruder et al. |
| 2003/0163408 | A1 | 8/2003 | Polston et al. |
| 2003/0187756 | A1 | 10/2003 | Klivington et al. |
| 2003/0220805 | A1 | 11/2003 | Hoffman et al. |
| 2003/0220807 | A1 | 11/2003 | Hoffman et al. |
| 2003/0233310 | A1 | 12/2003 | Stavrovski |
| 2004/0010451 | A1 | 1/2004 | Romano et al. |
| 2004/0030631 | A1 | 2/2004 | Brown et al. |
| 2004/0039581 | A1 | 2/2004 | Wheeler |
| 2004/0044696 | A1 | 3/2004 | Frost |
| 2004/0049445 | A1 | 3/2004 | Kishore |
| 2004/0049450 | A1 | 3/2004 | Lussier |
| 2004/0054606 | A1 | 3/2004 | Broerman |
| 2004/0098284 | A1 | 3/2004 | Petito et al. |
| 2004/0133493 | A1 | 7/2004 | Ford et al. |
| 2004/0143450 | A1 | 7/2004 | Vidali |
| 2004/0249705 | A1 | 12/2004 | Spencer et al. |
| 2005/0010423 | A1 | 1/2005 | Bagbey et al. |
| 2005/0096926 | A1 | 5/2005 | Eaton et al. |
| 2005/0273346 | A1 | 12/2005 | Frost |
| 2005/0288955 | A1 | 12/2005 | Lewiss-Hachmeister |
| 2008/0275794 | A1 | 11/2008 | Ioimo et al. |
| 2010/0114743 | A1 | 5/2010 | Misraje et al. |

OTHER PUBLICATIONS

Amy E Lemen, "Are you Ready to Jump into Transaction Management;" Texas Realtor Online; Feb. 2001, Austin, TX; http://www.texasrealtoronline.com/issues/0201/platforms/0201platforms.htm- 1.

ClickConnect.RTM. Real Estate System Slide Presentation; Wintrans Solutions; http://www.wintranssolutions.com; Nov. 2004; San Jose, CA.

Subrao Shenoy, PlanetRE Online Demo; Dec. 1, 2004; San Jose, CA; www.PlanetRE.com.

eFrogg Online Demo; www.efrogg.com; Nov. 12, 2004; Winchester, VA.

Directory of Mortgage Servicing Technology,2005; Zackin Publications Inc; Waterbury, CT; http://www.sm-online.com/sm/ar-smtech2005.pdf.

Fares Transaction Management System, Prepared by First American Residential Group, Nov. 10, 2004, Santa Ana, CA.pdf.

Blanche Evans, "ezClose com Debuts as the Internet's First Online Title Escrow Company," Feb. 15, 2000; Realty Times; Dallas, TX; http://realtytimes.com/rtpages120000215.sub.--ezclose.sub.--htm.

Auto-RE on Line Demo, Auto-RE LLC, Oct. 2005, Denver, CO; www.auto-re.com.

Online Real Estate Transaction Management is it ready for prime time; Clareity Consulting & Communications, Inc.; Scottsdale, AZ, Feb. 2003; http://www.callclareity.com/2003-tmp.cfm.

Transaction Management a State of the Industry Report, Jul. 21, 2005; Clareity Consulting & Communications, Inc.; Scottsdale, AZ; http://www.callclareity.com/2005-tms.pdf.

First Online Real Estate Transaction Closes Using CloseYourDeal com, May 19, 2000; Business Wire, New York, NY; http://www.thefreelibrary.com/First+Online+Real+Estate+Transaction+Closes+Using+CloseYourDeal.com.-a062192410.

"DynaConnections Introduces the New Generation of MLS Solution" Nov. 18, 2002; RisMedia, Inc., Norwalk, CT; http://rismedia.com/wp/2002-11-18/dynaconnections-introduces-the-new-generation-of-mls-solutions/.

"Transaction Point.RTM. Overview," 2005; Fidelity National Information Solutions, Inc., Santa Barbara, CA; http://www.transactionpoint.com/files/TransactionPoint%20Overview092606.pdf.

"Blueflame Creates Comprehensive Internet-Based Real Estate Solution for Home-Link Services" Aug. 28, 2000; Business Wire, Hackensack, NJ; http://findarticles.com/p/articles/mi._m0EIN/is._2000_August_23/ai_64493220.

Interealty MLX Exchange Professional Demo, Nov. 2004; Interealty, Vienna, VA; http://www.interealty.com.

Blanche Evans, "Internet MLS and Transaction Management All in One" Aug. 17, 2000; Realty Times, Dallas, TX; http://realtytimes.com/rtpages/20000817_allinone.htm.

Microsoft Joins Forces with Freddie Mac, Chase Manhattan, GMAC-RFC, Norwest Mortgage, and Bank of America to Form New Company, PR Newswire, Mar. 16, 2000.

Jessica Swesey, Online real estate transaction makes comeback Part 1 of 3 Industry takes note of changing marketplace, May 27, 2003; Inman News, Alameda, CA.

Jessica Swesey, Online transactions sharpen competitive edge Part 2 of 3 Brokers get benefits of real estate transaction automation, May 28, 2003; Inman News, Alameda, CA.

(56) References Cited

OTHER PUBLICATIONS

Jessica Swesey, Next generation transaction platforms find niche Part 3 of 3 Vendors add features, target market segments to gain traction, May 29, 2003, Inman News, Alameda, CA.
Microsoft Introduces Realty Desktop the First Completely Web-Based Customer Management Tool for Real Estate Brokers, Feb. 23, 2000, San Francisco, CA; http://www.microsoft.com/Presspass/press/2000/feb00/realtydesktoppr.mspx.
NTREIS Introduces Industry-Leading Real Estate Information Network, May 13, 2003, PR Newswire, New York, NY; http://www.prnewswire.com/cgi-bin/stories.pl?ACCT=104&STORY=/www/story/05-13-2003/0001945713.
Robert A. Heverly, Real Estate Transactions on the Web, Jan.-Feb. 2002; ABA Probate & Property Magazine, Chicago, IL; http://www.settlementroom.com/pages/pr/ProbateArticle.html.
SettlementRoom Online Demo; Jul. 7, 2005; SettlementRoom Systems, Inc, Vienna, VA; www settlementroom com.
SureClose TMS (Broker,Lender,Title) Slide Presentation; Oct. 27, 2004, Stewart Realty Services, Houston, TX.
"The Transaction Coordinator an Underutilized Asset to Residential Real Estate," Jun. 2003; by Clareity Consulting & Communications, Inc., Scottsdale, AZ; http://www.callclarity.com/Clareity-TC-WhitePaper.pdf.
Stephen Bedikian, Transaction Management, Realizing Operating Efficiencies and Achieving Marketplace Advantage, Jan. 2003; RealIQ Cobsulting, Los Angeles, CA.
"First American Introduces SourceMasterTm Powered by Dorado—A Next Generation Technology for Vendor and Transaction Management With Advanced Bundling Capabilities" Mar. 10, 2003; First American Corporation, Los Angeles, CA; http://www.firstam.com/pressrelease.cfm?pr_id=949.
FARES Transaction Management System, Prepared by First American Residential Group, Nov. 10, 2004, Santa Ana, CA.
"Realty Plus Online Launches CloseYourDeal.com Nationally;" Sep. 18, 2000; Business Wire, New York, NY; http://findarticles.com/p/articles/mi_m0EIN/is_2000_Sept_18/ai_65268702.
http://www.rateplug.com, HandHeld Power LLC, Naperville, IL (As shown in Memorandum Regarding Major Internet Home Search and Real Estate Company Websites Oct. 12, 2006 to Oct. 29, 2006.pdf; Exhibit A Major Internet Home Search Portals Oct. 12, 2006 to Oct. 30, 2006 (Revised Aug. 2007).pdf; Exhibit B Major Real Estate Company Portals Oct. 24, 2006 to Oct. 30, 2006 (Revised Aug. 2007).pdf).
http://www.closeyourdeal.com/ (Web site no longer available).
http://www.eREALTOR.com (Web site no. longer available) (formerly RealtyLinks.com) operated by Homestore.com, Inc.
http://www.dealtrack.com (Web site no longer available) (RELAY Transaction Management; REBT, LLC, 525 South Virgil Ave, Los Angeles, CA 90020 which operates www.rebt.com).
http://www.realtydesktop.com (Web site no longer available) (formerly operated by Microsoft Corp).
http://www.synteleos.com; (Web site no longer available) (Synteleos, Inc, Pleasanton, California sold technology to GURU NETworks, Inc., 11145 Glade Dr. Suite 100, Reston, VA 20191 which operates www.gurunet.net).
http://base.google.com/; Google (As shown in Memorandum Regarding Major Internet Home Search and Real Estate Company Websites Oct. 12, 2006 to Oct. 29, 2006.pdf; Exhibit A Major Internet Home Search Portals Oct. 12, 2006 to Oct. 30, 2006 (revised Aug. 2007).pdf; by Neil Thomas, Silver Spring, MD).
http://www.realestate.msn.com/buying/; MSN; (As shown in Memorandum Regarding Major Internet Home Search and Real Estate Company Websites Oct. 12, 2006 to Oct. 29, 2006.pdf; Exhibit A Major Internet Home Search Portals Oct. 12, 2006 to Oct. 30, 2006 (Revised Aug. 2007).pdf; Exhibit B Major Real Estate Company Portals Oct. 24, 2006 to Oct. 30, 2006 (Revised Aug. 2007).pdf; by Neil Thomas, Silver Spring, MD).
http://www.MSHomeAdvisors.com (Web site no longer available) (formerly operated by Microsoft Corp; Redmond, WA).
http://www.Realtor.com; (As shown in Memorandum Regarding Major Internet Home Search and Real Estate Company Websites Oct. 12, 2006 to Oct. 29, 2006.pdf; Exhibit A Major Internet Home Search Portals Oct. 12, 2006 to Oct. 30, 2006 (Revised Aug. 2007).pdf; Exhibit B Major Real Estate Company Portals Oct. 24, 2006 to Oct. 30, 2006 (Revised Aug. 2007).pdf; by Neil Thomas, Silver Spring, MD).
http://www.realestate.yahoo.com; (As shown in Memorandum Regarding Major Internet Home Search and Real Estate Company Websites Oct. 12, 2006 to Oct. 29, 2006.pdf; Exhibit A Major Internet Home Search Portals Oct. 12, 2006 to Oct. 30, 2006 (Revised Aug. 2007).pdf; Exhibit B Major Real Estate Company Portals Oct. 24, 2006 to Oct. 30, 2006 (Revised Aug. 2007).pdf; by Neil Thomas, Silver Spring, MD).
http://www.realestate.aol.com; (As shown in Memorandum Regarding Major Internet Home Search and Real Estate Company Websites Oct. 12, 2006 to Oct. 29, 2006.pdf; Exhibit A Major Internet Home Search Portals Oct. 12, 2006 to Oct. 30, 2006 (Revised Aug. 2007).pdf; Exhibit B Major Real Estate Company Portals Oct. 24, 2006 to Oct. 30, 2006 (Revised Aug. 2007).pdf; by Neil Thomas, Silver Spring, MD).
http://www.coldwellbanker.com; Coldwell Banker Real Estate; (As shown in Memorandum Regarding Major Internet Home Search and Real Estate Company Websites Oct. 12, 2006 to Oct. 29, 2006.pdf; Exhibit A Major Internet Home Search Portals Oct. 12, 2006 to Oct. 30, 2006 (Revised Aug. 2007).pdf; Exhibit B Major Real Estate Company Portals Oct. 24, 2006 to Oct. 30, 2006 (Revised Aug. 2007).pdf; by Neil Thomas, Silver Spring, MD).
http://www.weichert.com; Weichert Real Estate; (As shown in Memorandum Regarding Major Internet Home Search and Real Estate Company Websites Oct. 12, 2006 to Oct. 29, 2006.pdf; Exhibit A Major Internet Home Search Portals Oct. 12, 2006 to Oct. 30, 2006 (Revised Aug. 2007).pdf; Exhibit B Major Real Estate Company Portals Oct. 24, 2006 to Oct. 30, 2006 (Revised Aug. 2007).pdf; by Neil Thomas, Silver Spring, MD).
http://www.longandfoster.com; Long and Foster Real Estate; (As shown in Memorandum Regarding Major Internet Home Search and Real Estate Company Websites Oct. 12, 2006 to Oct. 29, 2006.pdf; Exhibit A Major Internet Home Search Portals Oct. 12, 2006 to Oct. 30, 2006 (Revised Aug. 2007).pdf; Exhibit B Major Real Estate Company Portals Oct. 24, 2006 to Oct. 30, 2006 (Revised Aug. 2007).pdf; by Neil Thomas, Silver Spring, MD).
http://www.remax.com; RE/MAX; (As shown in Memorandum Regarding Major Internet Home Search and Real Estate Company Websites Oct. 12, 2006 to Oct. 29, 2006.pdf; Exhibit A Major Internet Home Search Portals Oct. 12, 2006 to Oct. 30, 2006 (Revised Aug. 2007).pdf; Exhibit B Major Real Estate Company Portals Oct. 24, 2006 to Oct. 30, 2006 (Revised Aug. 2007).pdf; by Neil Thomas, Silver Spring, MD).
http://www.cbmove.com; Coldwell Banker Real Estate; (As shown in Memorandum Regarding Major Internet Home Search and Real Estate Company Websites Oct. 12, 2006 to Oct. 29, 2006.pdf; Exhibit A Major Internet Home Search Portals Oct. 12, 2006 to Oct. 30, 2006 (Revised Aug. 2007).pdf; Exhibit B Major Real Estate Company Portals Oct. 24, 2006 to Oct. 30, 2006 (Revised Aug. 2007).pdf; by Neil Thomas, Silver Spring, MD).
http://www.prufoxroach.com; Prudential Fox Roach; (As shown in Memorandum Regarding Major Internet Home Search and Real Estate Company Websites Oct. 12, 2006 to Oct. 29, 2006.pdf; Exhibit A Major Internet Home Search Portals Oct. 12, 2006 to Oct. 30, 2006 (Revised Aug. 2007).pdf; Exhibit B Major Real Estate Company Portals Oct. 24, 2006 to Oct. 30, 2006 (Revised Aug. 2007).pdf; by Neil Thomas, Silver Spring, MD).
Janis Mara, Case studies of paperless success, Inman News Oct. 19, 2005; http://www.alta.org/press/release.cfm? newsID=3210.
Glenn Roberts Jr., The new page-turner: Paperless real estate technology, Inman News, Oct. 20, 2005, http://www.alta.org/indynews/news.cfm?newsID=3209.
First American Expands Technology Offerings to Help Lenders and Settlement Agents Streamline Closing Process, The First American Corporation, Oct. 19, 2005; http://www.alta.org/indynews/news.cfm?newsID=3194.

(56) References Cited

OTHER PUBLICATIONS

The First American Corporation Acquires Interealty, by the First American Corporation, Oct. 3, 2005; http://www.alta.org/indynews/news.cfm?newsID=3149.
Stewart's eClosingRoom(TM) Technology Transforms. Home Buying Experience for Fresno, Calif Buyers, Jul. 22, 2005, Stewart Title Co; http://www.alta.org/indynews/news.cfm?newsID=2961.
Another Texas county adopts paperless real estate closing system, Inman News Jun. 2, 2005; http://www.alta.org/indynews/news.cfm?newsID=2835.
Real estate loan closing processes get fuller automation, Inman News, Jun. 13, 2005; http://www.alta.org/indynews/news.cfm?newsID=2864.
Fidelity National Financial Division Enhances Real Estate Transaction Management Solution, Jan. 6, 2005, Fidelity National Financial, Inc.; http://www.alta.org/indynews/news.cfm?newsID=2409.
Hall Settlement Systems Offers Insight on the Future of Total Transaction Management Systems at alta.rtm. Annual Convention Oct. 11, 2006, Hall Settlement Systems; http://www.alta.org/technology/news.cfm?newsID=4245.
RamQuest Makes the Right Connections With Closing Market, Oct. 3, 2006, RamQuest Software, Inc; http://www.alta.org/technology/news.cfm?newsID=4226.
RamQuest Releases Newest Version of Flagship Solution, Aug. 17, 2006, RamQuest Software, Inc; http:www.alta.org/technology/news.cfm?newsID=4067.
Janis Mara, Google moves further into real estate, Apr. 7, 2006, Inman News; http://www.alta.org/technology/news.cfm?newsID=3711.
First American Launches Real Estate Information Technology Company, Marketlinx, Inc, Jan. 30, 2007, First American Corporation; http://www.alta.org/technology/news.cfm?newsID=4597.
Stewart Transaction Solutions Strengthens End-to-End Electronic Real Estate Transaction with Majority Investment, Feb. 5, 2007, Stewart Information Services Corp; http://www.alta.org/technology/news.cfm?newsID=4611.
Marketlinx Recognized as a Top Ten Technology Trendsetter, Mar. 22, 2007, MarketLinx; http://www.alta.org/technology/news.cfm?newsID=4749.
http://www.alta.org/technology/technews.cfm; American Land Title AssociationTM, 1828 L Street, NW, Suite 705, Washington, DC 20036-5104.
2007 Swanepoel Trends Report; http://www.retrends.com/; RealSure, Inc., 8 Argonaut, Suite 100, Aliso Viejo, CA 92656.
RETrends Aritcles and Writings; http://www.retrends.com/real_estate_trends_articles.asp; RealSure, Inc., 8 Argonaut, Suite 100, Aliso Viejo, CA 92656.
http://www.retechnologynews.com; Real Estate Technology News an October Research Corporation publication, PO Box 370, Richfield, Ohio 44286 877-662-8623.
Danny Sullivan, "Google Launches Comparison Ads, Starting With Mortgages," Oct. 29, 2009, Search Engine Land; http://searchengineland.com/google-launches-comparison-ads-starting-with-mortgages-28810.
http://www.cbmove.com; (As copied off Web site Oct. 2009).
http://www.coldwellbanker.com/; (As copied off Web site Oct. 2009).
http://www.homesdatabase.com/; (As copied off Web site Oct. 2009).
http://www.weichert.com/; (As copied off Web site Oct. 2009).
http://www.prufoxroach.com/; (As copied off Web site Oct. 2009).
http://www.remax.com/; (As copied off Web site Oct. 2009).
http://www.realestate.com/; (As copied off Web site Oct. 2009).
http://maps.google.com/maps?hl=en&tab=f1; (As copied off Web site Oct. 2009).
https://www.google.com/comparisonads/mortgages#ti=0; (As copied off Web site Nov. 2009).
http://www.har.com/; (As copied off Web site Oct. 2009).
http://www.longandfoster.com/; (As copied off Web site Oct. 2009).
http://realestate.yahoo.com/; (As copied off Web site Sep. 2009).
http://realestate.aol.com/; (As copied off Web site Oct. 2009).
http://www.realestate.msn.com/; (As copied off Web site Oct. 2009).
http://www.realtor.com/; (As copied off Web site Oct. 2009).
http://www.zillow.com/; (As copied off Web site Oct. 2009).
Tom Dooley et al., "Real Estate Confronts Reality," Real Estate Education Company, publisher (Jan. 1, 1998). http://books.google.com/books?id=smmgVduqX7EC&dq=Real+Estate+confronts+Reality,+by+StefanSwanepoel&hl=en&ei=uyTFT8_TO_H06AGZocHCCg&sa=X&oi=book+result&ct=book-thumbnail&resnum=1&ved=0CFEQ6wEwAA.
Stefan Swanepoel, "Real Estate Confronts the e-Consumer," RealSure, Inc., publisher, pp. 135-147 (2000). http://books.google.com/books?id=xYaNnWUOuWgC&pg=PA138&lpg=PA138&dq=Doug+Dayhoff+risco&source=bl&ots=Djp4hay8vK&sig=Gw0EUdPq7KRdnEAwyDZ5UFIZeDc&hl=en&sa=X&ei=WRO0T4SCHue_6AHV4sTODw&sqi=2&ved=0CGAQ6AEwBA#v=onepage&q=Doug%20Dayhoff%20risco&f=false .
Stefan Swanepoel et al., "Real Estate Confronts the Future," Thomson South-Western, publisher (2005). http://books.google.com/books?id=RriYVY_Vs74C&dq=Real+Estate+confronts+the+Future+(2004)+by+Stefan+Swanepoel&hl=en&sa=X&ei=YDjFT8fnlJT06AHPq6AHPq6HNCg&ved=0CEsQ6AEwAA.
Stefan Swanepoel, "Trends Report 2009, Top 10 Business Trends Impacting the Real Estate Industry," RealSure, Inc., publisher (2008). http://books.google.com/books?id=QVnxdzG-87cC&pg=PA157&dq=Real+Estate+confronts+Reality,+by+Stefan+Swanepoel&hl=en&sa=X&ei=uyTFT8_TO_H06AGZocHCCg&ved=0CFgQ6AEwAg#v=onepage&g=Real%20Estate%20confronts%20Reality%2C%20by%Stefan%Swanepoel&f=false.
"LendingTree Eliminates Need for Manual Loan Approvals Online Loan Marketplace Becomes First to Offer Real-Time Approvals from Multiple Lenders," Business Wire, 1 page (May 12, 1999). http://www.thefreelibrary.com/LendingTree+Eliminates+Need+for+Manual+Loan+Approvals+Online+Loan...-a054614891 (downloaded from the Internet Feb. 10, 2013).
"LendingTree and arcsystems.com to Offer Automated Underwriting to Network of Lenders Via the Internet," Company Press Release, ArcSystems.com, Company Press Release, 2 pages (Jul. 19, 1999). http://www.opticality.com/Press/Arc/LT/ (downloaded from the internet Feb. 10, 2013).
"Lending Tree Makes AU Available on Site.(LT2k automated underwriting system)," National Mortgage News, 2 pages (Aug. 16, 2999). http://www.highbeam.com/doc/1G1-55580584.html (downloaded from the internet Feb. 10, 2013).
"Treasury Statements About Fannie, Freddie Focus Attention on the GSEs," Realty Times, 1 page (Mar. 28, 2000). http://realtytimes.com/rtpages/20000328_treasury.htm (downloaded from internet Feb. 26, 2013).
"LendingTree Announces Multi-Year Agreement With Freddie Mac to Provide Superior Online Mortgage Loan Technology to Lenders," Business Wire, 3 pages (see pp. 1-2) (Jul. 10, 2000). http://www.thefreelibrary.com/LendingTree+Announces+Multi-Year+Agreement+With+Freddie+Mac+To...-a063276356 (downloaded from the internet Feb. 10, 2013).
Robert Julavits, "Online Loan Platforms Duel in B-to-B Arena: LendingTree, Freddie to Link Origination Systems," American Banker, 1 page (Jul. 12, 2000). http://www.highbeam.com/doc/1G1-63320891.html (downloaded from the Internet Feb. 10, 2013).
Brian Collins, "Loan to LendingTree Prompts OFHEO Review," American Banker, 2 pages (Mar. 26, 2001). http://license.icopyright.net/user/viewFreeUse.act?fuid=MTY5NDU2MzI%3D; http://business.highbeam.com/392999/article-1G1-72265327/loan-lendingtree-prompts-ofheo-review (downloaded from the internet Feb. 10, 2013).
Dennis W. Carlton, et al. "The Competitive Effects of Fannie Mae," Fannie Mae Papers, vol. 1, Issue 1, pp. 1-14 (see pp. 13-14) (Jan. 2002).
Scott Kersnar, "LendingTree and LP Forge a Link: Some lenders are squawking, 'When GSEs compete, we lose.'," Mortgage Technology, 4 pages (see pp. 1-3) (Apr. 1, 2002). http://business.highbeam.com/394287/article-1G1-83796893/lendingtree-and-lp-forge-link-some-lenders-squawking (downloaded from the internet Feb. 10, 2013).

(56) References Cited

OTHER PUBLICATIONS

"LendingTree Cancels Its Freddie Mac LOC," National Mortgage News, 1 page (Nov. 4, 2002). http://business.highbeam.com/392999/article-1G1-93908645/lendingtree-cancels-its-freddie-mac-lo (downloaded from the Internet Feb. 10, 2013).
"NAR Asks New Fed Chair to Maintain Separation of Banking & Commerce," Business Wire, 2 pages (Feb. 2, 2006). http://www.thefreelibrary.com/NAR+Asks+New+Fed+Chair+to+Maintain+Separation+Of+Banking+%26+Commerce.-a0141596325 (downloaded from the internet Oct. 7, 2013).
"Microsoft Joins Forces with Freddie Mac, Chase Manhattan, GMAC-RFC, Norwest Mortgage, and Bank of America to Form New Company. HomeAdvisor Technologies Inc. Created to Revolutionize Mortgage and Real Estate Transactions for Consumers and Industry Professionals," Microsoft Press Release, 3 pages (Mar. 16, 2000). http://www.microsoft.com/en-us/news/press/2000/mar00/newcomppr.aspx (downloaded from the internet Sep. 2, 2013).
Laura Doster, "The Breakup of HomeAdvisor Technologies," Mortgage Bankers Association of America, 6 pages (see pp. 1-2) (Apr. 1, 2001). http://www.thefreelibrary.com/THE+BREAKUP+OF+HomeAdvisor+Technologies.-a077828991 (downloaded from the internet Sep. 1, 2013).
Blanche Evans, "Microsoft Launches Realty Desktop Nationwide," RealtyTimes, 5 pages (see pp. 1-2) (Feb. 22, 2001), http://realtytimes.com/rtpages/20010223_desktop.htm (downloaded from the internet Aug. 31, 2013).
"Microsoft Introduces Realty Desktop. The First Completely Web-Based Customer Management Tool for Real Estate Brokers," Microsoft Press Release, 4 pages (see pp. 1-2) (Feb. 23, 2000). http://www.microsoft.com/en-us/news/press/2000/feb00/realtydesktoppr.aspx (downloaded from the Internet Sep. 1, 2013).
"Geac's Interealty.com and HomeAdvisor Technologies Join Forces to Deliver Realty Desktop to More Than 260,000 Realtors," Business Wire, 3 pages (May 18, 2000). http://www.thefreelibrary.com/Geac's+Interealty.com+and+HomeAdvisor+Technologies+Join+Forces+To...-a062160778 (downloaded from the Internet Aug. 31, 2013).
Blanche Evans, "Homestore Drops Bomb on Transaction Management/Lending Industry," Realty Times, 4 pages (see pp. 1-2) (Oct. 25, 2000). http://realtytimes.com/rtpages/20001025_homsonepipe.htm (downloaded from the Internet Aug. 31, 2013).
Blanche Evans, "eRealtor com: Getting Ready to Roll Out," Realty Times, 4 pages (see p. 1) (Aug. 29, 2000). http://realtytimes.com/rtpages/20000829_erealtor.htm (downloaded from the internet Sep. 1, 2013).
Mike Patrick, "eRealtor.com is on Its Way," RISMEDIA-NRRE, vol. 16-9, 6 pages (see pp. 2-3) (2000).
AE Institute Roundtable Discussion on the Past and Future of Homestore and Realtor.com, AE Institute in St. Louis, MO., 19 pages (see pp. 13, 14, 16) (2001). http://www.realtor.org/realtororg.nsf/ca2dae5fa466338d862567e6004ad5ff/ccc290116244d54786256b950058a71b/$FILE/roundtable%20transcript%201.4.pdf (downloaded from the Internet Sep. 2, 2013).
Blanche Evans, "NTREIS Introduces Integrated MLS-Transaction Management System," RealtyTimes, 5 pages (see pp. 1-2) (May 12, 2003). http://realtytimes.com/rtpages/20030512_ntreis.htm (downloaded from the Internet Sep. 2, 2013).
"OnePipeline Confirms Layoffs, Predicts Profits," National Mortgage News, 9 pages (see p. 3) (Nov. 8, 2001). http://www.nationalmortgagenews.com/dailybriefing/2001_215/-395149-1.html (downloaded from the internet Sep. 2, 2013).
"Investor Nabs OnePipeline. Financial Services Company Takes Over Brand Name, Business Model," Inman News Features, 2 pages (Mar. 11, 2002). http://www.alta.org/news/news.cfm?newsID=1159 (downloaded from the Internet Sep. 2, 2013).
M. Lynne Markus et al., "The Computerization Movement in the US Home Mortgage Industry: Automated Underwriting from 1980-2004," Computerization Movements and Technology Diffusion: From Mainframes to Ubiquitous Computing, Information Today, pp. 8-20 (see pp. 12, 16) (Feb. 2005). http://ebusiness.tc.msu.edu/vista/files/computerization_chap.pdf.
Charlyne H. McWilliams, "Opening the black box: Automated underwriting technology comes in many different shapes and sizes. Here's a guide to some of the options out there.", The Free Library, 9 pages (see pp. 2-4) (Dec. 2001). http://www.thefreelibrary.com/Opening+the+black+box%3A+Automated+underwriting+technology+comes+in...-a081112842 (downloaded from the internet Feb. 10, 2013).
Blanche Evans, "Microsoft Launches Realty Desktop Nationwide," Screen Shot of of the Desktop, RealtyTimes, 1 page (Feb. 22, 2001). http://img.realtytimes.com/rtimages/20010222_img/$file/rd2homepage.jpg.
Blanche Evans, "Microsoft Launches Realty Desktop Nationwide," Screen Shot of the Client Page, RealtyTimes, 1 page (Feb. 22, 2001). http://img.realtytimes.com/rtimages/20010222_img/$file/rd2clientwebpage.jpg.
"iProperty.com Connects with GHR to Power Real Estate Management Engine; Chorus(SM) Offers Immediate Connectivity From Multiple Lenders," PR Newswire, 3 pages (see pp. 1-2) (Jul. 10, 2000). http://www.thefreelibrary.com/iProperty.com+Connects+with+GHR+to+Power+Real+Estate+Management...-a063263369 (downloaded from the internet Jun. 14, 2013).
Blanche Evans, "Microsoft Rolls Out New Company—HomeAdvisor Technologies, Inc.," RealtyTimes, 4 pages (see pp. 1-2) (Mar. 15, 2000). http://realtytimes.com/todaysheadlines1/item/20615-20000316_hadvisortech (downloaded from the Internet Jul. 2, 2014).
"Microsoft Realty Desktop," Promotional Brochure, 4 pages (see pp. 2-3) (© 2001).
"Interealty MLXchange for Agents," Promotional Brochure, 2 pages (© 2001).
"HomeStore eRealtor," Promotional Brochure, 4 pages (© 2000).
"CFPB Report Finds Nearly Half of Borrowers Do Not Shop for a Mortgage," CFPB, 4 pages (see pp. 1-2) (Jan. 13, 2015). http://www.consumerfinance.gov/newsroom/cfpb-report-finds-nearly-half-of-borrowers-do-not-shop-for-a-mortgage/.
"Consumers' Mortgage Shopping Experience, A first look at results from the National Survey of Mortgage Borrowers," pp. 8-10, CFPB, pp. 1-26 (see pp. 9-10) (Jan. 2015). http://files.consumerfinance.gov/f/201501_cfpb_consumers-mortgage-shopping-experience.pdf.
"HUD, Treasury Release Joint Report Recommending Actions to Curb Predatory Lending," U.S. Department of Housing and Urban Development. HUD Archives: News Releases. HUD No. 00-142 (Jun. 20, 2000). (2 pages; See pp. 1-2). http://archives.hud.gov/news/2000/pr00-142.html.
HUD—Treasury Report (Jun. 20, 2000). (121 pages; See pp. 1-11, 16-24, 60-68, 71-73, 80). https://www.huduser.gov/publications/pdf/treasrpt.pdf.
US's largest Realtor association to dotloop: 'Hands off our forms' Stance sparks copyright vs. innovation debate; by Paul Hagey, Inman News, Jun. 6, 2013 (16 pages; see p. 1); http://www.inman.com/2013/06/06/uss-largest-realtor-association-to-dotloop-other-competitors-hands-off-our-forms/.
"The Last Stand of the 6-Percenters?" Sep. 3, 2006 (8 pages; see pp. 2-4); by Damon Darlin, The NY Times; http://www.nytimes.com/2006/09/03/business/yourmoney/03real.html.
The Great Turf War of the New Millennium Can Banks Engage in Real Estate, by Harrison K. Bishop, UNC School of Law, North Carolina Banking Inst. vol. 6, Issue 1, Art. 12, 2002 (21 pages; see pp. 8-9, 11-13, 20); http://scholarship.law.unc.edu/cgi/viewcontent.cgi?article=1162&context=ncbi.
NAR Asks New Fed Chair to Maintain Separation of Banking & Commerce., Business Wire, 2006 (3 pages; see p. 2); http://www.thefreelibrary.com/NAR+Asks+New+Fed+Chair+To+Maintain+Separation+Of+Banking+%26+Commerce.-a0141596325.
"Competition in the Real Estate Brokerage Industry, A Report by the Federal Trade Commission and U.S. Department of Justice, Apr. 2007" (71 pages; see pp. 12, 14, 65-66) https://www.ftc.gov/sites/default/files/documents/reports/competition-real-estate-brokerage-industry-report-federal-trade-commission-and-u.s.department-justice/v050015.pdf.

(56) References Cited

OTHER PUBLICATIONS

Justice Department Reaches Settlement with Consolidated Multiple Listing Service Inc., Settlement Will Result in More Choices, Better Services, and Lower Commission Rates for South Carolina Consumers, Department of Justice, Office of Public Affairs, May 4, 2009 (2 pages; see pp. 1-2); https://www.justice.gov/opa/pr/justice-department-reaches-settlement-consolidated-multiple-listing-service-inc.

The Changing Real Estate Market, Hearing Before the Subcommittee on Housing and Community Opportunity, Jul. 25, 2006 (82 pages; see pp. 6-9, 18, 50-52); https://www.gpo.gov/fdsys/pkg/CHRG-109hhrg31541/pdf/CHRG-109hhrg31541.pdf.

Justice Department Sues National Association of Realtors for Limiting Competition Among Real Estate Brokers, Sep. 8, 2005 (2 pages; see pp. 1-2); https://www.justice.gov/archive/atr/public/press_releases/2005/211008.htm.

MX v Lendingtree Memorandum of Opinion Jan. 10, 2007 (51 pages; See p. 43); http://scholar.google.com/scholar_case?case=17366566674546012158&hl=en&as_sdt=2&as_vis=1&oi=scholarr.

*United States of America* v. *National Association of Realtors®*, Competitive Impact Statement, Jun. 12, 2008 (15 pages; see pp. 1-7); https://www.justice.gov/atr/case-document/competitive-impact-statement-160.

The Computerization Movement in the US Home Mortgage Induatry, 1980-2004, by M. Lynne Markus, Bentley College, et. al., Feb. 2005 (30 pages, see pp. 1-2, 10-12, 14-16, 18-24); https://msu.edu/user/steinfie/vista/files/computerization_chap.pdf.

June Cash Home Sales Drop Below 30% for First Time Since 2007, by Paul Ausick, Sep. 27, 2016, 247wallst.com; (3 pages, see pp. 1-2) http://247wallst.com/housing/2016/09/27/june-cash-home-sales-drop-below-30-for-first-time-since-2007/.

Zillow.com Analytics—Market Share Stats & Traffic Ranking (Jan. 2017), Total Visits 172.10M, Avg. Visit Duration 00:07:34; (2 pages, see p. 2); https://www.similarweb.com/website/zillow.com.

Realtor.com Analytics—Market Share Stats & Traffic Ranking (Jan. 2017) Total Visits 58.60M, Avg. Visit Duration 00:08:00; (2 pages, see p. 2); https://www.similarweb.com/website/realtor.com.

Redfin.com Analytics—Market Share Stats & Traffic Ranking (Jan. 2017) Total Visits 26.50M, Avg. Visit Duration 00:05:12; (2 pages, see p. 2); https://www.similarweb.com/website/redfin.com#overview.

Zillow.com 2,025 Homes for Sale, Dallas, TX (Feb. 18, 2017); (1 page); https://www.zillow.com/homes/for_sale/Dallas-TX/_type/38128_rid/50000-_price/189-_mp/globalrelevanceex_sort/32.895011,-96.611881,32.739783,-96.946964_rect/11_zm/.

Mortgage Rates Today—Compare Home Loan Rates at Bankrate. com, Dallas, TX (Feb. 19, 2017); (9 pages; see pp. 2-7); http://www.bankrate.com/mortgage.aspx?type=newmortgage&market=1077&propertyvalue=350000&loan=280000&perc=20&prods=1,387,566,2,388,5,449&fico=740&points=Zero&cs=1.

"First-time Buyers Account for 60 Percent of Purchases," DSNews, May 24, 2017 (2 pages, see p. 1); http://www.dcnews.com/news/05-24-2017/first-time-buyers-account-60-percent-purchases.

U.S. Appl. No. 13/784,574, Non-Final Rejection dated Aug. 30, 2013.

U.S. Appl. No. 13/784,574, Final Rejection dated Sep. 24, 2015.

U.S. Appl. No. 13/784,574, Non-Final Rejection dated Oct. 24, 2016.

U.S. Appl. No. 13/784,574, Final Rejection dated Jul. 12, 2017.

U.S. Appl. No. 13/784,574, Notice of Allowance dated Jan. 16, 2018.

U.S. Appl. No. 12/457,598, Notice of Allowance dated Dec. 7, 2012.

Finding the best deal in a mortgage. (1979). Changing Times (Pre-1986), 33(9), 7. Retrieved from https://search.proquest.com/docview/199166074?accountid=14753 (Year: 1979).

Reiner, C. (May 29, 1994). Your Dream Home, Online—You Can House-Hunt Now by Computer, With Help From a Real Estate Agent: [Final Edition]. Seattle Times Retrieved from https://search.proquest.com/docview/384268407?accountid=14753 (Year: 1994).

Golden, C. (Mar. 9, 1997). There's a world of real estate help online: [1,2 edition]. The San Diego Union—Tribune Retrieved from https://search.proquest.com/docview/271551788?accountid=14753 (Year: 1997).

Real Estate Data Firm CoStar to Acquire App Homesnap, therealdeal. com, Nov. 23, 2020; 2 pages (See pp. 1-2) (As copied on the Internet Feb. 19, 2021); https://therealdeal.com/national/2020/11/23/costar-to-acquire-homesnap-for-250m/.

CoStar Commercial Real Estate Services and Information Products, 3 pages (See p. 1-2) (Retrieved from Internet website Feb. 19, 2021; https://www.costar.com/products.

About CoStar Commercial Real Estate Data, Information and Analytics; 6 pages (See pp. 1-3) (Retrieved from internet website Feb. 19, 2021; https://www.costar.com/about.

Taskforce on Federal Consumer Financial Law Report vol. II,Bureau of Consumer Financial Protection, Jan. 2021; 100 pages (pp. 13-14, 17-18); (Rerieved from Internet Feb. 23, 2021; https://files.consumerfinance.gov/f/documents/cfpb_taskforce-federal-consumer-financial-law_report-volume-2_2021-01.pdf.

Shopping Around for a Mortgage Pays Off for Consumers, by Doug Duncan Senior Vice President and Chief Economist, Fannie Mae, Aug. 5, 2019; 1 page (p. 1); (As copied on the Internet Feb. 23, 2021); https://www.fanniemae.com/portal/research-insights/perspectives/shopping-mortgage-consumers-duncan-080519.html.

Consumer Financial Protection Bureau's Taskforce on Federal Consumer Financial Law Releases Its Report, CFPB, Consumer Financial Protection Bureau, Jan. 5, 2021; 4 pages (pp. 1-2); (As copied on the Internet Feb. 23, 2021); https://www.consumerfinance.gov/about-us/newsroom/consumer-financial-protection-bureaus-taskforce-on-federal-consumer-financial-law-releases-its-report/.

About RESO Real Estate Standards Organization; 4 pages (p. 1-3); (Retrieved from Internet Feb. 23, 2021); https://www.reso.org/about-us/.

About MISMO Mortgage Industry Standards Maintenance Organization; 1 page (Pg. 1); (Retrieved from Internet Feb. 23, 2021); https://www.mismo.org/x140197.

Realogy Holdings Corp. 2015 Investor Day Mar. 18, 2015; 38 pages, (p. 8); https://ir.realogy.com/static-files/e6ffde4d-72ad-463f-819e-eab3b208879e.

Compass CEO calls for national multiple listing service, InmanNews, Jan. 31, 2019; 16 pages (p. 2-3); https://www.inman.com/2019/01/31/compass-ceo-calls-for-national-multiple-listing-service/.

How MLS Platforms Could Empower Brokers From Within, InmanNews, by Chip McAvoy, Sep. 30, 2016; 8 pages; (p. 2) https://www.inman.com/2016/09/30/how-mls-platforms-could-empower-brokers-from-within/.

CoreLogic & Homesnap Join Forces on Integrations to Matrix—Broker Public Portal Mar. 20, 2019, 5 pages (p. 1); https://www.brokerpublicportal.com/2019/03/20/corelogic-and-homesnap-join-forces-on-integrations-to-matrix/.

2021 Transaction Management Interoperability Survey Report, WAV Group Consulting, Aug 2021, 4 pages (p. 3); https://www.wavgroup.com/product/transaction-management-interoperability-survey-report/.

\* cited by examiner

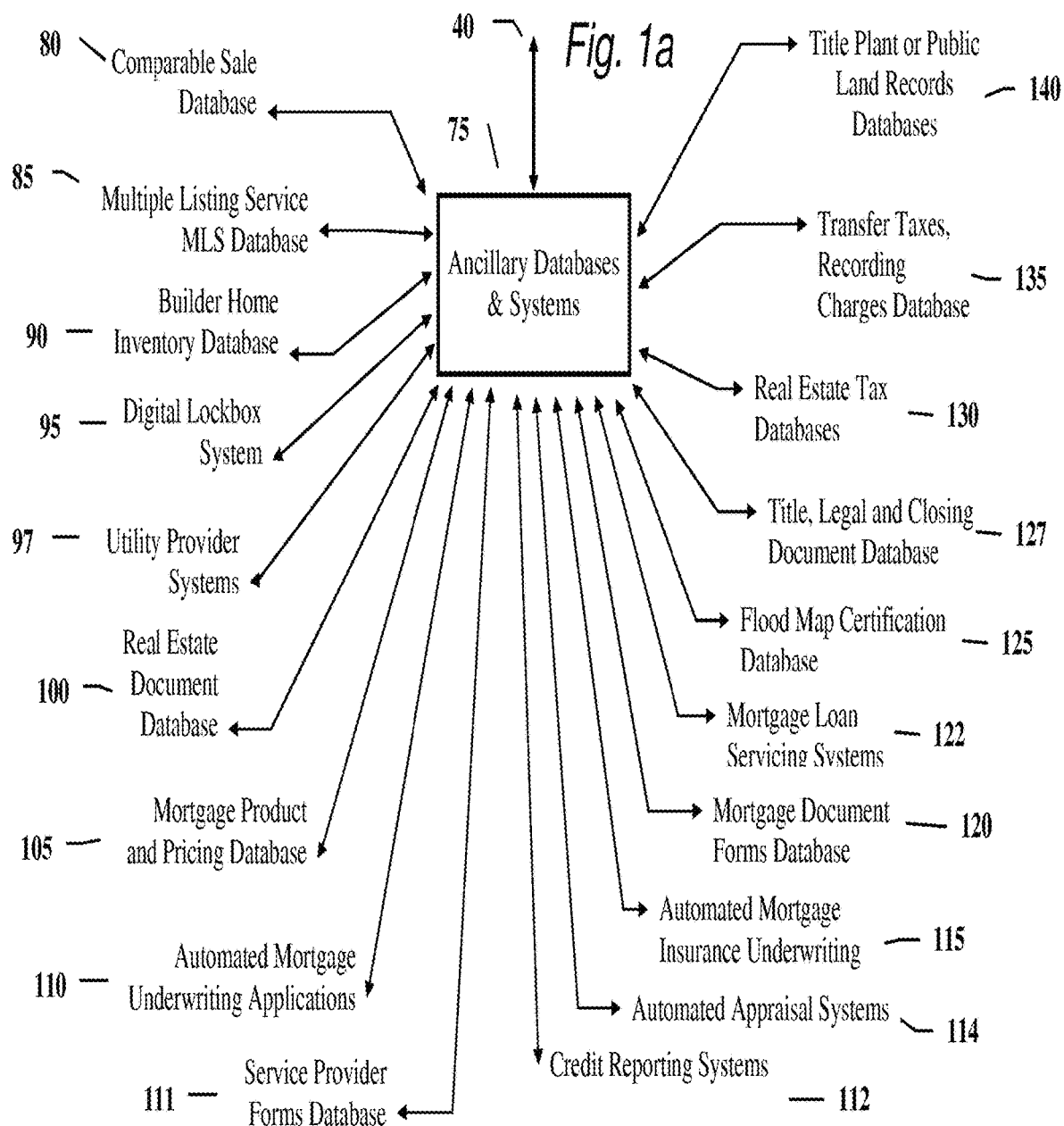

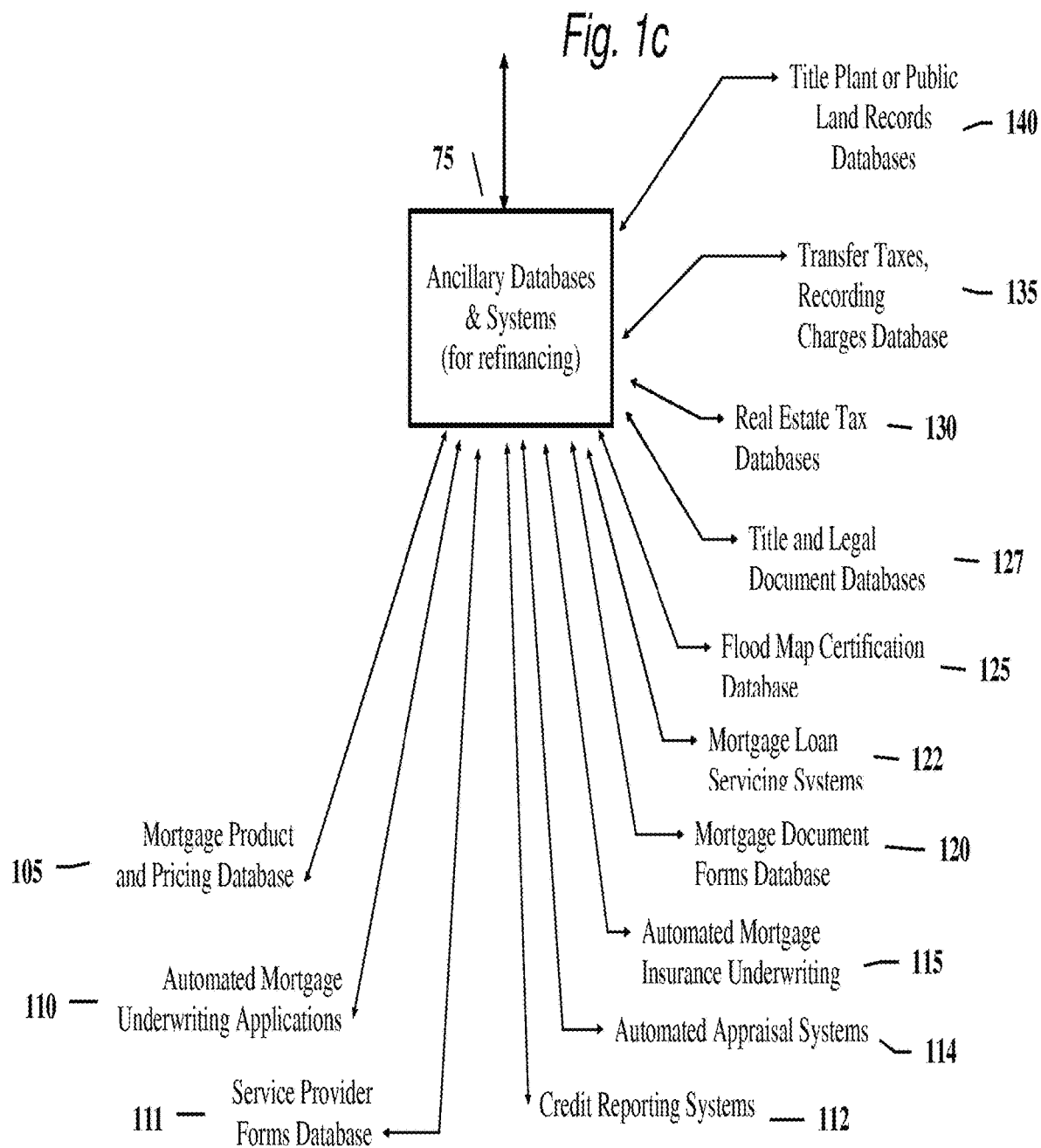

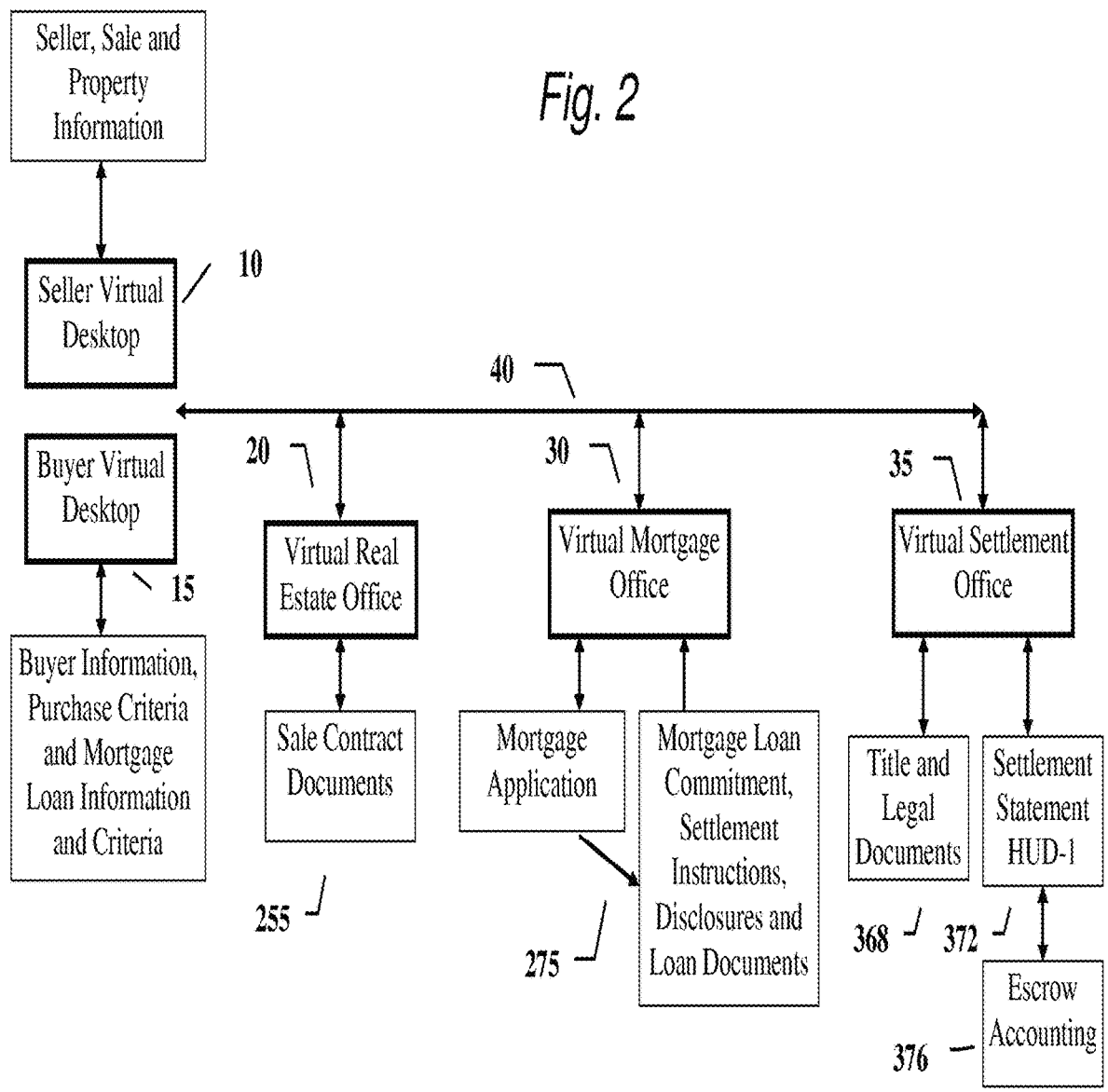

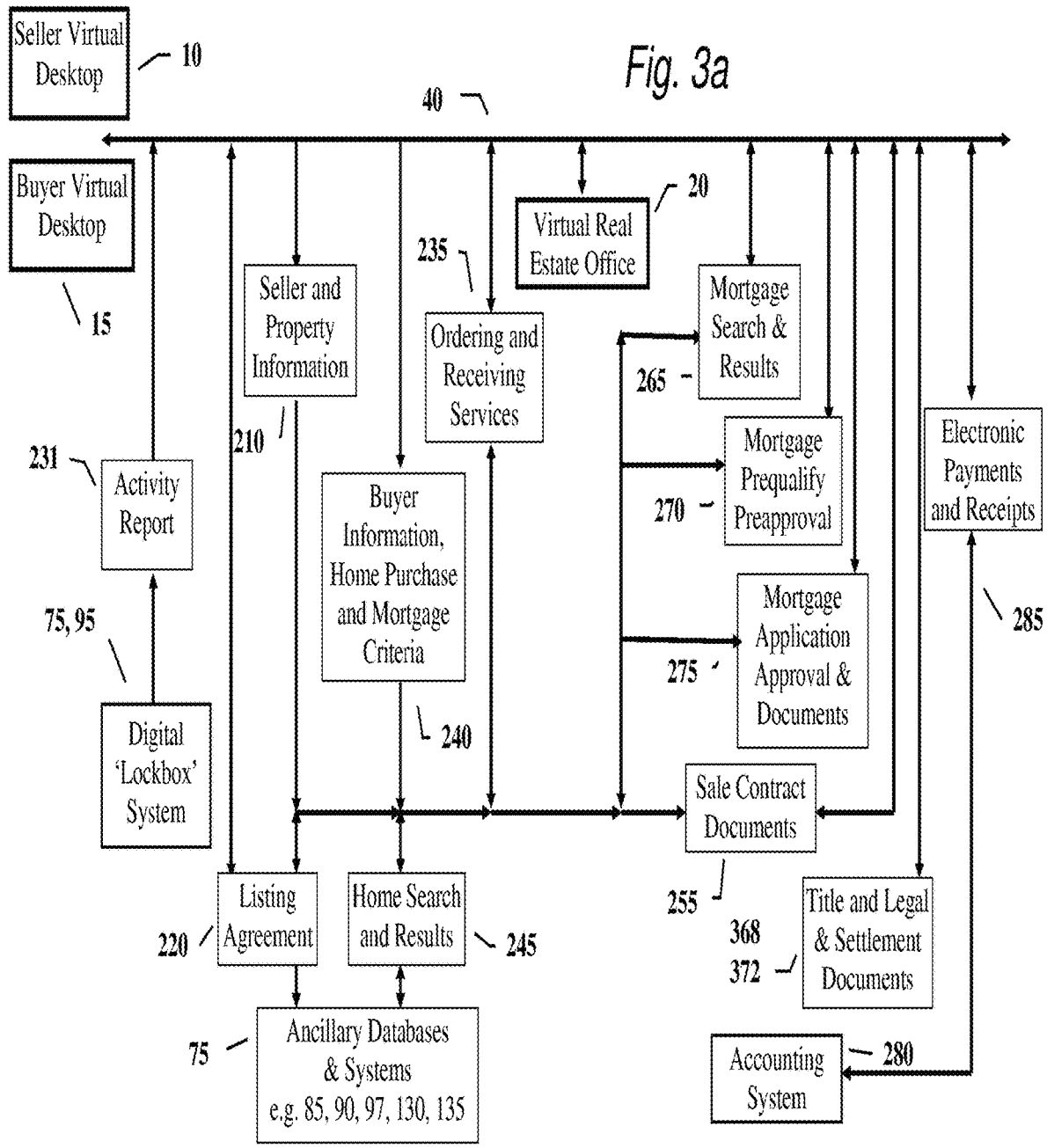

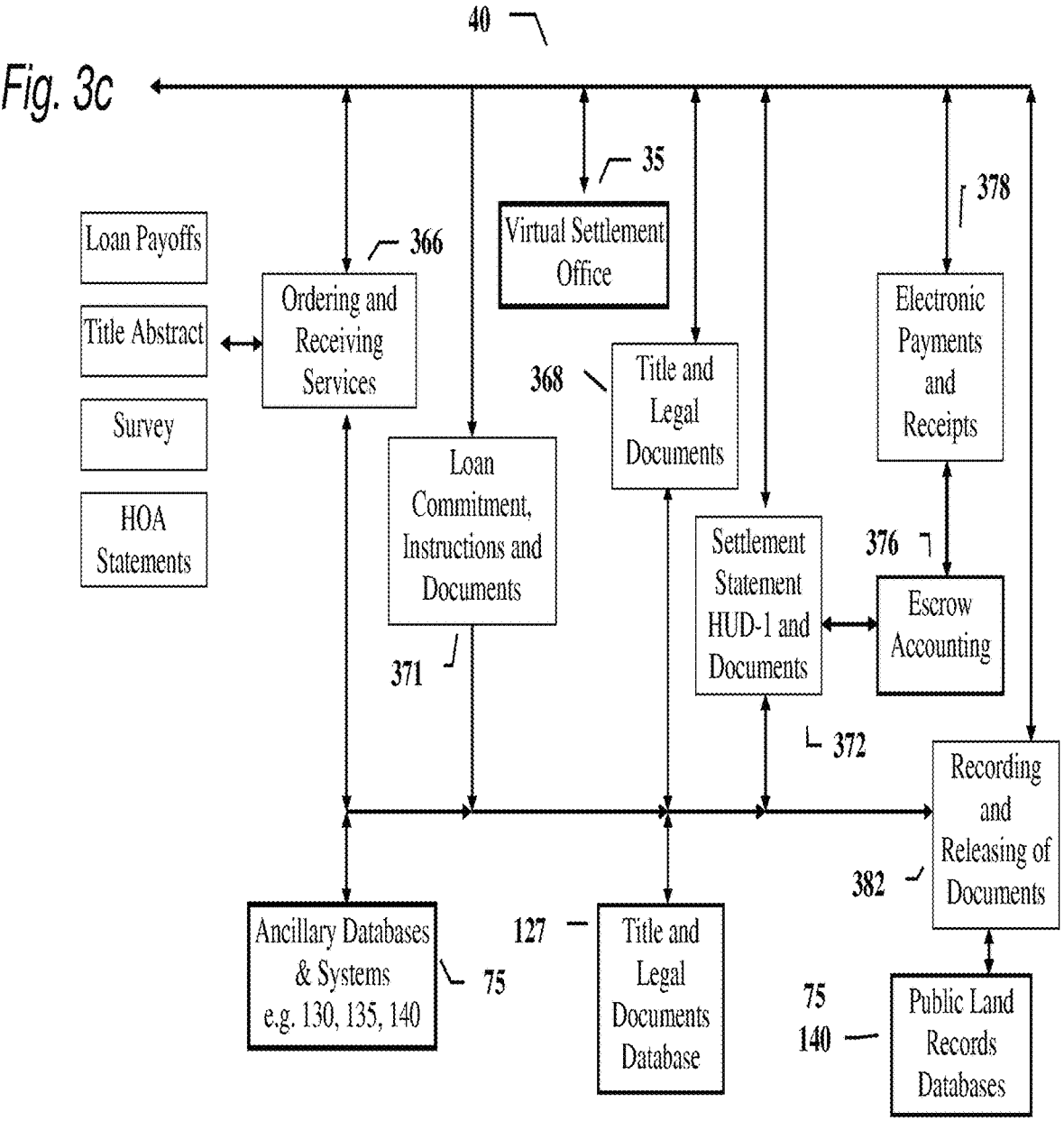

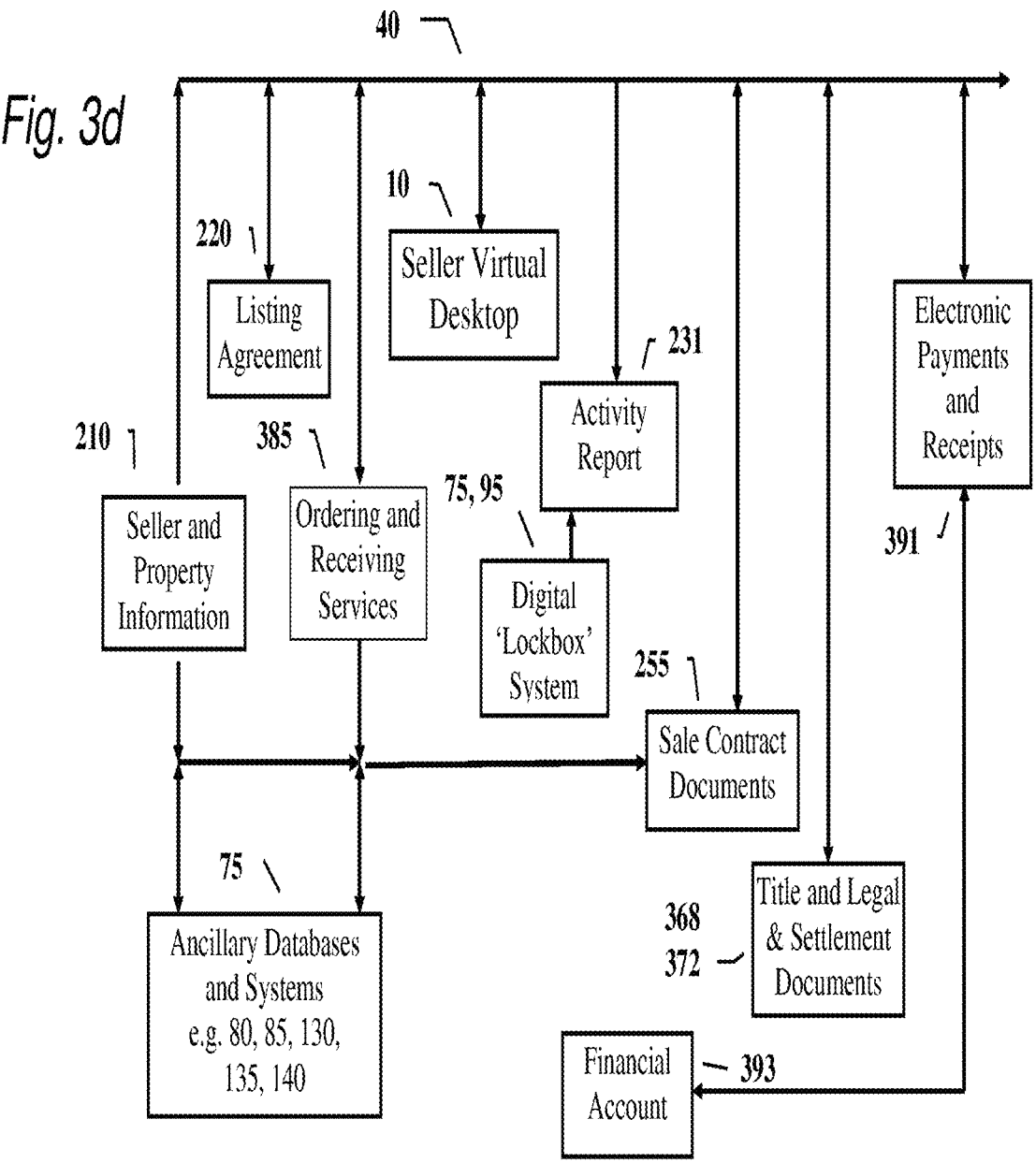

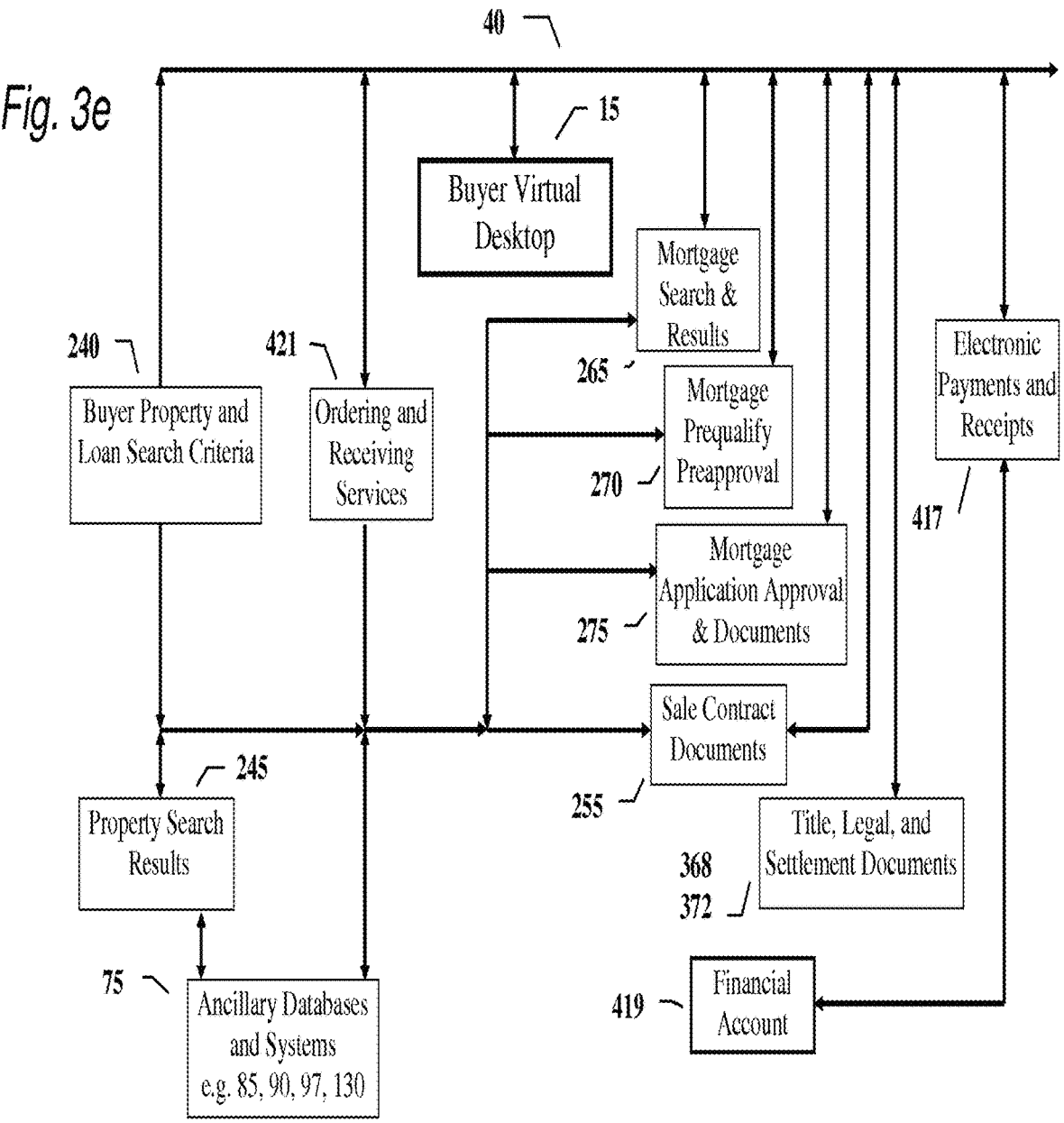

Fig. 4a

| | | |
|---|---|---|
| Seller Name | Betty Ford | |
| Buyer Name | George Clooney | Forms [Listing Contract] ／440 |
| Property Address | 5678 River Lane, Falls Church, Virginia, 20198 ／445 | MLS [Change of Status] ＼450 |
| Status | [Offer/Negotiations] | |

Fig. 4b

| | | |
|---|---|---|
| Borrower Name | Joe Borrower | |
| Property Address | 589 Country Road, Gaithersburg, Maryland, 20678 ／460 | ／470 |
| Status | [Application] | Forms [Prequalification Letter] |
| Loan No. | 12345 | |

Fig. 4c

| | | |
|---|---|---|
| Borrower Name | Pete Rose | |
| Property Address | Virginia ／480 | Settlement Forms ／485 [HUD-1] |
| Status | [New Order] | Title Forms [ALTA Commitment] ＼490 |
| Lender Name | GE Capital Mortgage | |
| Seller Name | Sammy Sousa | |
| Order No. | 12345 | |

Calendar

← Previous

*Fig. 7*

Next →

July 2003  July 2003

| | |
|---|---|
| 21 Monday<br>05:45 PM — Sam Seller Must Have Pool Cleaned at 123 Elm Street | Thursday 24<br>Settlement for 123 Elm Street<br>03:30 PM -04:30 PM Chair: Lana Cloud |
| 22 Tuesday<br>10:30 AM — 11:30 AM Termite Inspection for 123 Elm Street Chair: Lana Cloud | Friday 25<br>05:30 PM — 06:30 PM ABC Sign remove sign at 123 Elm Street Chair: Lana Cloud |
| 23 Wednesday<br>10:30 AM ABC Mortgage Co. Must Send Instructions and Documents to Settlement Co. for Joe Buyer on 123 Elm Street<br><br>04:30 PM — 05:30 PM Buyer Walk-thru Final Inspection for 123 Elm Street Chair: Lana Cloud | Saturday 26<br><br>Sunday 27 |

*Fig. 8*  810

| Buyer | Seller | Property | Sale | Realtor | Mortgage | Services | File Drawe |

| Subject | Date | Author |
|---|---|---|
| Comparative Market Analysis | 07/19/2000 | Roger Realtor |
| Policy Of Title Insurance | 08/24/2000 | ABC Settlement Co. |
| Prequalification Letter | 05/20/2002 | Chase Mortgage |
| Jim Roberts wants to prequalify | 05/14/2001 | Roger Realtor |
| Marketing Proposal | 07/19/2000 | Roger Realtor |
| Title Policy Endorsement | 08/24/2000 | Chase Mortgage |
| Good Faith Estimate | 12/12/2001 | Chase Mortgage |
| Residential Contract Of Sale | 07/19/2000 | Roger Realtor |
| Exclusive Right To Sell Listing Agreement | 07/24/2000 | Roger Realtor |
| Mortgage Loan Documents | 12/12/2001 | Chase Mortgage |

Fig. 9

| | Property Address | Seller Name | Contract Price | Contract Date | Contract Expires | Buyer Name |
|---|---|---|---|---|---|---|
| New Buyer | 345 Blue Ridge Ct., Arlington, Virginia, 22177 | Diane Farrington | 575000 | 08/07/2001 | 10/06/2001 | Bobby Bragalot |
| New Seller | 123 Elm Street, Silver Spring, Maryland | Bill Seller | 375000 | 01/15/2002 | 03/16/2002 | Alex Gorlenko |
| Prospect - Buyers | 7802 Loan Oak Cir., McLean, Virginia, 21770 | Ralph Nader | 975000 | 02/15/2002 | 04/16/2002 | Jack Smith |
| Prospect - Sellers | 345 Dolly Madison, McLean, Virginia, 21222 | James Madison | 1050000 | 01/15/2002 | 03/16/2002 | Alex Gorlenko |
| Listings | 8429 Greenbelt Rd #201, Greenbelt, Maryland, 20770 | HUD | 66000 | 02/10/2002 | 04/11/2002 | Jim Roberts |
| Contracts | 3456 River Road, Potomac, Maryland, 20822 | Henry Hudson | 500000 | 02/10/2002 | 04/11/2002 | Jack Szalasny |
| Sold | 7802 Hanover Pkwy., Bethesda, Maryland, 20814 | Rickey Ricardo | 117000 | 12/20/2001 | 02/18/2002 | Fred Mertz |
| Office Management | | | | | | |

| Status | Loan | Inspect | Radon | Term | HOA | W/T | Util | HUD-1 | Sett Date | Sett Co | Comm $ | Comm Rec'd |
|---|---|---|---|---|---|---|---|---|---|---|---|---|
| Under Contract | 1 | 1 | 1 | 1 | 1 | 1 | 1 | 1 | 1 | 1 | 1 | 1 |
| Inspections - Home | 2 | 2 | 2 | 2 | 2 | 2 | 2 | 2 | 2 | 2 | 2 | 2 |
| Settlement Scheduled | 3 | 3 | 3 | 3 | 3 | 3 | 3 | 3 | 3 | 3 | 3 | 3 |
| Under Contract | 4 | 4 | 4 | 4 | 4 | 4 | 4 | 4 | 4 | 4 | 4 | 4 |
| Under Contract | 5 | 5 | 5 | 5 | 5 | 5 | 5 | 5 | 5 | 5 | 5 | 5 |
| Financing Contingency | 6 | 6 | 6 | 6 | 6 | 6 | 6 | 6 | 6 | 6 | 6 | 6 |
| Financing Approved | 7 | 7 | 7 | 7 | 7 | 7 | 7 | 7 | 7 | 7 | 7 | 7 |

Fig. 10

| Buyer | Seller | Property | Real Estate Broker | Sale | Mortgage | Services | File Drawer |

Seller Information

| | |
|---|---|
| Seller Name: | Betty Ford |
| Street Address: | 5678 River Lane |
| Address | |
| City: | Falls Church |
| State: | VA |
| ZIP: | 20198 |
| Home Phone: | 703-555-1212 |
| Work Phone: | 703-967-6543 |
| Fax: | |
| Cell: | |
| Pager: | |
| E-mail: | |
| Seller Attorney | |
| Seller Attorney Phone No. | |

Co-Seller Information

| | |
|---|---|
| Seller Name: | |
| Street Address: | |
| Address | |
| City: | |
| State: | |
| ZIP: | |
| Home Phone: | |
| Work Phone: | |
| Fax: | |
| Cell: | |
| Pager: | |
| E-mail: | |

*Fig. 11*

| General | Utilities, Insurance, HOA/Condo | Taxes | Title and Legal |

Location

Street Address:: (Form 1003)  5678 River Lane

Address (Cont.):

Unit No.

City: Falls Church

Township

County,

State: Virginia

ZIP Code: 20198

MAPS

PHOTOS

Details

Property Type  Single Family Detached

Property Style

No. of Units (Form 1003)  1

Number of Floors  2

Number of Bedrooms  5 Bedrooms

Number of Full Baths  4

Number of Half Baths  5+

Land Area  6,500 s.f.

Amenities:  Barrier Free

Land Zoning:

Finished Building Area  2,100

Year built: (Form 1003)  1963

Basement

Garage  None - Street Parking

Water & Sewer  Public Water

*Fig. 12*

| Buyer Information | Employment Information |

Buyer Information

| Buyer Name: | George | Social Security Number (Form 1003) | |
| Street Address: | | Age | |
| Address (Cont.): | | Yrs. School | |
| City: | | ☐ Own ☐ Rent | |
| State: | Alaska | No Yrs. | |
| ZIP: | | If residing at present address for less than two years complete the following | |
| Home Phone: | | Former Address (street, city, state, ZIP) | ☐ Own ☐ Rent |
| Work Phone: | | | |
| Fax: | | No Yrs. | |
| Cell: | | ☐ Married ☐ Separated ☐ Unmarried (single divorced widowed) | |
| Pager: | | Dependents (not listed by Co-Borrower) | |
| E-mail: | | no. | |
| | | ages | |

Co-Buyer Information

| Buyer Name: | | Social Security Number (Form 1003) | |
| Street Address: | | Age | |
| Address (Cont.): | | Yrs. School | |
| City: | | ☐ Own ☐ Rent | |
| State: | Alaska | No Yrs. | |
| ZIP: | | If residing at present address for less than two years complete the following | |
| Home Phone: | | Former Address (street, city, state, ZIP) | ☐ Own ☐ Rent |
| Work Phone: | | | |
| Fax: | | No Yrs. | |
| Cell: | | ☐ Married ☐ Separated ☐ Unmarried (single divorced widowed) | |
| Pager: | | Dependents (not listed by Borrower) | |
| E-mail: | | no. | |
| | | ages | |

Search For Home

| | |
|---|---|
| State | Maryland |
| Zip Codes | |
| City | |
| County | |
| Subdivision | |
| Property Type | Single Family Detached |

| | |
|---|---|
| Price Range | $ No minimum to $ No maximum |
| Min. Bedrooms | 4 |
| Min. Full Baths | 3 |
| Min. Half Baths | Any |
| School District | |

| Photo | Address | Price ▲ | Property Type ▲ | Beds ▲ | Baths ▲ | Description |
|---|---|---|---|---|---|---|
| ☐ | Gaithersburg | $250000 | Single Family Detached | 3 | 1 1/2 | (This beautiful home has a pool and tennis courts...more) |
| ☐ | Gaithersburg | $279900 | Single Family Detached | 3 | 3 | This two level home built in 1986 has 3 bedroom(s), 3 full bath(s) and is approximately 1305 sq...(more) |
| ☐ | Gaithersburg | $250000 | Single Family Detached | 4 | 2 1/2 | This three level home built in 1978 has 4 bedroom(s), 2 full bath(s), 1 half bath(s)...(more) |
| ☐ | Rockville | $200000 | Single Family Detached | 3 | 2 | This two level home built in 1973 has 3 bedroom(s), 2 full bath(s), 1 half bath(s)...(more) |

Search For Home

| | | | | |
|---|---|---|---|---|
| State | Maryland | Price Range | $ No minimum to $ No maximum | |
| Zip Codes | | Min. Bedrooms | 4 | |
| City | | Min. Full Baths | 3 | *Fig. 13a* |
| County | | Min. Half Baths | Any | ─ 1330 |
| Subdivision | | School District | | |
| Property Type | Single Family Detached | | | |

| Photo | Address | Price ▲ | Property Type ▲ | Beds ▲ | Baths ▲ | Description | Financial Details (1350) / (1360) |
|---|---|---|---|---|---|---|---|
| | Gaithersburg | $250000 | Single Family Detached | 3 | 1 1/2 | (This beautiful home has a pool and tennis courts...more) | Down Payment $14,150 & Closing Costs $17,550 PITI $ 1,250 HOA $ 35 Utilities (Ave.) $ 376 [Good Faith Estimate] |
| | Gaithersburg | $279900 | Single Family Detached | 3 | 3 | This two level home built in 1986 has 3 bedroom(s), 3 full bath(s) and is approximately 1305 sq...(more) | Down Payment $19,250 & Closing Costs $21,550 PITI $ 1,475 [Good Faith Estimate] |

| Buyer | Seller | Property | Real Estate Broker | Sale | Mortgage | Services | File Drawer |
|---|---|---|---|---|---|---|---|
| | | Listing | | Sale | | Existing Financing | |

Sale Information

Offer Date: 01/15/2002

Contract Date: 01/15/2002

Deposit: $

Deposit Interest: $

Deposit Held by:

Contract Price: $ 375000

$ _____ Dollars

Personal Property: $

Financing Contingency Date: 03/15/2002

Settlement Date: 03/15/2002

*Fig. 14*

CONTRACT OF SALE

*Fig. 15*

1. DATE OF OFFER:

2. SELLER: NAME:

3. BUYER: NAME:

4. PROPERTY DESCRIPTION: Seller does sell to Buyer all of the following described Property (hereinafter "Property") known as Street, City, County, State, Zip together with the improvements thereon, and all rights and appurtenances thereto.

5. ESTATE: The Property is being conveyed: [Fee simple ▼] / 1510

6. PURCHASE PRICE: The purchase price is [Two Hundred Fifty Thousand & 00/100] Dollars ($ 250,000 ). Buyer shall pay Twenty Five Thousand & 00/100 ($25,000) down. Buyer has arranged a new first mortgage of Two Hundred Twenty-five Thousand & 00/100 dollars ($225,000) 30 year fixed rate at 5.5% with monthly payment of $2,550 (PI) Chevy Chase Bank, Loan No. 123456, as evidenced by commitment letter attached hereto.

7. SETTLEMENT AND SETTLEMENT COSTS: Date of Settlement

Seller and Buyer agree to pay the following fees and charges: / 1520

| | | |
|---|---|---|
| 800. ITEMS PAYABLE IN CONNECTION WITH LOAN | $ | $ |
| 801. Loan Origination Fee ____ % | $ | $ |
| 803. Appraisal Fee ____ to ____ | $ | $ |
| 804. Credit Report ____ to ____ | $ | $ |
| 1000. RESERVES DEPOSITED WITH LENDER | $ | $ |
| 1004. County property taxes ____ mos. @ $ | $ | $ |
| 1200. GOVERNMENT RECORDING AND TRANSFER CHARGES | $ | $ |
| 1201. Recording fees: Deed $ ____ ; Mortgage $ | $ | $ |
| 1202. City/County tax/stamps: Deed $ ; Mortgages $ | $ | $ |
| 303. CASH From To $ ____  603. CASH From To SELLER | | $ |

Fig. 16

Search & Prequalify — 1630

| | | | |
|---|---|---|---|
| How many borrowers | 2 | Monthly income | $ 50000.00 |
| Purpose of loan | Purchase | Monthly debt payments | $ 10000 |
| Property type | Single Family Detached | What type of loan do you want? | |
| Property will be | Primary Residence | Are you a Veteran who wants to use your Department of Veteran Affairs (VA) eligibility? | |
| State where property is located | Maryland | Is buyer a 'first-time homebuyer?' If so, he may be eligible for certain government-sponsored savings when he purchases a home. | |
| Money for down payment | $ 20000 | Purchase price | $ 1000000 |
| Select Mortgage Lenders | | | |

— 1660

| Lender | Amount | Type | Interest Rate | APR | Points | Monthly P&I | Closing Costs | Cash Required | Lock-in Period | |
|---|---|---|---|---|---|---|---|---|---|---|
| B. F. Saul Mortgage | $450,000 | 30 Year Fixed | 6% | 6.111% | 1 | $3,456 | $5,678 | $56,789 | 60 | Apply |
| Citi Mortgage | $435,000 | 15 Year Fixed | 6.125% | 6.234% | 0 | $4,432 | $6,789 | $67,890 | 30 | Apply |
| B of A | $375,000 | 10/1 ARM | 5.875% | 6.123% | 1 | $2,456 | $3,456 | $45,678 | 45 | Apply |

09/02/2003

B. F. Saul Mortgage Company

*Fig. 17*

Dear New Buyer One:

We are pleased to prequalify you for the following loan:

| | | | |
|---|---|---|---|
| Principal Amount: | $450,000.00 | Purpose of Loan | Purchase |
| Interest Rate | 6% | Property will be | Primary Residence |
| | | APR | 6.11% |
| Type of Loan | 30 Year Fixed Rate | Points | 1 |
| Loan Term | 30 Years | Monthly Payment (P&I) | $1,234.00 |

Your loan will be conditioned upon the receipt of satisfactory:
A fee of $450 for the cost of Credit Report and an Appraisal
Residential Loan Application
Credit Report
Appraisal
Verification of Employment
Verification of Assets
Copy of past two years W2 forms for each borrower
Most recent pay-stubs for most recent 30-day period for each borrower
Most recent bank statements - all pages - for investment, savings and checking accounts Please review the Good Faith Estimate and HUD Handbook we are sending you with this prequalification letter pursuant to the Real Estate Settlement Procedures Act of 1974, as amended (RESPA).

The Good Faith Estimate is the best estimate at this time of your expected settlement costs. We would suggest you contact a number of settlement companies to get the best price on your settlement and title services.
Thank you for applying for a loan with B. F. Saul Mortgage Company

☐ ACCEPT LETTER

Fig. 18

| Buyer | | Property | Mortgage | File Drawer |
|---|---|---|---|---|
| Prequalified | | | Mortgage Lender | |
| How many borrowers | 2 | | Monthly income | $ 10,000 |
| Purpose of loan | Purchase | | Monthly debt payments | $ 1,000 |
| Property type | Single Family Detached | | Borrower requested loan quotes for following type of mortgages | 30 Year Fixed Rate |
| Property will be | Primary Residence | | | |
| State where property is located | Maryland | | | |
| Money for down payment | $ 50,000 | | Purchase price | $ 500,000 |
| Loan amount | $ 450,000 | | Points | 1 |
| Interest rate | 6.00% | | APR | 6.11% |
| Monthly Payments (P&I) | $ 1,234 | | Closing costs | $ 2,345 |
| Cash To/From borrower | $ 45,000 | | Lock-in period | 60 |
| Fees | $ 450 | | | |
| Conditions | Residential Loan Application<br>Credit Report<br>Appraisal<br>Verification of Employment<br>Verification of Assets<br>Copy of past two years W2 forms for each borrower<br>Most recent pay-stubs for most recent 30-day period for each borrower<br>Most recent bank statements - all pages - for investment, savings and checking accounts to verify amounts on application<br>If Self-employed: Copies of complete signed last two years 1040's (Federal Income Tax Returns) with all schedules and a current year-to-date profit & loss statement/balance sheet | | | |

| Seller | Property | Services | File Drawer |
|---|---|---|---|
| Order New Service | Utilities - Electric | Advertising - Signs | Advertising - Magazine | Home Inspection |

Ordering New Service

Step 1: [Home Inspection - Termite ▼] Add/Edit/Delete Service Provider

Step 2: [Bugs R Us ▼]

Step 3: Order Information

*Fig. 19*

Service Provider
Phone Number
Fax Number

Contact Name
Contact Phone       301-BUGS-R1234
Contact Fax
Contact Cell
Contact Email       bugs@msn.com

Order Details
Type of Service:           [Inspect]
Requested Date of Service: [08/15/2001]
Fee/Premium Amount         
Fee/Premium Paid By        [Seller ▼]
Billing Arrangment         [Bill Our Account # ▼]
Billing Account No
HUD 1 Line                 [HUD 1 Line]
Instruction Comments       [Pease kill all the big bugs. Thank you.]

Step 4: Order Service

*Fig. 20*

| Order New Service | Utilities - Electric | Advertising - Signs | Advertising - Magazine | Home Inspection | Home Inspection - Termite |

Service Order Status: Bidding

Order Details
Type Of Service    Full Service
Due date    07/26/2001
Fee/Premium Amount
Fee/Premium Paid By    Buyer/Borrower
Billing Arrangement    HUD-1
Billing Account No    NA
HUD 1 Line
Instruction Comments    Please check the roof, and all utilities and mechanical systems. Access is by appointment with agent
Ordered By
Order Made on

| | Service Fee | Company Name | Service Date |
|---|---|---|---|
| ☒ | $150.00 | ABC Inspections | 07/30/2001 |
| ☐ | $235.00 | Dogwood Contractors | 07/28/2001 |
| ☐ | $350.00 | Fast Work Contractors | 07/26/2001 |

BID REQUEST FOR SERVICE          FORMS [ Repair Order ▼ ] — 2120          Submit Bid — 2130

— 2110

| Order Information | Property | Sale | Mortgage | Realtor | File Drawer |
|---|---|---|---|---|---|
| Property Address | Maryland | | | | |
| Type Of Service | Inspection; Treat; Treatment Estimate | | | | |
| Requested Date of Service | 08/29/2003 | | | | |
| Special Instructions | Testing | | | | |
| Ordered By | Neil J Thomas | | | | |
| Order Date | 8/29/2003 10:03:48 AM | | | | |
| Enter Your Bid Price | | | | | |
| Date of Service | 08/29/2003 | | | | |
| Time Of Service | | | | | |
| Company Name | | | | | |
| Phone Number | | | | | |
| Fax Number | | | | | |
| Contact Name | | | | | |
| Contact Phone | | | | | |
| Contact Fax | | | | | |
| Contact Cell | | | | | |
| Contact Email | | | | | |

Fig. 22

SERVICE ORDER    FORMS  [Termite Report ▼] 2210    [Confirm] — 2220

| Order Information | Property | Sale | Mortgage | Realtor | File Drawer |
|---|---|---|---|---|---|
| Property Address | Maryland | | | | |
| Type Of Service | Repairs/Renovation | | | | |
| Requested Date of Service | 08/29/2003 | | | | |
| Time of Service | 8 AM | | | | |
| Special Instructions | Please repair broken window; Replace flooring in bath; fix downspout; repair sidewalk; fix sink leak in bathroom | | | | |
| Ordered By | Neil J Thomas | | | | |
| Order Date | 8/29/2003 11:01:00 AM | | | | |
| Service Price | $1575   [SEND INVOICE] — 2240 | | | | |
| Company Name | Big Time Contractors | | | | |
| Phone Number | 301-444-5555 | | | | |
| Fax Number | 301-444-5555 | | | | |
| Contact Name | Joe Repair | | | | |
| Contact Phone | 301-444-5555 | | | | |
| Contact Fax | 301-444-5555 | | | | |
| Contact Cell | 301-444-5555 | | | | |
| Contact Email | joe@fixit.com | | | | |

Fig. 23

| Seller | Property | Services | File Drawer |
|---|---|---|---|
| Order New Service | Utilities - Electric | Advertising - Signs | Advertising - Magazine | Home Inspection |

— 2340

Service Order Status: Confirmed Order

Service Provider

| Provider | Washingtonian |
| Phone Number | 202-555-1212 |
| Fax Number | |
| Contact Name | Betty |
| Contact Phone | |
| Contact Fax | |
| Contact Cell | |
| Contact Email | |

Order Details

| Type Of Service | Display Full Page |
| Due date | 08/26/2001 |
| Fee/Premium Amount | |
| Fee/Premium Paid By | Real Estate Broker |
| Billing Arrangement | Bill Our Account # 1234 |
| Billing Account No | |
| HUD 1 Line | |
| Instruction Comments | |
| Ordered By | |
| Order Made on | |

Applications ┌─ 2420

| | Borrower Name ⇕ | Address ⇕ | Purpose ⇕ | Type ⇕ | Amount ⇕ | Status ⇕ |
|---|---|---|---|---|---|---|
| New Customer | | | | | | |
| Prospects | Betty Borrower | 4321 Kaboom Street, Bethesda, Maryland, 20815 | Purchase | 30 Year Fixed | 550000 | Application |
| Applications | Bill Buyer | 7432 Pleasant Valley Dr., Fairfax, Virginia, 20121 | Refinance | 15 Year Fixed | 275000 | Application |
| Approved | | | | | | |
| Settled | Buster Big Bucks | 555 Oak Ave.,Smog City,California,90210 | Refinance | 30 Year Fixed | 500000 | Application |
| Inactive | Joe Borrower | 589 Country Road, Gaithersburg, Maryland,20678 | Purchase | 30 Year Fixed | 375,000 | Application |
| Office Management | Lester Lowrate | 5432 Main Street,Silver Spring, Maryland,20902 | Purchase | 10/1 ARM | 225000 | Application |

┌─ 2420

| APPRAISAL ⇕ | CREDIT ⇕ | FLOOD ⇕ | TAX ⇕ | SETT. DATE |
|---|---|---|---|---|
| 0 | 0 | 0 | 0 | 6/7/03 |
| PD | 0 | 0 | R | 6/15/03 |
| 0 | R | R | PD | 6/21/03 |
| A | A | 0 | R | 6/13/03 |
| A | 0 | A | R | 7/18/03 |

*Fig. 25*

| Borrower | Property | Sale | Existing Financing | Lender | Loan Quote | Verification | Services | File Drawer |

Number of Borrowers [ 1 ▼ ]       Monthly income $ [ 5,000 ]

Purpose of Loan (Form 1003) [ Purchase ▼ ]

Loan Position:    Other (Explain): [____]
☐ 1st  ☐ 3rd        Monthly debt payments for all borrowers  $ [ 1,000 ]
☐ 2nd Property type [ Single Family Detached ▼ ]

Property will be (Form 1003) [ Primary Residence ▼ ]

Type of loan [ 30 Year Fixed ▼ ]       Mortgage Applied For
☐ Conventional
☐ FHA
☐ VA Are you a Veteran who wants ☐ Yes
to use your Department of
Veteran Affairs (VA)
eligibility?

State where property is [ Alaska ▼ ]
located

Money for Down Payment $ [_____]       Purchase price (Either enter the Purchase $ [ 500,000 ]
Price (if not yet determined estimate what
you would like to spend), Or leave blank to
Down Payment  $ [ 100,000 ]       calculate maximum purchase price you can
afford.)

Fig. 25a

| Lender | Amount | Type | Interest Rate | APR | Points | Monthly P&I | Closing Costs | Cash Required | Lock-in Period |
|---|---|---|---|---|---|---|---|---|---|
| B. F. Saul Mortgage | $450,000 | 30 Year Fixed Rate | 6% | 6.111% | 1 | $3,456 | $5,678 | $56,789 | 60 |
| Citi Mortgage | $435,000 | 15 Year Fixed Rate | 6.125% | 6.234% | 0 | $4,432 | $6,789 | $67,890 | 30 |
| B of A | $375,000 | 10/1 ARM | 5.875% | 6.123% | 1 | $2,456 | $3,456 | $45,678 | 45 |

| Borrower | Property | Sale | Existing Financing | Lender | Prequalify | Verification | Services | File Drawer |

| | | | |
|---|---|---|---|
| Number of Borrowers | 1 ▼ | Monthly income $ | 5000.00 |
| Purpose of Loan (Form 1003) | Purchase ▼ | | |
| | Other (Explain): | | |
| Loan Position: | ☐ 1st ☐ 3rd ☐ 2nd | Housing Expense $ | |
| Property type | Single Family Detached ▼ | Monthly debt payments for all borrowers $ | 30000 |
| Property will be (Form 1003) | Primary Residence ▼ | Total Monthly Payments $ | |
| Type of loan | | Mortgage Applied For | ☒ Conventional ☐ FHA ☐ VA |
| Are you a Veteran who wants to use your Department of Veteran Affairs (VA) eligibility? | ☐ Yes | Qualifying Ratios | Loan-to-Value Ratios |
| State where property is located | Alaska ▼ | Primary Housing Expense/Income ____ % | Actual LTV ____ % |
| | | Total Obligations/Incor ____ % | CLTV ____ % |
| If yes, enter monthly amount | | | |
| Money for Down Payment $ | | Purchase price $ | |
| Down Payment $ | 100,000 | | |

| Loan Amount: | $ 500,000 | Monthly Payments (PI): | $ 1,234 |
|---|---|---|---|
| Type of Loan: | 30 Year Fixed | Closing Costs: | $ 2,345 |
| Interest Rate: | 5.5 % | Cash From/To borrower: | $ 76,543 |
| Loan Term (No. of Months) | 360 months | Prepayment Penalty | NA |
| Amortization Period (Months): | 360 | Balloon After No. Months | NA |
| APR: | % | Lock-in period (days): | 60 |
| Points: | 0 | | |

Fig. 27

| Borrower | Property | Sale | Existing Financing | Lender | Application | 1003 Entry Screen | Verification | Services | File Drawer |
|---|---|---|---|---|---|---|---|---|---|
| I Type & Terms | II Property & Purpose | III Borrower Info | IV Employment | V Income & Housing Expense | VI Assets & Liabilities | VII Details of Trans | VIII Credit & Declarations | | |

I. TYPE OF MORTGAGE AND TERMS OF LOAN

| Mortgage Applied for: ☐ V.A. ☐ Conventional ☐ Other ☐ FHA ☐ FmHA | Agency Case Number | Lender Case Number |
|---|---|---|

| Amount $ | Interest Rate % | No. of Months months | Amortization Type ☐ Fixed Rate ☐ Other (explain) ☐ GPM ☐ ARM (type) | |

*Fig. 28*

| Borrower | Property | Sale | Existing Financing | Lender | Application | 1003 Entry Screens | Verification | Services | File Drawer |

Number of Borrowers [2 ▼]    Monthly income  $ [$20000.00]

Purpose of Loan (Form 1003) [Purchase ▼]

Other (Explain):

Loan Position:  ☒ 1st  ☐ 3rd    Housing Expense  $ [2400]
                      ☐ 2nd Property type [Single Family Townhouse ▼]   Monthly debt payments for all borrowers  $ [2000]

Property will be (Form 1003) [Secondary Residence ▼]   Total Monthly Payments  $ [4400]

Type of loan [▼]   Mortgage Applied For  ☒ Conventional
                                                                  ☐ FHA ☐ VA Are you a Veteran who wants to ☐ Yes    Qualifying Ratios          Loan-to-Value Ratios
use your Department of Veteran
Affairs (VA) eligibility?

State where property is located [Alaska ▼]   Primary Housing Expense/Income [23] %   Actual LTV [85] %

Total Obligations/Income [27] %   CLTV [85] %

If yes, enter monthly amount

Money for Down Payment  $ [50000]   Purchase  $ [350000]   Appraised Value (form 1008)  $ [375000]

*Fig. 28a*

| Lender Case No (Form 1003). | | Agency Case No (Form 1003). | |
|---|---|---|---|
| Loan No. | 1234 | Mortgage Insurance Case No. | 54321 |
| Mortgage Applied for (Form 1003): | ☐ V.A.  ☑ Conventional<br>☐ Other<br>☐ FHA  ☐ FmHA<br>Other: | Amortization Type (Form 1003) | ☑ Fixed Rate  ☐ Other (explain)<br>☐ GPM  ☐ ARM (type) |
| Loan Amount: | $ 550000.00 | Monthly Payments (PI): | $ 2466.00 |
| Type of Loan: | 30 Year Fixed | Closing Costs: | $ 4567.00 |
| Interest Rate: | 6.00 % | Cash From/To borrower: | $ 50000.00 |
| Loan Term (No. of Months) | 360 months | Prepayment Penalty | 0 |
| Amortization Period (Months): | 360 | Balloon After No. Months | |
| APR: | 6.12 % | Lock-in period (days): | 60 |
| Points: | 0 | | |

| New File | New Orders | | | | | |
|---|---|---|---|---|---|---|
| | Order No | Order Date | Property Address | Buyer | Seller | Lender |
| New Orders | 0002 | 10/23/2001 | 12209 Horse Center Rd, N Potomac, Maryland | Ralph Bunch | Yassar Arafat | Bank of America Mortgage |
| Scheduled | 0003 | 10/29/2001 | 6 Big Cave, Kabul, Virginia, 22101 | George Bush | Osama Bin Ladin | Chase Manhattan Mortgage |
| Settled | 0004 | 01/30/2002 | 555 Pine Ave, McLean, Virginia, 22101 | King Tut | Ramses II | GE Capital Mortgage |
| Inactive | 0005 | 04/08/2002 | 567 Happy Street, Pleasantville, Virginia, 22071 | J. Edgar Hoover | Al Capone | Homeside Lending |
| Office Management | | | | | | |

New Orders     / 2920

| Type Service | Type Policy | Status | Abstract | Survey | HOA | Sett. Date | Rescission |
|---|---|---|---|---|---|---|---|
| Title Abstract/Search | Sale | Title Report/Abstract Ordered | O | O | O | 6/7/03 | 6/10/03 |
| Document preparation | Sale | New Order | R | O | PD | 6/15/03 | 6/18/03 |
| Full Escrow Settlement | Refinance | Title Report/Abstract Ordered | R | R | NA | 6/21/03 | 6/25/03 |
| Full Escrow Settlement | Refinance | Commitment Preparation | O | R | R | 6/13/03 | 6/18/03 |

| Order | Buyer | Seller | Property | Sale | Mortgage | Title Insurance | HUD-1 & Accounting | Services | File Drawer |

Ordered by                                            Order Information

Name            Pager:              Order/Case/File              Title Commitment
                                    No                           Date/Time due by
Address:        E-mail:                                          Settlement
                                                                 Date/Time due by
Address:        Contact Name:       Date/Time      07/25/2003    Reminder
                                    ordered                      (days/hrs.prior)
City:           Contact Work        Ordered by                   Date
                Phone:                                           Completed/Issued
State:          Contact Home        Title                        Date Received      07/25/2003
                Phone:
Zip             Contact FAX:
Code:
Phone:          Contact Cell        Order Taken by               Date Approved      07/25/2003
                Phone:
                                    Assigned to:                 Approved By
FAX:            Contact Pager:      Title
                                    Officer
Cell            Contact E-          Escrow                       *Fig. 30*
Phone:          mail:               Officer

Order Details                                Policy Types to be Issued

Type Service         Document preparation         a. ☐ Owner      Amount: $
Requested                                         Policy Type of Transaction: Sale
Fee/Premium Amount $                              b. ☐ Lender     Amount: $
                                                  Policy Fee/Premium Paid By

*Fig. 31*

| Order | Buyer | Seller | Property | Sale | Mortgage | Title Insurance | HUD-1 & Accounting | Services | File Drawer |

| Commitment Summary | Title Report | Title Documents | Endorsements | Requirements | Exceptions |

| Title Document | Number | Brief Description |
|---|---|---|
| ALTA Commitment | | |
| ALTA Commitment Schedule A | | |
| ALTA Commitment Schedule B-Section II | | |
| ALTA Commitment Schedule B-Section III | | |
| ALTA Commitment Schedule C | | |
| ALTA Loan/Construction Policy Schedule A | | |
| ALTA Leasehold Loan Policy Schedule A | | |
| ALTA Loan/Construction Loan Policy Schedule A | | |
| ALTA Residential Policy Schedule A | | |
| ALTA Residential Policy Schedule B | | |
| ALTA Policy Schedule C | | |

*Fig. 32*

| Order | Buyer | Seller | Property | Sale | Mortgage | Title Insurance | HUD-1 & Accounting | Services | File Drawer |
|---|---|---|---|---|---|---|---|---|---|
| colspan | | HUD-1 Entry Screens | | | | | Accounting/Disbursements | | |

| Sections A-H | 100 Gross Amount Due From | 200 Amount Paid by Borrower | Taxes | 400 Gross Amount Due Seller | 500 Reductions To Seller | 700 Commissions | 800 Items Payable With Loan | 900 Items Required In Advance | 1000 Reserves With Lender | 1100 Title Charges | 1200 Record & Trans |

| 100. GROSS AMOUNT DUE FROM BORROWER | |
|---|---|
| 101. Contract sales price | $ |
| 102. Personal property | $ |
| 103. Settlement charges to borrower (line 1400) | $ |
| Adjustments for items paid by seller in advance | |
| 106. City/town taxes $    to | $ |
| 107. County taxes $    to | $ |

Fig. 34

| Order | Buyer | Property | Mortgage | Title Insurance | HUD-1 & Accounting | Services | File Drawer |

| HUD-1 Entry Screens | Accounting/Disbursements |

Deposits | Payments | Receipts & Disbursements | Ledger | Reports — 3420

Online Payment | Write Checks

Select from Payee List:

Payee

Pay from Account:
Amount:
Payment Start Date: MM/DD/YYYY
Payment Frequency:
Number of Payments:
Description (optional):

*Fig. 35*

State of Maryland Land Instrument Intake Sheet

[ ] Baltimore City   [ X ] County: Montgomery

*Information provided is for the use of the Clerk's Office and State Department of Assessments and Taxation, and the County Finance Office only.*

1. Type(s) of Instruments ( [ ] Check Box if Addendum Intake Form is Attached.)

| | | | | |
|---|---|---|---|---|
| 1 Deed | | Mortgage | Other | Other |
| 2 Deed of Trust | | Lease | | |

2. Conveyance Type (Check Box)

| | | | |
|---|---|---|---|
| X Improved Sale | Unimproved Sale | Multiple Accounts | Not an Arms-Length Sale [9] |
| Arms-Length [1] | Arms-Length [2] | Arms Length [3] | |

3. Tax Exemptions (if Applicable) Cite or Explain Authority

- Recordation:
- State Transfer:
- County Transfer:

4. Consideration and Tax Calculations

| Consideration | Amount | Finance Office Use Only |
|---|---|---|
| | | Transfer and Recordation Tax Consideration |
| Purchase Price/Consideration | $ 415,000.00 | |
| Any New Mortgage | $ 332,000.00 | Transfer Tax Consideration $ |
| Balance of Existing Mortgage | $ | x ( ) % = $ |
| Other: | $ | Less Exemption Amount - $ |
| | | Total Transfer Tax = $ |
| Other: | $ | Recordation Tax Consideration $ |
| | | x ( ) per $500 = $ |
| Full Cash Value | $ 415,000.00 | TOTAL DUE $ |

5. Fees

| Amount of Fees | Doc. 1 | Doc. 2 | |
|---|---|---|---|
| Recording Charge | $ 40.00 | $ 40.00 | Agent: |
| Surcharge | $ 0.00 | $ 0.00 | Tax Bill: |
| State Recordation Tax | $ 2,518.50 | $ 0.00 | |
| State Transfer Tax | $ 1,037.50 | $ 0.00 | C.B. Credit: |
| County Transfer Tax | $ 4,150.00 | $ 0.00 | |
| Other | $ | $ | Ag. Tax/Other: |
| Other | $ | $ | |

ABC Title Company, Inc
SUITE 100
10 CONNECTICUT AVENUE
KENSINGTON, MARYLAND 20895
Tel: (301) 946-0000
Fax: (301) 946-1111

ABC Bank, F.S.B.,
3465 E Foot Drive
Oakland, CA 91111

| | |
|---|---|
| Loan Number: | 123456 |
| Our File Number: | 76543 |
| Borrower: | Celestin Bonto |
| Property Address: | 29 Schuler Drive, Silver Spring, MD 20902 |

Enclosed are the following:

| | |
|---|---|
| X | All original documents that were in closing package |
| X | Certified copies of the HUD-1 signed by all parties |
| X | Original Note |
| | Certified copies of the Note |
| | Original Deed of Trust |
| X | Certified copies of the Deed of Trust |
| X | Hazard/binder policy and paid receipt |
| | Check to _____ for $_____ |

Notes:

_____

_____

_____

The undersigned representative of ABC Title Company, Inc. certifies that the disbursements have been made and the documents and other items transmitted herein have been completed. If we can be of further assistance, please feel free to contact our office.

Sincerely,

COMPUTERIZED PROCESS TO, FOR EXAMPLE, AUTOMATE THE HOME SALE, MORTGAGE LOAN FINANCING AND SETTLEMENT PROCESS, AND THE HOME MORTGAGE LOAN REFINANCING AND SETTLEMENT PROCESSES

CROSS-REFERENCE TO RELATED APPLICATIONS

This application is a continuation of and claims priority to U.S. application Ser. No. 16/020,427 entitled "Computerized Process To, For Example, Automate The Home Sale, Mortgage Loan Financing And Settlement Process, And The Home Mortgage Loan Refinancing And Settlement Processes," filed Jun. 27, 2018 by Neil Thomas, which is a continuation of U.S. application Ser. No. 14/948,215 entitled "Computerized Process To, For Example, Automate The Home Sale, Mortgage Loan Financing and Settlement Process, And The Home Mortgage Loan Refinancing And Settlement Processes," filed Nov. 20, 2015 by Neil Thomas, now U.S. Pat. No. 10,037,558, which is a continuation of U.S. application Ser. No. 13/842,205 entitled "Computerized Process To, For Example, Automate the Home Sale, Mortgage Loan Financing and Settlement Process, And The Home Mortgage Loan Refinancing And Settlement Processes," filed Mar. 15, 2013 by Neil Thomas, now U.S. Pat. No. 9,916,007, which is a continuation of and claims priority to U.S. application Ser. No. 12/457,599 entitled "Computerized Process To, For Example, Automate the Home Sale, Mortgage Loan Financing and Settlement Process, And The Home Mortgage Loan Refinancing And Settlement Processes," filed Jun. 16, 2009 by Neil Thomas, now U.S. Pat. No. 8,442,906, which is a continuation of and claims priority to U.S. application Ser. No. 10/979,822 entitled "Computerized Process To, For Example, Automate the Home Sale, Mortgage Loan Financing and Settlement Process, And The Home Mortgage Loan Refinancing And Settlement Processes," filed Nov. 3, 2004 by Neil Thomas, now U.S. Pat. No. 7,548,884, which is a continuation of and claims priority to U.S. application Ser. No. 10/969,242, entitled "Computerized Process To, For Example, Automate the Home Sale, Mortgage Loan Financing and Settlement Process, And The Home Mortgage Loan Refinancing And Settlement Processes," filed on Oct. 21, 2004 by Neil Thomas, now abandoned, which claims priority under 35 U.S.C. 119 to U.S. Provisional Patent Application No. 60/512,776 entitled "Computerized Process To, For Example, Automate The Home Sale, Mortgage Loan Financing and Settlement Process, And The Home Mortgage Loan Refinancing And Settlement Processes" filed on Oct. 21, 2003 by Neil Thomas. The complete disclosures, specifications and drawings of U.S. application Ser. No. 16/020,427, U.S. application Ser. No. 14/948,215, U.S. application Ser. No. 13/842, 205, U.S. application Ser. No. 12/457,599, U.S. application Ser. No. 10/979,822, U.S. application Ser. No. 10/969,242 and U.S. Provisional Application No. 60/512,776 are incorporated herein by specific reference.

BACKGROUND OF THE INVENTION

Technical Field of Invention

The preferred embodiments of the invention relates to a comprehensive computer system for automating and facilitating the performing and processing of tasks, information transfer, and information storage associated with the home sale, mortgage origination and settlement process, and the home mortgage refinancing origination and settlement process, over a distributed computing network.

Discussion of Background References

Traditionally the home sale process, the mortgage origination process and the settlement/title process have been considered to be three entirely separate functions. Typically the real estate company is in one office, the mortgage company in another and the settlement company in still another. They typically have never been looked at as parts of one larger, continuous process, particularly when it comes to technology.

Consequently, real estate sales, mortgage companies and settlement companies use various and differing technology to assist them in performing their respective sale, mortgage and settlement activities. The existing programs for the real estate office do only portions, but not all of the functions for the real estate agent, or real estate sales office of a new home builder; some only access the 'multiple listing service' or MLS, or builder home inventory in the case of the builder, others only create the contract of sale or other contract documents, others keep track of buyers, sellers, and service providers such as home inspectors, termite inspectors, etc., while still other programs only order services.

Similarly, various programs for mortgage origination do portions of the process. Some just send mortgage 'loan quotes' to the borrower and allow them to select a loan, while other mortgage programs are 'point of sale' (POS) programs either for the borrower to interact with a Internet web page to fill in information to request a loan or for a mortgage loan officer to take down the borrower's application information, often use another 'loan origination system' (LOS) to underwrite the loan, and still other mortgage lender programs prepare loan documents such as the note, deed of trust, disclosures, affidavits, etc. after the loan is approved.

Then there are still other programs which the settlement companies use that do strictly the title, settlement and closing functions such as taking orders, ordering services such as title reports and surveys, and preparing the settlement statement (HUD-1), including escrow accounting, and prepare documents such as the title commitment and policy, affidavits, and legal documents such as recording forms, deeds, etc.

In addition to these programs, the real estate agent, the lender and the settlement company may use a combination of e-mail, faxes and phones to communicate with others to complete their part of the process.

These multitudes of programs have limited value and slow the process because users have to rehandle, reenter, and wait for information from other parties; they have limited functionality in common and require use of more than one tool for users to perform their jobs thereby causing needless work, delay and expense.

To date, no one has operationally connected these different existing real estate agent, mortgage lender and settlement technologies together. The so-called 'transaction management' systems, which have been in existence since the late 1990s, have been primarily designed with features for the real estate agent to use, some having a built-in property 'listings' or home database, and a 'contact database' for keeping track of buyers, seller, service providers, etc. They typically combine features for scheduling and tracking tasks, a 'group calendar' for parties to monitor activities and status on the Internet, and for ordering services by the real estate agent, buyer or seller such as inspections and settlement.

A number of these 'transaction management' programs have added additional parties to the process in the form of a 'transaction coordinator' or a 'move consultant' which just adds to the overall cost of doing the process and does not simplify the process.

All of the existing technologies are incomplete, leaving gaps in the process, and as a result they have not been well received in the market place and the overwhelming majority has either gone out of business or has been bought in liquidation proceedings over the past several years. All of these 'transaction management' systems deal with only portions of the over-all home sale, mortgage and settlement process, and still require, among other things, many of the users to reenter information in a separate programs to use this technology, or require their 'integration' with different programs to try to 'connect' the different programs used by the real estate company, mortgage company and settlement company to communicate with each other.

None of these 'transaction management' programs allow, among other things, the lender or the settlement company to perform their respective tasks within these programs. Instead they must continue to use their separate, existing, older technology together with these new programs.

While the lender may receive some loan application information and a settlement company may receive order information from a website, and they may be able to receive documents which are created in other programs and then 'downloaded' by the other parties, and may be able to 'communicate' with others in the process, or view the status on a webpage in the 'transaction management system' this information still has to be transported at some point to their older existing technology to perform their part of the process, either manually by a person, or by 'integrating' the 'transaction management' system with their existing mortgage loan origination or settlement technologies.

There are literally dozens of real estate sale programs, dozens of mortgage origination programs and dozens of settlement and title programs, each having different functions and design structures, field names, etc. To try to integrate all these technologies is very complex, ineffective and costly with the resulting information shared and functionality being limited in scope and therefor the value to the users is limited.

The alternative is to have a loan officer who takes the application wait for and reenter information into their existing loan technology, and then the settlement company personnel have to again wait for reenter information into their existing software and then somehow get it back to the other. If there are any changes, or information is incorrect, then the whole waiting, communication and reentry process begins over again. These 'transaction programs' only allow 'posting' or 'uploading' of lender documents or settlement closing documents to be sent or shared with others. But, none of the programs have provisions for creating these 'other' documents by the lender, settlement companies or others which must be created in their existing separate programs.

Not surprisingly, none of these so-called 'transaction management' programs have been very successful in the market and there have been numerous business failures by the companies which have produced them.

There is, however, no complete program that performs, for example, the entire process home sale, mortgage origination and settlement process in one single technology platform including, for example, all the sale activities of the real estate agent or builder sales office, all the loan origination activities of the mortgage loan office, and all the activities of the settlement company. Similarly, there is no complete program that performs, for example, the entire home mortgage refinancing origination and settlement process in one technology platform.

Some Illustrative Disadvantages of Background References

Some of the many disadvantages of various background references include one or more of the following and/or other disadvantages: incomplete solutions leaving crucial gaps in the process; multiple entry of information; and complex 'patchwork' solutions which try to connect existing real estate, mortgage and settlement technologies which are more costly to build, maintain and upgrade, have less functionality and value for users, result in a more inefficient and slower process, and/or are more prone to errors, mistakes and confusion.

Advantages of Some Illustrative Embodiments of the Invention

In some preferred embodiments, some advantages that may be achieved, if desired, (such as, e.g., with a comprehensive computer system for the entire home sale, mortgage origination and settlement process according to some embodiments described herein) can include, among other things, one ore more of the following and/or other advantages: 1. it reduces work by all parties allowing the process to be highly automated, eliminating and reducing work currently being performed manually; 2. it reduces redundant and repetitive tasks of manually entering the same information numerous times in different computer programs, so information can be entered once for the entire transaction, not just portions of the transaction; 3. it reduces work, time, cost and chances of error associated with having to manually rehandle information numerous times, first having the real estate agent reenter information to perform tasks or transfer to more than one program, having the mortgage company reenter information to perform tasks or transfer to other programs, and then having the settlement personnel have to once again reenter or transfer information to other programs; 4. it allows transaction information to be instantly available to immediately perform additional tasks anywhere in the process; 5. it allows transaction information and status information to be instantly available to all parties as appropriate, thus reducing confusion, delays and uncertainty and chances of errors in the process; 6. it reduces the cost of completing a transaction; 7. it reduces the number of personnel necessary to complete a transaction; 8. it reduces or even eliminates waiting time and reduces the overall time required to complete a transaction; 9. it provides greater reliability which can be built into the process; 10. it assures that important sale and mortgage disclosure information and documents required by law be given to the seller or the buyer, or the refinancing home owner, on a timely basis; 11. it greatly reduces the cost, complexity, unreliability, and design limitations of trying to connect together, or 'integrate' different computer systems, one for the real estate agent, another for the mortgage company, and another for the settlement company, etc., in an effort to perform this process; 12. it results in a system with greater and more functional features for users; 13. it provides a more highly automated system without gaps in the process; in other words, for example, the instant the loan officer does something to approve the loan, the documents can be automatically prepared and sent to the settlement company and the borrower in seconds; 14. it is easier and cheaper to change or modify, add features, or upgrade the system from time to time; this is important with ever-changing technology and constantly changing market conditions; 15. such a comprehensively designed system is more reliable and less likely to malfunction or 'crash'; 16. it is less costly to build and maintain; and/or 17. the process can be simplified, streamlined and made more user friendly by combining, eliminating one or more functions or steps, or presenting information or allowing functions to be performed in a more understandable and efficient way.

SUMMARY OF THE INVENTION

The preferred embodiments of the invention provide, among other things, a comprehensive computer system for automating and facilitating the performing and processing of tasks, information transfer, and storage associated with the home sale, mortgage financing and settlement process, and the home mortgage refinancing origination and settlement process over a distributed computing network in one technology. The technology can, among other things, automate the entire real estate home sale, mortgage loan, and settlement process in one program, including many or all of the activities performed by many or all of the various participants in the transaction: the seller, the buyer, the sales agent, the mortgage loan officer, loan underwriter and loan processor, and the settlement company personnel, as well as service providers such as home inspectors, appraisers, surveyors, title abstractors, etc. It can also be modified to automate just the mortgage refinancing origination and settlement process in one program for the borrower, mortgage loan and the settlement company personnel and corresponding service providers.

The preferred embodiments can be implemented using computer processes that, among other things, automate, change and enhance 'real world' processes currently being used, ineffectively and with significant limitations, by the real estate, mortgage, and settlement markets today. In the preferred embodiments, the computer processes are not needed to be performed using an unusual hybrid system. In some embodiments, in addition to enhancing 'real world' processes and enhancing the way real estate is sold today, the process could be modified for other environments, such as, e.g. for a 'self-help' buyer or seller to use, or a 'for sale by owner' solution without the help of a real estate agent or sales person, could be used on a kiosk in a shopping mall or could be adapted to be used with a 'move consultant' or 'transaction coordinator,' or the like.

In some embodiments, the real estate agent or sales person can send and receive detailed information with the seller and buyer, lender and/or settlement company, enter and search for information on homes for sale from a database, create a listing agreement, a contract of sale and other sale documents and share with others, search for, select a mortgage loan quote, apply for and completely arrange for mortgage financing for the buyer, and/or order and receive services from third-party service providers. In some embodiments, the mortgage lender can provide the buyer a loan quote for various loan products, receive detailed buyer, property and sale information, prequalify or preapprove the borrower for a loan product selected by the borrower, take the full loan application, underwrite, approve and prepare and send all loan documents. In some embodiments, the settlement company can receive orders including some or all of the buyer, seller, property, sale information and/or mortgage loan information and documents, including, e.g. complete lender instructions, and/or can prepare all legal, title and/or settlement documents including the settlement statement with full escrow accounting functions.

In the preferred embodiments, all or substantially all of the processes can be done using one technology platform, such as, e.g., using one base program.

In some embodiments, In the case of a home mortgage refinance, the borrower can, for example, search for, select a mortgage loan quote, enter and send borrower and property information; the mortgage lender can receive detailed borrower, and property information, prequalify or preapprove the borrower for a loan product selected by the borrower, take the full loan application, underwrite, approve and prepare and send all loan documents; and the settlement company can receive orders including all borrower, property information and mortgage loan information and documents, including complete lender settlement instructions, and prepare all legal, title and settlement documents including the settlement statement with full escrow accounting functions.

In some embodiments, the technology allows all or substantially all information to be entered once (and, in some embodiments, corrected if necessary) for the entire transaction, be transmitted instantly over a distributed computing network, either manually or automatically, and made immediately available to all appropriate parties to perform all their respective activities within the same program, as necessary, thus saving time, work and expense.

In some embodiments, a single technology can, in contrast to existing systems, integrate an entire real estate sale, mortgage, and settlement process into one system—connecting the seller, buyer, real estate agent (or sales office in the case of a new home builder), or for a home refinancing with the borrower, and the mortgage loan origination activities for the lender, and settlement activities for the settlement company and service provider activities, allowing each user to perform all the activities for their portion of the process.

In some embodiments, a marked improvement can be achieved over the state of existing technology. Among other things, the preferred embodiments do not require use of one or more separate program for each of the real estate sale office, the mortgage office, settlement office and service providers, which might otherwise allow the performance of only portions of the process and require parties to do repetitive tasks. When combined with many manual tasks which users have to perform such as making phone calls, copying, faxing, etc., current existing technologies require considerable repetitive work, greater delay, greater errors, and more uncertainty.

In some embodiments, there is a separate Virtual Office for each primary user, for example in a real estate sale transaction the real estate office, the mortgage lender, the settlement company, and service providers, allowing each to access appropriate information and perform all the appropriate tasks associated with their roll for each transaction over a secure distributed network. In addition, the seller, the buyer, or home owner if a refinancing, and service providers will be able to access and participate in the process via a 'Virtual Desktop' which allows them to receive order and perform their entire service within this one single technology.

SUMMARY—OBJECTS AND ADVANTAGES OF THE PREFERRED EMBODIMENTS OF THE INVENTION

In some preferred embodiments, objectives and advantages that can potentially be achieved can include one or more of the following: 1. it provides a smoother, simpler, continuous process from the beginning to the end of the entire home sale, mortgage origination and settlement process; 2. it reduces work by all parties allowing the process to be highly automated, eliminating and reducing work currently being performed manually; 3. it reduces redundant and repetitive tasks of manually entering the same information numerous times in different computer programs; so information can be entered once for the entire transaction, not just portions of the transaction; 4. it reduces work, time, cost and chances of error associated with having to manually rehandle information numerous times, first having the real estate agent reenter information to perform tasks or transfer to more than one program, having the mortgage company reenter information to perform tasks or transfer to other programs, and then having the settlement personnel have to once again reenter or transfer information to other programs; 5. it allows transaction information to be instantly available to immediately perform additional tasks anywhere in the process, thus reducing confusion, delays and uncertainty and chances of errors in the process; 6. it reduces the cost of completing a transaction; 7. it reduces the number of personnel necessary to complete a transaction; 8. it reduces or even eliminates waiting time and reduces the overall time required to complete a transaction; 9. it provides for greater reliability to be built into the process; 10. it assures that important sale and mortgage disclosure information and documents required by law be given to the seller or the buyer, or the refinancing home owner, on a timely basis; 11. it greatly reduces the cost, complexity, unreliability, and design limitations of trying to connect together, or 'integrate' different computer systems, one for the real estate agent, another for the mortgage company, and another for the settlement company, etc., in an effort to perform this process; 12. it results in a system with greater and more functional features for users; 13. it provides a more highly automated system without any gaps in the process; 14. it provides a simpler system which is less costly to build and maintain; 15. it is easier and cheaper to change or modify, add features, or upgrade the system from time to time; this is important with ever-changing technology and constantly changing market conditions; 16. it is more reliable and less likely to malfunction or 'crash'; and/or, 17. the process can be simplified, streamlined and made more user friendly by combining, eliminating one or more functions or steps, or presenting information or allowing functions to be performed in a more understandable and efficient way.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE SEVERAL VIEWS OF THE DRAWINGS

The accompanying figures are provided by way of example, without limiting the broad scope of the invention or various embodiments of the invention.

FIG. 1a is a System Overview and Architecture Showing Ancillary Databases & Systems Detail for Home Sale, Mortgage Financing and Settlement Computer Process;

FIG. 1c is a System Overview and Architecture Showing Ancillary Databases & Systems Detail for Home Mortgage Refinancing and Settlement Computer Process;

FIG. 2 is a view depicting Basic Home Sale, Mortgage Financing and Settlement Information and Basic Document Workflow Process;

FIG. 3a is a view depicting Detailed Virtual Real Estate Office Information and Document Workflow Process;

FIG. 3c is a view depicting Detailed Virtual Settlement Office Information and Document Workflow Process;

FIG. 3d is a view depicting Detailed Seller Virtual Desktop Information and Document Workflow Process;

FIG. 3e is a view depicting Detailed Buyer Virtual Desktop Information and Document Workflow Process;

FIG. 4a is a view depicting Virtual Real Estate Office Work Area Summary Information;

FIG. 4b is a view depicting Virtual Mortgage Office Work Area Summary Information;

FIG. 4c is a view depicting Virtual Settlement Office Work Area Summary Information;

FIG. 7 is a view depicting Sample Virtual Office Calendar;

FIG. 8 is a view depicting Sample Virtual Office Tab Table File Drawer;

FIG. 9 is a view depicting Virtual Real Estate Office Transaction Navigator and View;

FIG. 10 is a view depicting Seller Information Tab Table;

FIG. 11 is a view depicting Property Information Tab Table;

FIG. 12 is a view depicting Buyer Information Tab Table;

FIG. 13 is a view depicting Property Search for Home Tab Table with Search Results;

FIG. 13a is a view depicting Property Search for Home Tab Table with Search Results, Loan Information, Service Information, and Ownership Cost Information;

FIG. 14 is a view depicting Property Sale Summary Information Tab Table;

FIG. 15 is a view depicting Contract of Sale (Sample);

FIG. 16 is a view depicting Mortgage Search & Prequalify/Pre-approve Tab Table with Search Results;

FIG. 17 is a view depicting Mortgage Prequalified/Preapproved Letter;

FIG. 18 is a view depicting Mortgage Prequalified/Preapproved Tab Table with Loan Summary Information;

FIG. 19 is a view depicting Services Order New Service Tab Table (Showing Virtual Real Estate Office Services);

FIG. 20 is a view depicting Services Order New Service Tab Table Showing Bidding Status with Bid Results (Showing Virtual Real Estate Office Services);

FIG. 21 is a view depicting Service Provider Virtual Desktop Work Area Showing Bid Request and Order Information Tab Table;

FIG. 22 is a view depicting Service Provider Virtual Desktop Work Area Showing Service Order and Order Information Tab Table;

FIG. 23 is a view depicting Services Order New Service Table Showing Confirmed Order Status (Showing Virtual Real Estate Office Services);

FIG. 24 is a view depicting Virtual Mortgage Office Transaction Navigator and View;

FIG. 25 is a view depicting Mortgage Loan Quote Tab Table;

FIG. 25a is a view depicting Mortgage Loan Quote Tab Table Search Results;

FIG. 26 is a view depicting Mortgage Loan Prequalified/Pre-approved Tab Table Showing Loan Summary;

FIG. 26a is a view depicting Mortgage Loan Prequalified/Pre-approved Tab Table Showing Loan Summary (continued);

FIG. 27 is a view depicting Mortgage Residential Loan Application Form 1003 Entry Tab Tables;

FIG. 28 is a view depicting Mortgage Loan Approved Loan Summary Tab Table;

FIG. 28a is a view depicting Mortgage Loan Approved Loan Summary Tab Table (Continued);

FIG. 29 is a view depicting Virtual Settlement Office Transaction Navigator and View;

FIG. 30 is a view depicting Virtual Settlement Office Order Tab Table;

FIG. 31 is a view depicting Virtual Settlement Office Title Documents Tab Table;

FIG. 32 is a view depicting Virtual Settlement Office Settlement Statement HUD-1 Entry Tab Tables;

FIG. 34 is a view depicting Virtual Settlement Office Escrow Accounting Entry Tab Online Electronic Payment Tab Table;

FIG. 35 is a view depicting Virtual Settlement Office Online Electronic Land Records Recording Transmittal (Sample);

FIG. 36 is a view depicting Virtual Settlement Office Online Electronic Transmittal (Sample).

DETAILED DESCRIPTION OF THE PREFERRED EMBODIMENTS OF THE INVENTION

General Description

The following description sets forth some illustrative preferred embodiments of the invention. It should be understood based on this disclosure that the following description is illustrative and non-limiting and that various modifications, alterations, changes and/or the like can be employed in various embodiments of the invention. In addition, various components of the various embodiments can be replaced with equivalent structures (including presently known equivalents and/or future known equivalents) as would be understood based on this disclosure.

Figure 1:
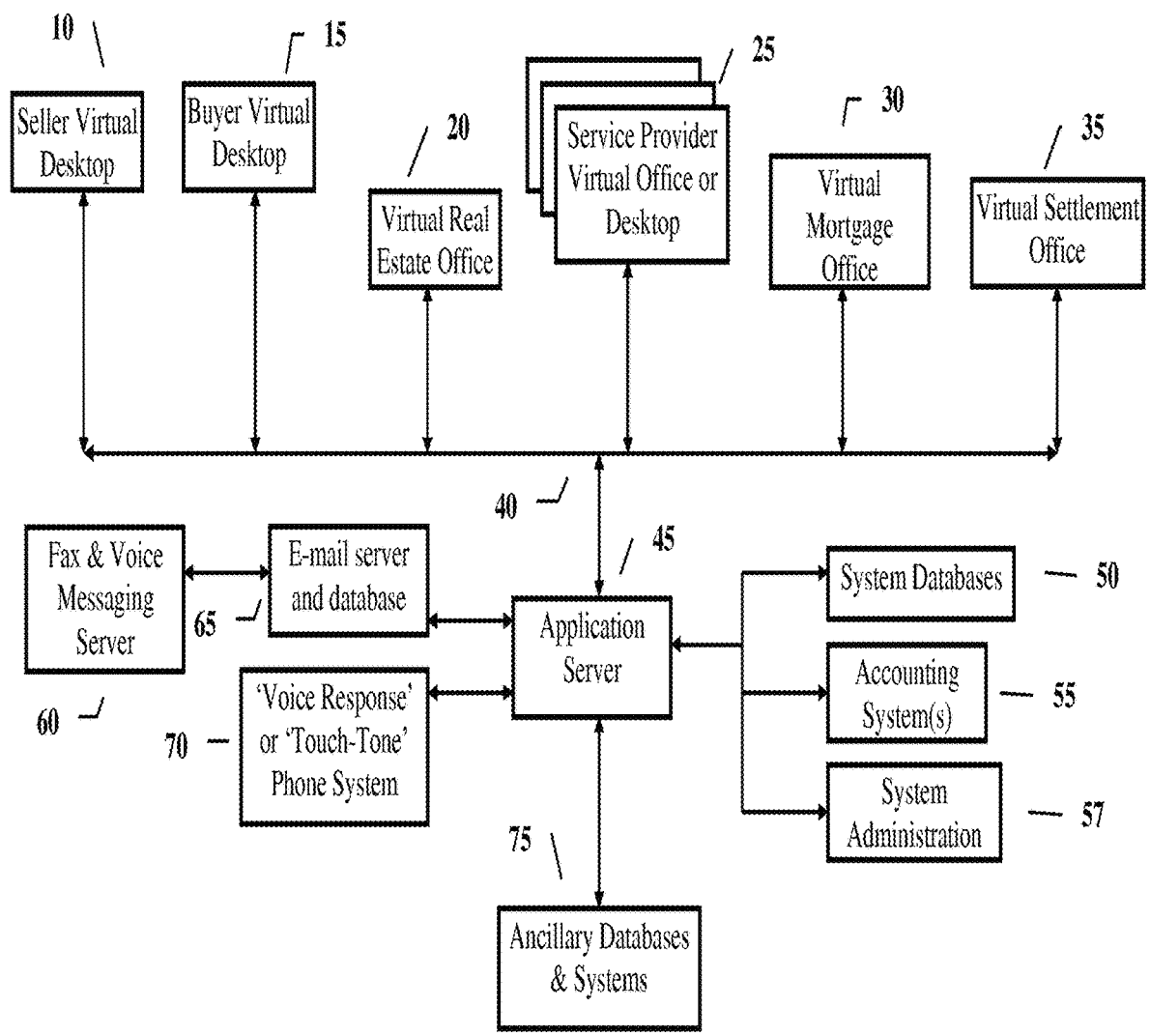
FIG. 1 is a System Overview and Architecture of a Home Sale, Mortgage Financing and Settlement Computer Process.

The preferred embodiments provide, for example, a comprehensive computer system for automating and facilitating the performing and processing of tasks, and information transfer and storage associated with the home sale, mortgage financing and settlement process over a distributed computing network 40 (See FIG. 1). The technology automates the entire real estate home sale, mortgage loan, and settlement process in one continuous computer program, including all the various participants performing all their activities in the transaction: the seller 10 (See FIG. 3*d*), the buyer 15 (See FIG. 3*e*), the real estate sales office personnel 20 (See FIG. 3*a*), the mortgage loan officer, loan underwriter, loan processor and loan closer 30 (See FIG. 3*b*), the settlement company personnel 35 (See FIG. 3*c*), and various service providers 25, (See FIGS. 19-23).

The terms property and home as used herein and in the accompanying drawings should be construed as synonymous and can include, for example, any dwelling such as a single-family home, a condominium, cooperative, mobile home, vacant land for a home, a duplex, or a multiple dwelling unit building.

In this disclosure, the term 'user' of the system used hereinafter includes, inter alia, one or more of the following terms: real estate agent, real estate office, real estate personnel, real estate broker which should be should be construed broadly and read as interchangeable and their functions being performed by one or more of them or the process; in addition, mortgage lender or mortgage office should be construed broadly including, for example mortgage brokers, direct mortgage lenders, mortgage correspondents, wholesale lenders, finders and their personnel and read as interchangeable and their functions being performed by one or more of them or the process; in addition, settlement office or settlement personnel should be construed broadly and may include for example attorneys, title insurance companies and their personnel and read as interchangeable and their functions being performed by one or more of them or the process; service providers and corresponding services should be construed in a very broad sense such as others providing services or information in the process which can include, for example: advertising, delivery, home warranty, well & septic service, real estate signs, architect, home improvement and repairs, construction, home inspection, pest inspection, environmental inspections, moving and storage, landscaping, insurance, appraiser, credit reporting, mortgage insurance, flood certifications, existing loan payoff information from third-party lenders, real estate tax information, HOA disclosure and documents, title abstractor, surveyor, public or private utility providers, entities providing employment, loan, deposit or other verifications for the mortgage lender, public record and title search (title abstract), governmental departments and agencies such as for example land record or court offices, third-party mortgage investors, etc. Mortgage loan financing can include one or more different types of loans, for example, a first mortgage, a second mortgage, a construction loan, home equity financing, or any combination thereof.

Figure 1B:
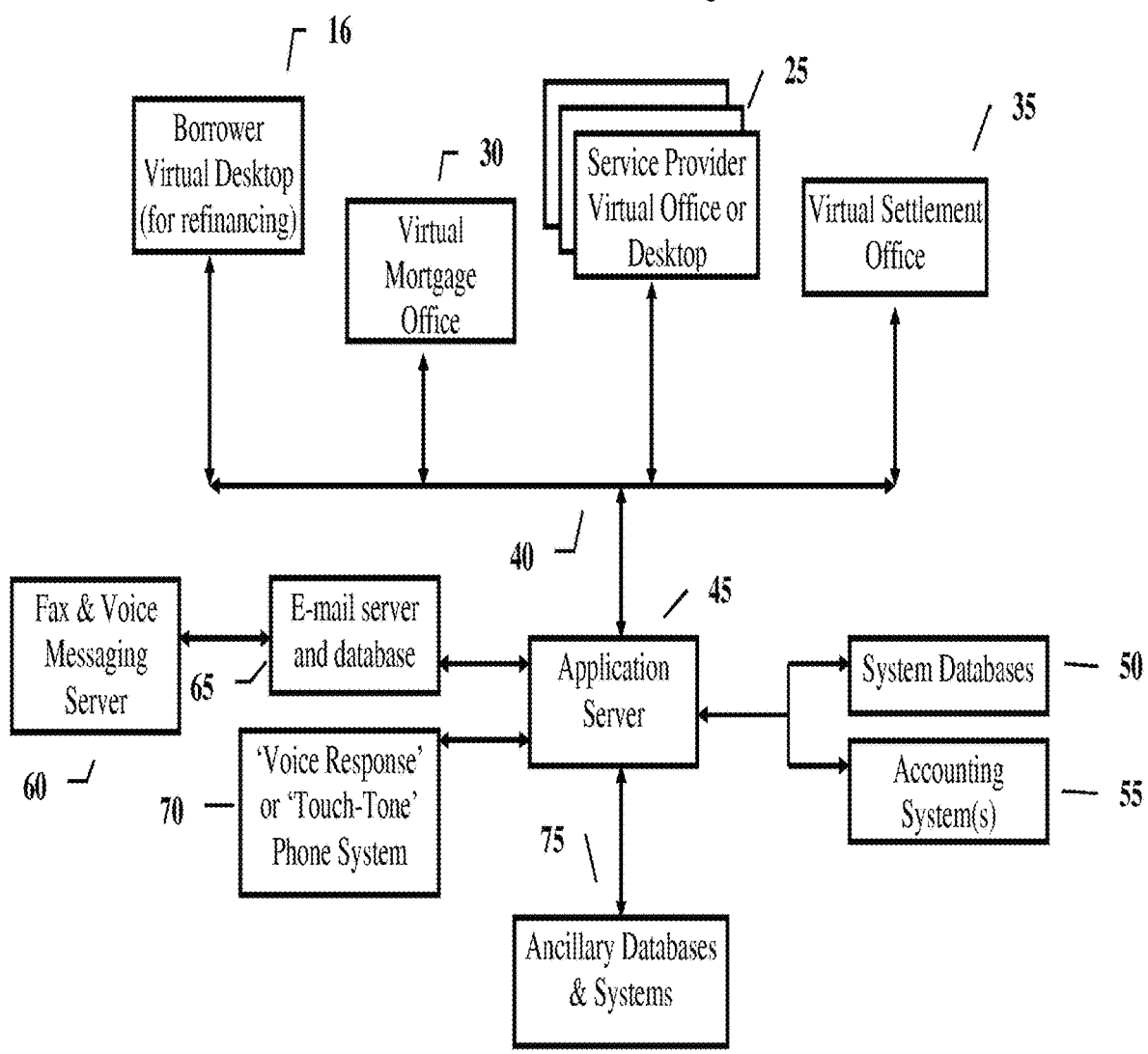
FIG. 1b is a System Overview and Architecture of a Home Mortgage Refinancing and Settlement Computer Process.
Figure 2A:
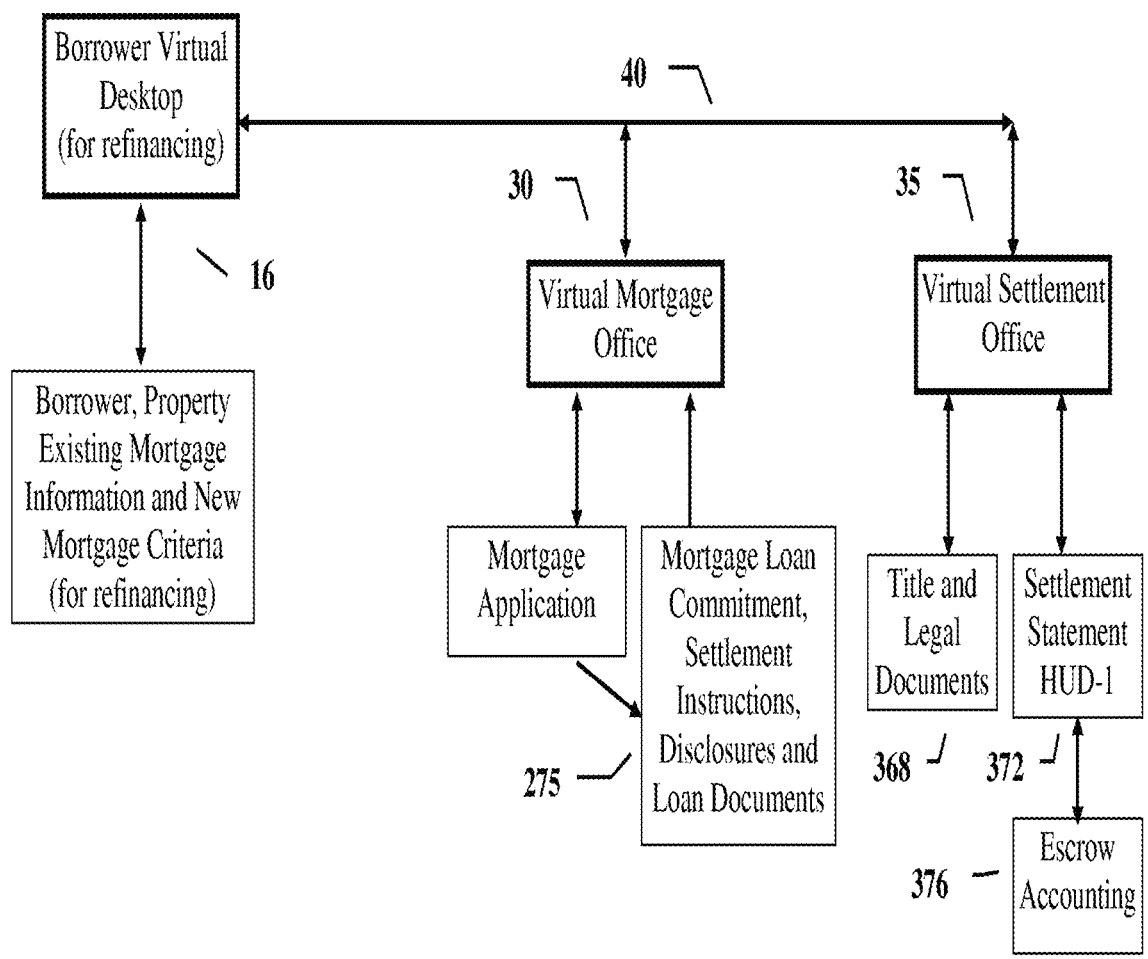
FIG. 2a is a view depicting Basic Home Mortgage Refinancing and Settlement Information and Basic Document Workflow Process.

In addition, a modification of this system is a comprehensive computer system for automating and facilitating the performing and processing of tasks, and information transfer and storage associated with the home mortgage refinancing and settlement process over a distributed computing network (See FIGS. 1*b*, 1*c*, 2*a*). Although the detailed description of the system, hereinafter, describes the home sale, mortgage origination and settlement process, the process, as described, can be modified for the home mortgage refinancing and settlement process (See FIGS. 1*b*, 1*c*, 2*a*) which would, in effect, eliminate the seller, real estate agent and office, sale contract and sale process from the process leaving the buyer a 'borrower' 16 performing the mortgage origination process with the mortgage lender and the settlement company only as well as the respective service providers. In regard to this 'refinancing' modification, the reader should hereinafter disregard references to 'sale,' 'seller,' 'Seller Virtual Desktop', 'builder,' 'Virtual Real Estate Office,' 'real estate sale office' or 'real estate sale personnel,' 'sale contract documents,' 'purchase,' 'deed,' etc. and descriptions of any and all associated 'sale' activities, as well as corresponding references in the drawings such as (See FIGS. 1, 1a, 2) which refer to only the sale process, and substitute the term 'borrower' 16 for 'buyer' 15 and 'Borrower Virtual Desktop' 16 for 'Buyer Virtual Desktop,' 15 etc. in understanding the process for a home mortgage refinancing. In addition, embodiments described herein can be modified, by those in the art based on this disclosure, in other environments, such as, e.g., for either the home sale or the refinance process based on this detailed description.

In the preferred embodiments, computer processes can be used to automate, upgrade and enhance 'real world' processes currently being ineffectively employed by the real estate, mortgage, and settlement markets today. As indicated above, while the preferred embodiments involve a 'real world' process designed for the way real estate is sold today, the process could be modified for a 'self-help' buyer or seller to use, or a 'for sale by owner' solution without the help of a real estate agent or sales person, could be used on, e.g., a kiosk in a shopping mall or could be adapted to be used with a 'move consultant' or 'transaction coordinator,' or an equivalent.

In some of the preferred embodiments, various manipulations herein described are often referred to in terms such as, e.g., adding, entering, requesting, receiving, retrieving, correcting, changing, performing, saving, viewing, sending, comparing, moving, etc. which are often associated with manual operations performed by a human operator. In the preferred embodiments, the various operations described herein are performed, for example either in conjunction with input from a human operator or user interacting with the computer processes, or, when desired, all such operations can be performed by the computer process itself, and should be understood as such.

In the preferred embodiments, a comprehensive technology allows information to be entered once, either manually by a participant, or automatically by a process, or requested and received from ancillary databases or systems 75 (See FIGS. 1, 1a), said ancillary databases or systems being alternatively internal to the system 50, or third-party external ancillary databases or systems, be transmitted over a distributed computing network 40, saved in one or more databases 50, 75, and appropriate information made available at any appropriate times, as necessary, appropriate or expedient, to any other appropriate parties or the application server 45 to perform further activities, tasks, documents or processes of the entire transaction, or subsequently changed or corrected if necessary.

Information may be in various forms and includes, for example text, formulas, computer instructions, graphics, or audio and video whether recorded or transmitted in real-time.

It is noted that ancillary databases or systems may be either internal 50 or external 75 to the basic system described herein, but which, nevertheless, are an integral part thereof.

These ancillary databases or systems can include, for example, some or all of the following: Comparable Sale Database, Multiple Listing Service MLS Database, Builder Home Inventory Database, Digital Lockbox Systems, Utility Provider Systems, Real Estate Document Database, Mortgage Product and Pricing Database, Automated Mortgage Underwriting Applications, Service Provider Forms Database, Credit Reporting Systems, Automated Appraisal Systems, Automated Mortgage Insurance Underwriting, Mortgage Document Database, Mortgage Loan Servicing Systems, Flood Map Certification Systems and Database, Title and Closing Document Databases, Real Estate Tax Databases, Transfer Taxes, Recording Charges Database, Title Plant or Land or Other Public Records Databases.

These databases 50, 75 can include such information as, for example, some or all of the following: seller information, property information, listing information, buyer personal information, buyer home purchase search criteria information, buyer home purchase search criteria results information, real estate sales office information, contract of sale information, buyer employment and financial information, buyer mortgage loan search criteria information, buyer mortgage loan search criteria results information, mortgage loan origination office information, mortgage loan prequalification or preapproval information, mortgage loan application information, mortgage loan underwriting information, approved mortgage loan information, mortgage loan document information, settlement office information, settlement order information, settlement statement information, settlement escrow accounting information, title and recording information, survey information, real estate tax information, flood map information, existing loan payoff information, real estate transfer tax and recording information, service provider information, service provider service information, transaction task and status information.

While the system may be implemented on one computer system such as a single personal computer, it is more likely to be implemented on a distributed computing network 40 (See FIG. 1). The distributed computing network 40 (See FIG. 1) may be a local area network (LAN) or a wide area network (WAN), such as, for example the Internet, a hard-wired or wireless network, or any combination thereof, and most likely will be implemented on the Internet or an Extranet.

The basic process can be varied or augmented numerous ways with such things as: 1. screen layouts and content can be varied; 2. allowing users to input or retrieve information via an Internet device such as a 'digital Internet cell phone' or a 'palm pilot'; 3. portions of the process can be simplified and/or automated, eliminating or combining certain functions, steps or participants, for example by allowing a seller and buyer and seller perform a transaction without the aid of a real estate agent; 4. a customer or user can be allowed to 'input' or retrieve information via a telephone 'voice response' or 'touch-tone' technology 70 (See FIGS. 1, 1b); 5. a system can be developed for multiple companies so that different users will only use portions of the system, i.e. an 'Internet', or one system can be built for one company where everyone within one company, other than the seller, buyer and service providers, use all of the system, i.e. an 'extranet;' or, 6. the process can be simplified and the real estate sales, mortgage and settlement office screens can be combined so that only one or two people could perform the entire process in a fraction of the time; and 7. the order of steps and processes can be varied.

One or more application servers 45 run computer program processes which perform the functions necessary to send and display screens to users to enter and view information, and perform their activities on remote, or local computing devices, such as for example a personal computer connected to the Internet, 10, 15, 20, 25, 30, 35, receive information back from users, process it if necessary, store it in one or more databases 50, send it if necessary for use or processing by one or more ancillary systems or databases 75 (See FIGS. 1a, 1c) such as a multiple listing service or automated mortgage underwriting systems to perform necessary ancillary processes or activities 75 (See FIG. 1*a*) receive back results and save to one or more databases 50 (See FIG. 1) and make it available to all appropriate parties by again sending and displaying screens to users to view and perform subsequent activities on computing devices.

Although and there are numerous computer technologies with which this computer process could be developed and carried out, including connecting together older existing computer programs, such as for example various real estate sales, mortgage and settlement programs, so information can be passed from one program and user to another, the preferred embodiments of the invention, provide a comprehensive client-server technology (See FIG. 1) allowing the users to use a personal computer (PC) with a display to view 'GUI' screens, and common input devices, for example a mouse and keyboard 10, 15, 20, 25, 30, 35 which access an application server(s) 45 over the Internet or over a secure 'Extranet', via TCP/IP 40. The application server(s) 45 would connect to one or more relational databases 50, 75 for transaction data to be saved and retrieved. These databases could be built in typical database programs such as, for example, SQL, DB2 and Oracle, and the application server process could be programmed in such tools as, for example, ASP and DOTNET programming environment from Microsoft, PeopleSoft's 'Portal', or IBM's 'Domino,' 'Websphere' and 'Websphere Portal' in conjunction with using XML, JAVA and HTML or other programming tools. In addition, there are one or more 'ancillary' databases and systems 75, (See FIG. 1*a*) such as, for example real estate sale forms, homes databases, automated mortgage underwriting, mortgage document forms, etc. with which the application server can exchange information. These 'ancillary databases' 75 (See FIGS. 1*a*, 1*c*) may be developed with the system, or they may be provided by third-parties, and accessed via programming tools such as, for example XML.

The preferred embodiments and best mode of carrying out the invention is client-server architecture with one or more application servers 45 which run and manage the process. Actions taken by users on their client computers are processed by the application server 45 which processes information, performs tasks, serves up client user screens on computing devices, sends and retrieves information to and from databases or ancillary computer processes, and distributes information according to one or more application server programs 45 to the various users 10, 15, 20, 25, 30, 35, managing and making the entire process possible.

The terms used hereinafter, such as for example 'application', 'application server', 'computer program,' 'computer process,' 'computer application,' etc., are used interchangeably and deemed for the purposes of this application and claims to mean one or more computer applications performing the computer functions herein described unless otherwise indicated.

As described herein, in various embodiments, one or more server(s), client computer(s), application computer(s) and/or other computer(s) can be utilized to implement one or more aspect of the invention. Illustrative computers can include, e.g.: a central processing unit; memory (e.g., RAM, etc.); data storage (e.g., hard drives, etc.); input/output ports (e.g., parallel and/or serial ports, etc.); data entry devices (e.g., key boards, etc.); etc. In addition, client computers may contain, in some embodiments, browser software for interacting with the server(s), such as, for example, using hypertext transfer protocol (HTTP) to make requests of the server(s) via the Internet or the like.

The system may use one or more relational databases 50 with a variety of structures which may include data categories such as, for example: seller information, buyer information, buyer employment and financial information, property information, listing information, sale information, mortgage information, settlement and title information, etc.

While users may use any form of electrical computing device or general purpose computing machines or devices for clients to access and Interact with the system 10, 15, 20, 25, 30, 35 which could include personal computers, network terminals, digital Internet cell phones, palm pilots or telephone voice response or touch-tone technology, the description herein describes the use of a common personal computer with a display, a keyboard and pointing device such as a mouse. Electronic computing devices may also include any other suitable programmable electronic devices consistent with the invention.

It is pointed out that the order of steps or activities, and whether particular tasks are performed manually or automatically, is flexible and can be programmed to be varied to give the process and users as much flexibility as possible. In addition, various steps may be modified, simplified, and one or more tasks may be combined to simplify and streamline the over-all process. For example, while the description is of a real estate office, mortgage office and settlement office in the process, it is entirely possible to combine their functions into one consolidated set of screens and functions and have virtually the whole process done by only one or two people in one office from one set of screens.

It is pointed out that although the detailed description describes preferred embodiments including one 'real estate sales office' in the process, in some instances there may be two or more such sale offices, for instance where there is a cooperating seller's agent and a buyer's agent. In such circumstances, the process is substantially the same and the resulting change in the process may be easily inferred by the reader.

While, in the preferred embodiments, the processes are 'real world' processes designed for the way real estate is sold today, the process could be modified for other environments, such as, e.g., for a 'self-help' buyer or seller to use, or a 'for sale by owner' solution without the help of a real estate agent or sales person, could be used on a kiosk in a shopping mall or could be adapted to be used with a 'move consultant or 'transaction coordinator,' or equivalent.

It is also pointed out that certain of the drawings herein reflect the 'workflow' of the system, rather than the actual system architecture. In particular, (See FIGS. 2-3*e*) show the process results from the users prospective, rather than the fact that all information, whether the result of user input or processes performed, in most cases is transferred to and from the application server(s) 45 and databases 50, 75.

There are separate graphical user interfaces (GUI) accessible on a personal computer by each user with screens appropriate to their activities. The seller "virtual desktop" 10, (See FIG. 3*d*) the "buyer virtual desktop" 15 (See FIG. 3*e*), the "virtual real estate office" 20 (See FIG. 3*a*), the lender "virtual mortgage office" 30 (See FIG. 3*b*) the settlement company "virtual settlement office" 35 (See FIG. 3*c*) and service providers virtual office or virtual desktop 25 allow each to enter, receive and view appropriate information and perform appropriate tasks associated with their roles in the transaction.

Any tasks and processes performed by any user manually, or by a computer process at any stage of the process immediately make possible 45 any other real estate sale, mortgage loan, settlement or other activities, tasks, processes and creation of documents, either manually or automatically. This avoids gaps and delays.

One aspect of the system that is of importance is that of uniformity and simplification of the process. If one were to look at a number of real estate programs, mortgage origination programs and settlement programs one would see numerous different screen layouts with varying information displayed, all of which would become confusing and daunting very quickly. In researching this process, however, it was realized that much of the information and how it is displayed is similar at each step of the way, and it is only at particular functions that unique screen functions and layouts are necessary. Therefore there are many screens, for example, which appear in the Work Area 450, 550, 650, Tab Tables 460, 560, 660, which are in fact forms and subforms served up and displayed by the application server, such as 'seller information' (See FIG. 10), 'property information' (See FIG. 11), 'buyer information and buyer employment and financial information' (See FIG. 12), 'property search' (See FIG. 13), 'sale summary information' (See FIG. 14), 'mortgage search' (See FIG. 16), 'mortgage loan application' (See FIG. 27), loan underwriting (See FIG. 28), loan summary table (See FIG. 28*a*), and 'ordering services' (See FIGS. 19, 20, 23), which can be displayed with minor modifications of some content, for more than one user; and it is only those screens that are unique to a particular user such as the 'mortgage approved loan' table (See FIG. 28) for the lender, and the settlement order (See FIG. 30) and settlement statement entry tables (See FIG. 32) or escrows accounting (See FIG. 33) for the settlement company that are different. This has greatly simplified understanding and designing the process and will greatly reduce the cost and complexity of building and modifying and adding new features to the system from time to time.

Each virtual office will be one integrated computer program for each user from which they can receive, view, enter, change, save data, perform their particular functions in the transaction, create, save and send all documents, order services from third-party service providers, track the transaction, and communicate with other participants in the particular transaction. The "virtual office/desktop" technology will eliminate many of the current disadvantages of the Internet allowing users to operate their entire office and perform literally 100's of functions without having to navigate back-and-forth or "link" to constantly changing Webpages.

Figure 4:
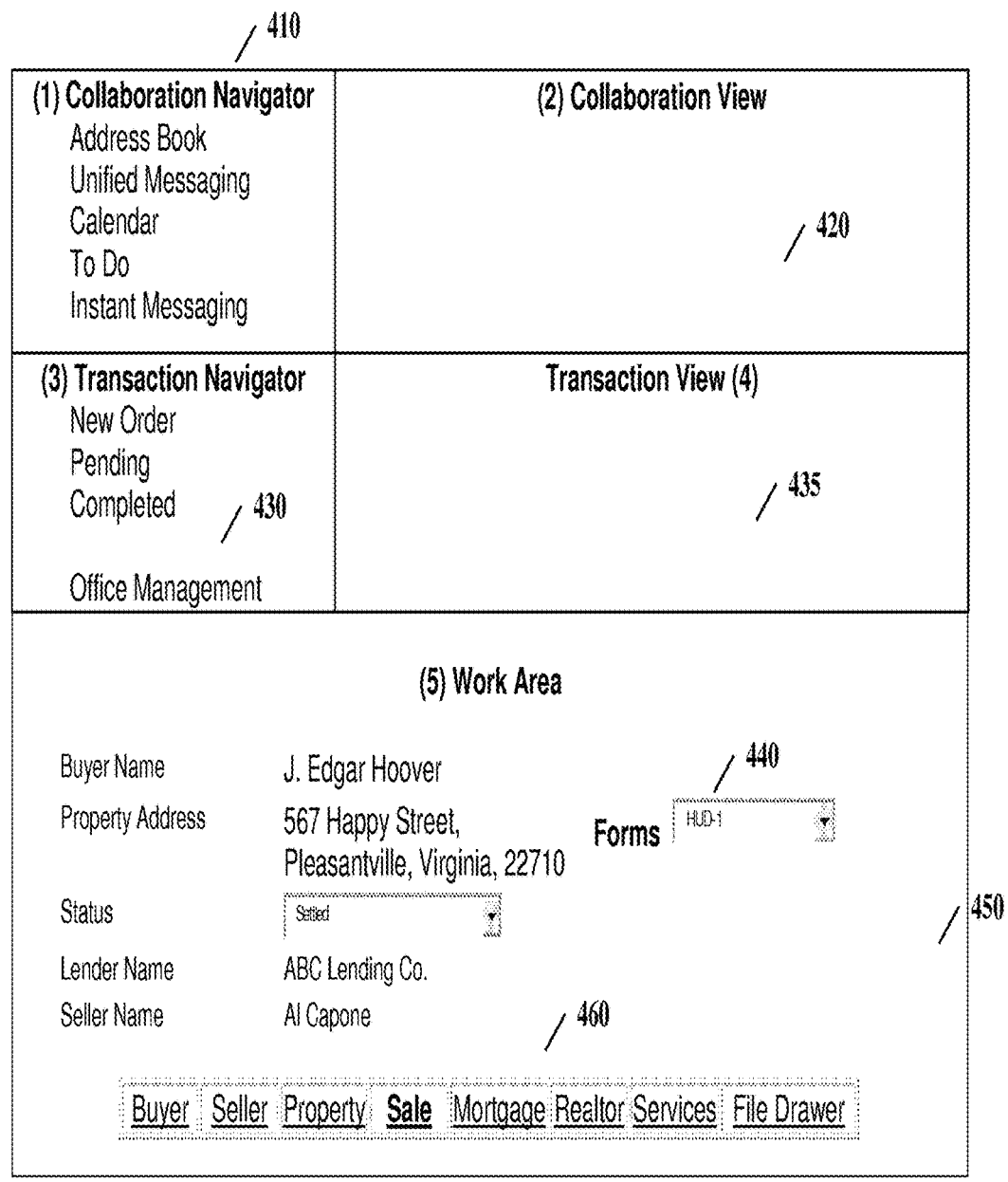
FIG. 4 is a view depicting Virtual Office and Work Area Screen Layout.
Figure 5:
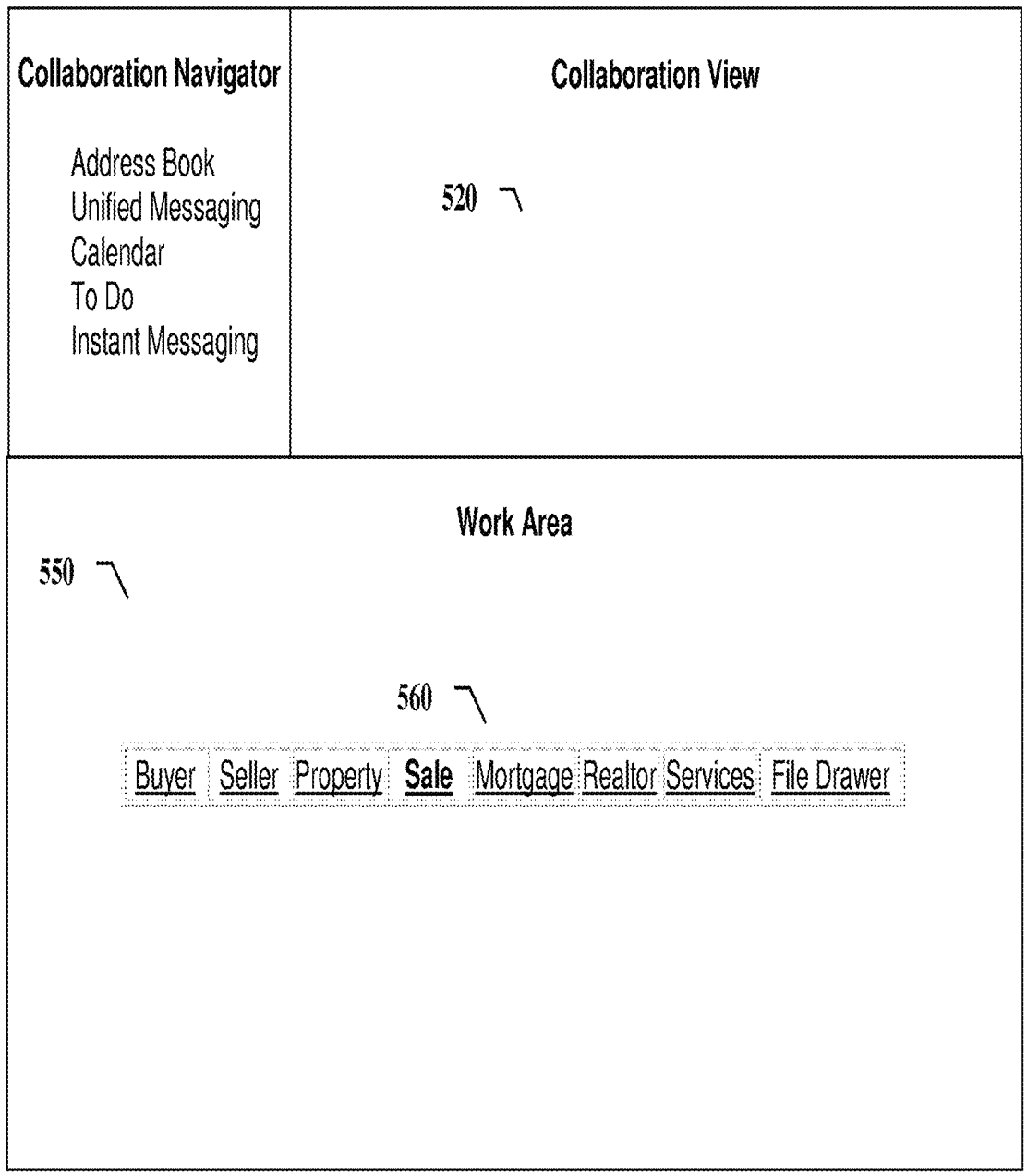
FIG. 5 is a view depicting Customer (Buyer, Seller) Virtual Desktop and Work Area Screen Layout.
Figure 6:
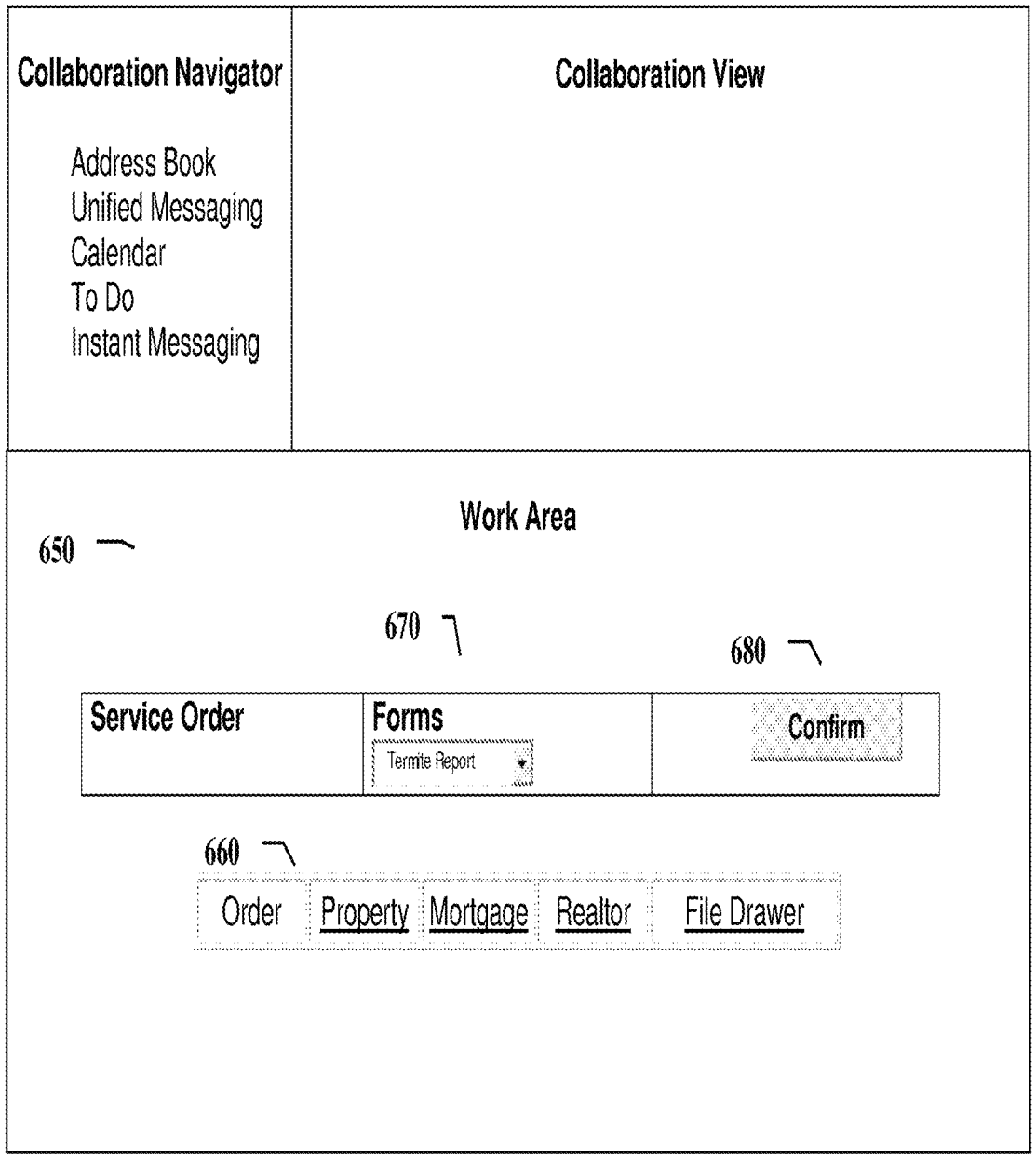
FIG. 6 is a view depicting Service Provider Virtual Desktop and Work Area Screen Layout.

The layout of each virtual office (See FIG. 4) and each customer, buyer or seller, virtual desktop (See FIG. 5), and the service provider virtual desktop or service provider virtual office (Transaction Navigator and Views not shown) (See FIG. 6) will include the following:

The Collaboration Navigator 410, 510, 610 allows a user to select and access a Address Book, Unified Messaging, Calendar, To Do and 'Instant Messaging' by clicking with a pointing device such as a mouse on appropriate item selected to be displayed in the Collaboration View 420, 520, 620. The Collaboration View 420, 520, 620 allows a user to access and 'collaborate' with others in the transaction. These include: 'Unified Messaging' view which allows users to send and receive and view e-mails 65, receive and view all documents created with the technology, and receive voice phone messages and facsimiles from a fax & voice messaging server 60. The user can manually save them to the 'File Drawer' tab (See FIG. 8) in the Work Area 450, 55, 650 for a particular user for a particular transaction, or the program can save items automatically.

The Address Book view allows user to keep and view customer and service provider information such as addresses, phone numbers, e-mail addresses, etc. for customer and 'service provider' contact management. Information in Address Book is integrated with Work Area 450, 550, 650 so that information entered or actions taken in one, are reflected and displayed in the other, and visa-versa.

The Calendar View (See FIG. 7) automatically displays a calendar with appropriate information about transaction events and status, allows users to create and schedule events, meeting times, and 'to do' items as necessary, appropriate or expedient for their tasks or functions. The items can be marked 'private' or 'group' and the 'Group Calendar' is displayed, for all others in a particular transaction to see the event and status of that particular transaction from their respective Virtual Desktop or Virtual Office as necessary, appropriate or expedient for their tasks or functions. The Calendar is integrated with Work Area 450, 550, 650 so that actions taken or information entered in one area are reflected and displayed in the other, and visa-versa.

The To Do View displays items that need to be completed in any particular transaction. To Do items can be created manually by users in the To Do view, in the Work Area, or automatically by the application server 45. The To Do View is integrated with Work Area 450, 550, 650 so that actions taken or information entered in one are reflected and displayed in the other.

Instant Messaging & Application Sharing allows users to use 'instant messaging' ('chat') including voice and audio, and application sharing to simultaneously collaborate on a particular screen or document such as the sale contract documents 255 (See FIG. 15), Loan Application (Form 1003) (See FIG. 27) or Settlement Statement (HUD-1) on a 'real-time' basis with other parties in the transaction. For application sharing, the application server 45 allows two or more users to display a screen, enter and save information on a real time basis, thus eliminating waiting for and having to send information back and forth. Important 'chat' sessions can be recorded and saved to the appropriate File Drawers (See FIG. 8) for a permanent record.

The Transaction Navigator 430, 910, 2410, 2910 (See FIGS. 4, 9, 24, 29), which is only used in the virtual office configuration, automatically displays, sorts and tracks stages of each transaction. As there are significant changes in the status, for example 'new order,' 'pending,' 'completed,' etc., the computer application automatically moves the particular transaction into a different stage category. Users can view transactions by each status by selecting a particular status category in the Transaction Navigator 430 which then displays summary information of all transactions within that status category in the Transaction View 435. Customers (i.e. buyer or seller) will not have this Transactions Navigator in their Virtual Desktop and service providers will have it in their Service Provider Virtual Office, but not in their Service Provider Virtual Desktop.

The Transactions View 435, 920, 2420, 2920 (See FIGS. 4, 9, 24, 29), which is only used in the 'virtual office' configuration, automatically displays summary information for each 'transaction' for example for a real estate sale, buyer, seller, property address, contract price, status of sale and displays individual tasks necessary to complete a particular transaction, for example 'signs', 'inspections,' 'advertising,' etc. and displays the status of each, for example 'ordered,' 'past due,' 'completed,' 'approved,' etc. The computer program allows user to sort transactions by criteria by clicking on column heading. User can select a particular transaction by clicking on that transaction in the Transaction View 435, 920, 2420, 2920 (See FIGS. 4, 9, 24, 29) and the transaction details are then displayed in the Work Area 450 allowing user to access detailed transaction information and to perform tasks for that particular transaction. Customers (i.e. buyer or seller) will not have this Transactions View in their Virtual Desktop and service providers will have it in the Service Provider Virtual Office, but not in the Virtual Desktop.

The Work Area 450, 550, 650 (See FIGS. 4, 5, 6) allows users to access particular transaction details in the Work Area by selecting and clicking on the transaction in the Transaction View screen, if they have one. The Work Area allows users to perform tasks, enter or view detailed information. Each Virtual Office Work Area will have Summary Information 440 (See FIGS. 4, 4a-c). In the Work Area Summary Information users can create documents. For example the real estate agent can create real estate sale contract documents 440, 255 (See FIG. 15), the lender can create loan documents, 470, and the settlement company can create settlement, legal or title documents 485. The status can be manually changed 445, 460, 480, or automatically changed by the program upon occurrence of certain actions performed anywhere in the computer program or by certain events occurring. To create documents in the Work Area, a 'Document Database' 100, 120, 127 can be accessed, a form selected, automatically filled in with all information which already exists in the system, or manually entered, edited, printed and saved and sent to others in the particular transaction, so they can view them in their respective Collaboration View 420, 520, 620 when they receive them or in their respective 'File Drawer' (See FIG. 8).

Detailed information is entered into and viewed by users, and functions are performed, in various Work Area Tab Tables 460, 560, 660 (See FIGS. 8, 10-14, 16, 18-20, 23, 25-28a, 30-33). These are accessible in the 'Work Area' 450, 550, 650 and users can navigate from one table to another by selecting a particular tab such as by 'clicking' with a 'mouse' to view information in that particular table such as 'Order Information' (See FIG. 30), 'Buyer Information' (See FIG. 12), 'Seller Information' (See FIG. 10), etc. to enter or change information, and perform various transaction tasks associated with their role in the process such as ordering services (See FIG. 19), accessing electronic documents saved in the 'File Drawer' (See FIG. 8), etc. Tab Table screens are dynamic forms which the application server 45 allows to be displayed by each client. Some tab tables are 'dynamic,' meaning as information is entered, or actions are performed, the layout and information presented changes automatically on the screen to allow the user to proceed with the process more easily. To make the system as easy to develop and operate as possible, many basic 'tab tables' are used by more than one user. Also the various tab tables can be varied, by adding or creating new ones, deleting, modifying the contents, or changing their order on screens. Various "tab tables" and the information they contain or the functions they perform can be varied in numerous possible ways, and are described in more detail below.

When it is described that documents can be signed electronically it includes, for example, any necessary electronic notary signatures, seals, etc., or other electronic authentication deemed acceptable by users and required and allowed by appropriate laws. Similarly, electronic certifications or verifications may be any deemed acceptable by users and required and allowed by appropriate laws.

The computer program saves, either automatically or manually, all appropriate documentation including e-mails, faxes, and phone messages 65 in one or more system databases 50 for a complete record of each transaction which can be viewed by users in an electronic File Drawer (See FIG. 8). User can save and access a document as necessary, appropriate or expedient, for their tasks or functions in the File Drawer (See FIG. 8) by clicking on the 'File Drawer' tab 810, selecting a particular document, and 'clicking on the document to open the document for review or editing, etc.

The 'Office Management' in the Transaction Navigator 430, 910, 2410, 2910 (See FIGS. 4, 9, 24, 29) will allow a user to access and perform general 'back office' support features in the Work Area 450 such as integrated billing accounting functions, including billing and payments for transactions, management functions such as integrated summary production and activity reports. The 'Office Management' will have other office administration functions of a more general nature such as human resources, etc.

System administration 57 can be done from one or more central regional or individual office locations from one or more computing devices for performing such function as, for example, adding and deleting customers, service providers, customer support and training, managing customers, billing functions, managing system modifications and upgrades, etc. Management and administration can be done as a service for customers or customers or their organizations such as for example a multiple listing service provider, a Realtor association, etc. can operate and manage the system for them.

Virtual Real Estate Office

Figure 3B:
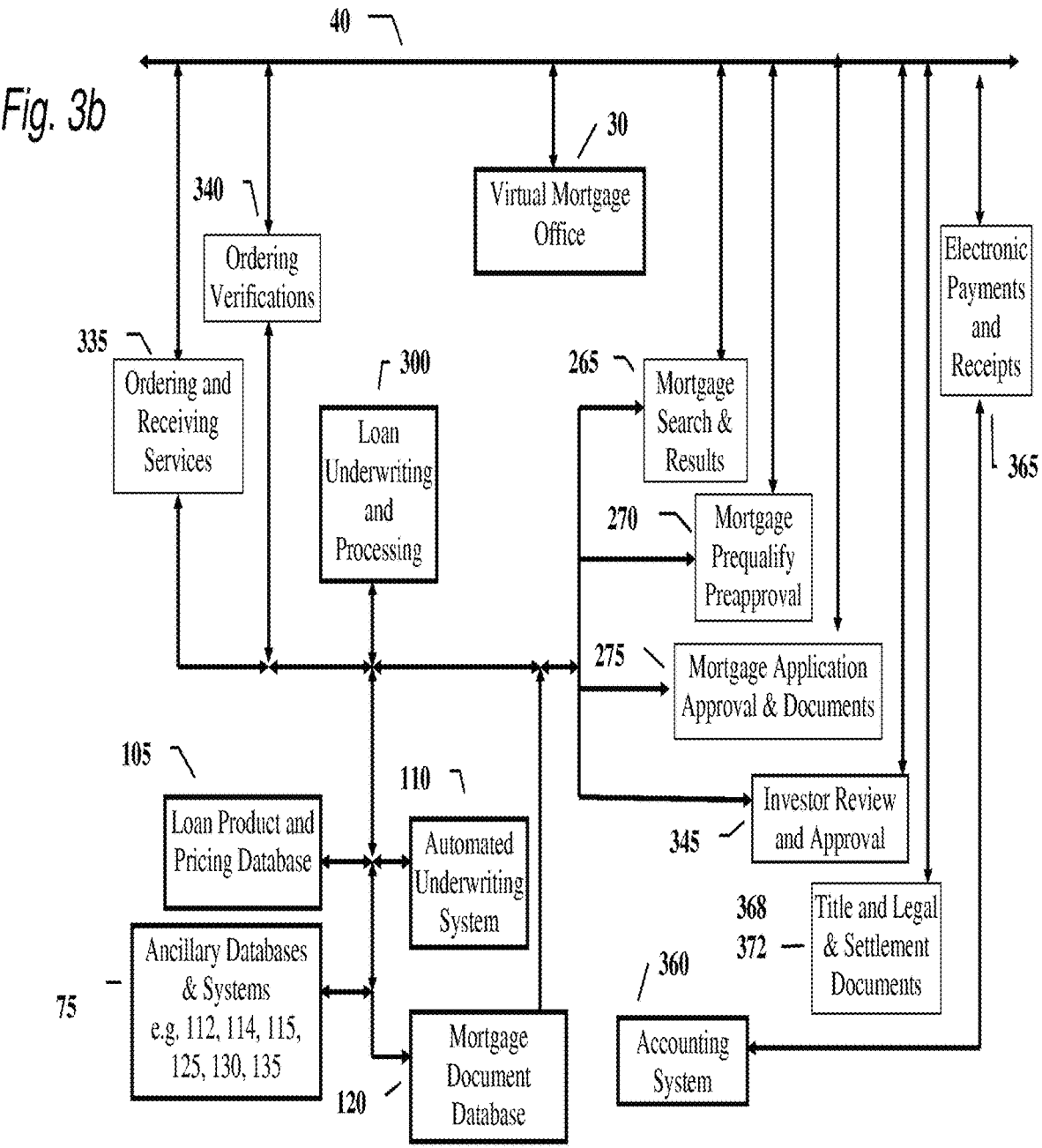
FIG. 3b is a view depicting Detailed Virtual Mortgage Office Information and Document Workflow Process.

The Virtual Real Estate Office 20 (See FIGS. 1, 2, 3a) will allow the real estate agent and their staff (or home builder sales office) to perform all of their transaction activities from one comprehensive computer program; to receive, communicate and exchange information with buyer 15 (See FIG. 3e) and seller 10 (See FIG. 3d), mortgage company 30 (See FIG. 3b), and settlement company 35 (See FIG. 3c) request bids for and order and track services 235 from service providers 25, such as home inspections, advertising, insurance, settlement services, or utilities changes, send and receive information with the 'multiple listing service' (MLS) 85 (or the home builder's subdivision inventory database) 90, create listing agreements 220, a Sale Contract and other sale documents 440, 255 (See FIG. 15), assist the home buyer to search for a loan 265, be prequalified, preapproved, 270 apply for and be approved for a loan, and secure documents 275, from a mortgage lender 30 (See FIG. 3b). Information entered, documents created, or functions performed by the real estate office personnel or by the application server 45 are saved by the application server 45 into one or more databases 50, 75 and are made available for further functions to be performed, and appropriate documents and information made available to other people participating or steps in the transaction, for example the buyer, the seller, the mortgage lender, the settlement company and service providers, as necessary, appropriate or expedient, through an automated or manual workflow process managed by the application server 45.

Specifically, the Virtual Real Estate Office has the following functionality:

The Virtual Real Estate Office 20 (See FIG. 3a) can receive the prospective seller(s) information 210 (See FIG. 10), and property information 210 (See FIG. 11) (in the case of the real estate agent as opposed to a builder) entered by the Seller in the Seller Virtual Desktop 10, 210 (See FIGS. 3d, 5) or alternatively, the real estate agent user can enter and save information manually and directly into the Virtual Real Estate Office 20, 210 (See FIGS. 3*a*, 10, 11) for example taking information by phone or with the customer physically present.

The sale person or agent user can choose and create various marketing documents and materials, retrieving and opening forms 440 from a forms database 50, 100 and create customer prospecting and marketing flyers, reports, or other marketing materials. The program automatically, or user manually can search and retrieve 'comparable sale information' from a Comparable Sale Database 80 and input into the Comprehensive Market Analysis (CMA) report and marketing plan, according to criteria chosen by user, and save and send to Seller Virtual Desktop 10.

In the case of real estate agent, user can automatically enters seller, property and listing information into the listing agreement forms 220 retrieved from the real estate document database 100 and user can send completed listing to the Seller Virtual Desktop 10 and receive back listing agreement electronically signed by seller 220 (See FIG. 3*d*).

In the case of the real estate agent, property and listing information can be saved 50 internally and sent and entered into separate, internal or external, 'Multiple Listing Service' (MLS) database 75, 85, 450 (See FIGS. 1*a*, 3*a*, 4*a*).

The Virtual Real Estate Office can receive information from a Digital 'Lockbox' System 95 which tracks agent and prospective buyer activity entering the home for viewing; the system automatically sends electronic messages activity report 231 when a house is entered for showing, and a message to the buyer or buyer agent identified asking for comments, which when received is displayed in activity report 231 with buyer and agent comments in the Virtual Real Estate Office 20 (See FIG. 3*a*) and in Seller Virtual Desktop screens 10 (See FIG. 3*d*).

The Virtual Real Estate Office (real estate agent or builder) 20 (See FIG. 3*a*) can receive information from Buyer Virtual Desktop 15 (See FIGS. 1, 3*e*, 5) entered by the Buyer in the Work Area Tab Tables 560 (See FIG. 5) for example, about the buyer(s) personal information 240 (See FIG. 12) income, debts, assets for down payment for mortgage search, prequalification, preapproval and loan application 240 (See FIGS. 16, 27) and criteria for home purchase such as, for example location, home style, number of bedrooms, number of baths, and price range desired 240 (See FIG. 13); or alternatively, real estate agent user can enter information directly into Virtual Real Estate Office 20, 240 (See FIGS. 3*a*, 4, 12, 16, 13, 27) manually, for example taking information by phone or with buyer physically present.

The real estate agent (or builder) from the Virtual Real Estate Office 20, 240 (See FIGS. 3*a*, 4), or the Buyer from the Property tab in the Buyer Virtual Desktop 15, 240 (See FIGS. 5, 3*e*) can enter home criteria 240 and search (See FIG. 13) home database, either internal or external 50, 75, for example from the MLS for the real estate agent 85 or the Builder Home Inventory Database 90 with the criteria for home purchase 1330 (See FIG. 13) and retrieve home information including pictures, video and maps matching buyer's purchase criteria as to, for example price, style, number of bedrooms, number of baths, location, etc. 1350 (See FIG. 13) and buyer can select one or more homes for more detailed information including, for example, maps, pictures, video and audio (See FIG. 11), viewing, and eventually selecting one on which to submit a contract offer 440, 255 (See FIG. 15). Searches and search results can be saved 50 for use later by the Virtual Real Estate Office or by the Buyer Virtual Desktop.

User can select the appropriate forms 440 (See FIGS. 4, 4*a*) from the Real Estate Document Database 100 to create sale contract documents 440, 255 (See FIG. 15) and any addenda. The application server 45 automatically enters all appropriate seller, buyer, property and listing information stored in the system databases 50 into sale contract forms 100 or user can manually add or change information as desired or necessary.

The sale contract documents 440, 255 (See FIG. 15) can be sent to the Buyer Virtual Desktop 15, 255 (See FIGS. 5, 3*e*) for buyer review and manual or electronic signature and which can be received back from buyer and saved. Sale contract documents 440, 255 (See FIG. 15) offer can then be sent to Seller Virtual Desktop 10, 255 (See FIG. 3*d*) (or seller's agent's Virtual Real Estate Office) and receive back accepted contract, or counteroffer from seller or seller's agent; or it can be printed or faxed to seller or seller's agent. If a counter offer is made by the seller 255 (See FIG. 3*d*), the process is repeatable by parties sending the contract of sale back and forth until a final agreement is reached; or alternatively the parties may access the sale contract documents 440, 255 (See FIG. 15) simultaneously using application sharing and negotiate the terms and conditions on a real-time basis.

At some point in the contract process, application server 45 can receive from the Buyer Virtual Desktop an electronic payment of the contract of sale deposit 417 from an account designated by the buyer 419 and send to an account previously designated by the real estate office in the Virtual Real Estate Office 285, 280.

Real estate agent or builder, with buyer present or on the phone, can fill in mortgage loan information and criteria including, for example, the buyer(s), income, debts, assets for down payment, 240, 1630 (See FIGS. 3*a*, 16) and home purchase criteria 240, 1330 (See FIGS. 3*a*, 13), or contract of sale information 1630, 240 (See FIGS. 3*a*, 12, 16) and send 265 directly to one or more lenders' Virtual Mortgage Offices 30, 265 (See FIGS. 3*b*, 25) for manual quotes and underwriting, or to a centralized mortgage product and pricing database 75, 105 and automated underwriting system 110 for mortgage loan quotes, and computer program 45 sends mortgage loan quotes results 265, 1660 (See FIGS. 16, 25*a*) back to Virtual Real Estate Office 20, 265 and Buyer Virtual Desktop 15, 265 as well as to respective lenders' Virtual Mortgage Office 30, 265 (See FIGS. 3*b*, 25-25*a*). The users may elect to skip this step and it may be combined with the loan application steps, below to streamline the process.

Buyer can receive and review mortgage loan quotes 1660 on the Virtual Real Estate Office 20, 265 (See FIG. 3*a*) with the real estate agent, if physically present, or on the Buyer Virtual Desktop 15, 265 (See FIG. 3*e*) select a particular loan quote 1660 (See FIG. 16), and send a request for prequalification or preapproval to a lender 30, 270 (See FIG. 3*b*).

Virtual Real Estate Office 20 (See FIG. 3*a*) can receive and buyer if physically present accept a loan prequalification or preapproval letter 270 (See FIG. 17) for a particular loan, together with mortgage loan documents including, for example Good Faith Estimate, Truth in Lending, and other disclosures together with any conditions sent from lender 30, 270 (See FIG. 3*b*) and lender can receive buyer's acceptance of loan prequalification or preapproval letter or agreement (See FIG. 17) in Virtual Mortgage Office 30, 270 (See FIGS. 3*b*, 26, 26*a*).

The Virtual Real Estate Office 20 and the Buyer Virtual Desktop 15 can display buyer loan prequalification/preapproval summary information 270 (See FIG. 26a) in the Work Area Tab Tables.

The Virtual Real Estate Office 20 (See FIG. 3a) can display one or more loan application screens, such as, for example, Residential Loan Application Form 1003 (See FIG. 27) containing all appropriate buyer, property, sale and loan information already entered 275 (See FIG. 3a) and information can be entered or changed manually, signed with the buyer present, and sent to the Virtual Mortgage Office 275 (See FIGS. 3b, 27). Alternatively, the buyer 15, lender 30, and real estate office 20 can access the loan application simultaneously using application sharing and jointly enter or change information on a real-time basis.

The Virtual Real Estate Office 20 can display buyer loan application summary information 275 (See FIGS. 3a, 28a).

The Virtual Real Estate Office 20 and the Buyer Virtual Desktop 15 receive final loan approval, including summary information 275 (See FIGS. 3a, 28a), and all loan documents 810 (See FIG. 8) including, for example loan commitment, disclosures sent from mortgage lender's Virtual Mortgage Office 30 (See FIGS. 3b, 28, 28a) and receive verification of buyer accepting loan commitment 275.

The Virtual Real Estate Office can display approved loan summary information 275 (See FIGS. 3a, 28a).

Real estate agent or builder 20 can enter service providers information into system database to create list of providers for performing services from time-to-time, order services either manually or automatically 235 (See FIGS. 3a, 19-23) and track services 235, 920 (See FIGS. 3a, 7, 9) from third-party service providers 25 such as, for example, home inspections, signs, advertising, settlement services (See FIG. 30), or utilities changes; all appropriate information already in system is automatically entered into appropriate fields; user can request and receive quotes (bidding) from one or more different service providers (See FIGS. 20, 21) select a quote and order a service, receive a confirmation from service provider 2220 (See FIGS. 22, 23) track services ordered 920 (See FIGS. 7, 9) and service providers can prepare electronic reports and documents 2020, 2120 (See FIGS. 20, 21) and real estate agent can receive completed service provider reports 235 (See FIG. 3a). All information entered into electronic service provider reports 2020, 2120 is automatically entered 45 into system databases 50, 75 to be used later as necessary in the process.

Service providers can send electronic invoice for charges 2240 (FIG. 22) and the real estate office can send electronic payments (ACH) 285 to third-party service providers for any services.

Virtual Real Estate Office 20 can receive settlement statement (HUD-1) 372 and appropriate title and legal documents 368 sent from Virtual Settlement Office 35 (See FIG. 3c) for review prior to settlement and user can respond with questions, comments or changes back to Virtual Settlement Office 35.

Virtual Real Estate Office 20 can receive final signed settlement statement (HUD-1) 372 and appropriate title and legal documents 368 sent from Virtual Settlement Office 35.

Virtual Real Estate Office 20 can receive commission payments 285, 378 electronically from Virtual Settlement Office 35 escrow account 376 (See FIG. 3c).

The computer program has a complete real estate office accounting system 55, 280 (See FIG. 3a) accessible from Transaction Navigator 'Office Management' 430, 910 (See FIGS. 4, 9) viewable in the Work Area Tab Tables 450, 460, which allows user to perform complete accounting functions integrated with each sale transaction including for example, contract of sale deposit escrow, commission accounting, receipts, disbursements, reconciliation, statements and reports.

Virtual Real Estate Office accounting system allows electronic (ACH) receipts 285, such as electronic receipt of the contract of sale deposit from the buyer 417 or receipt of broker sale commissions from settlement 376, 378 (See FIG. 3c), and electronic disbursements such as paying service provider charges such as, for example advertising and signage fees 285 (See FIG. 3a).

The Virtual Real Estate Office saves, either automatically or manually, all appropriate information 45, 50 and documentation including, for example e-mails, faxes, phone messages, and any transaction documents created in the process which can be displayed in an electronic 'File Drawer' (See FIG. 8) for a complete record of each transaction.

The Virtual Real Estate Office Transaction Navigator 430, 910 (See FIGS. 4, 9) automatically tracks stage of each seller, buyer, or sale for example 'Prospect,' 'Listings,' 'Contracts,' 'Sold' as activities are completed.

The Virtual Real Estate Office, Transaction View 435, 920 (See FIGS. 4, 9) automatically displays summary information and organizes, tracks, and summarizes status of activities for all transactions, for example 'signs', 'inspections,' etc. and displays their status for example; 'ordered,' 'past due,' 'completed,' 'approved,' etc.

Virtual Real Estate Office automatically displays appropriate information about transaction schedules, events, meetings, and status of activities in an electronic calendar 420 (See FIGS. 4, 7) or screens as necessary, appropriate or expedient, for their tasks or functions.

Virtual Real Estate Office allows users to perform management reporting functions 430 including, for example creating summary, production, activity, analytical reports, consolidated sale transaction information for multiple sale persons or offices, production comparison reports etc. by assembling and consolidating 45 data 50 in various formats and displaying in various screens 20 for review and use by management personnel.

Seller Virtual Desktop

The Seller (Customer) Virtual Desktop 10 (See FIGS. 3d, 5) allows the seller to enter, receive, and send information to, and share documents with others in the sale process. The Seller Desktop contains the Collaboration Navigator 510 and Collaboration View 520 including: Address Book, Unified Messaging, Instant Messaging, and Group Calendar which displays meetings, activities and events for the transaction, and the Work Area Tab Tables 550 (See FIG. 5) to input and review information, and perform tasks. Seller can select a 'tab table' in the Work Area by clicking on it 560, enter or view detailed information 210 in that particular table such as 'Seller Information' (See FIG. 10), 'Property Information' (See FIG. 11), 'Sale Information' (See FIG. 14), or order services (See FIG. 19), or view appropriate documents such as, for example, marketing, listing, sale contract, or settlement documents, etc. in the 'File Drawer' (See FIG. 8). Information entered, documents created, or functions performed by the seller, or by the application server 45, are saved by the application server 45 into one or more databases 50, 75 and are made available for further functions to be performed, and appropriate documents and information made available via a network 40 to other people participating or steps in the transaction, for example the buyer, the real estate office personnel, the mortgage lender, the settlement company and service providers, as necessary, appropriate or expedient, through an automated or manual workflow process managed by the application server 45.

Specifically, the Seller (Customer) Virtual Desktop has the following functionality:

Seller can enter seller(s) personal information (See FIG. 10) and property information 210 (See FIG. 11) and save in system 45, 50, 75; information is sent by the application server 45 to the Virtual Real Estate Office 20, and made available to others via a network 40, for example, to the Virtual Mortgage Office 30, Service Providers 25, and Virtual Settlement Office 35 as necessary and appropriate.

Seller Virtual Desktop 10 can receive and seller can review marketing materials, information and documents including, for example, letters, brochures, flyers, and a comprehensive market analysis (CMA) report sent from Virtual Real Estate Office 20 (See FIGS. 1, 3*a*).

Seller can receive listing agreement and documents 220 (See FIG. 3*d*) sent by Virtual Real Estate Office 20, review and accept by electronic signature, save, and send back to Virtual Real Estate Office, or print, sign and deliver physically.

Seller Virtual Desktop can receive information on agent and prospective buyer activity entering house for viewing 95 which is displayed in activity report 231 sent from Virtual Real Estate Office 231 with buyer and agent comments.

Seller Virtual Desktop 10 (See FIG. 3*d*) can receive sale contract documents 440, 255 (See FIG. 15) sent from Virtual Real Estate Office 20; seller can accept by electronic signature, save and send back to Virtual Real Estate Office 255, or print and manually accept and deliver, or make counter offer by making changes to sale contract documents, save and send back to Virtual Real Estate Office 255 (FIG. 3*a*), or print and manually accept and deliver counter offer; if a counter offer is made by the seller, the process is repeatable by parties negotiating the terms and conditions back and forth until final agreement; or the parties may access the sale contract documents simultaneously using application sharing and negotiate the terms and conditions on a real-time basis, and save.

The seller can order 385 (See FIG. 19) and track services (See FIG. 7) from third-party service providers 25 such as, for example home inspections, home repairs, utilities changes, moving services, etc.; all appropriate information already in system is automatically entered into appropriate fields; user can request and receive quotes (bidding) from one or more different service providers (See FIGS. 19, 20, 21), select a quote and order a service, receive a confirmation from a service provider 2220 (See FIGS. 22, 23), track services ordered, for example, in a calendar (See FIG. 7) and receive completed service provider reports prepared by service provider 2120 (See FIG. 21). All information entered by seller, or service providers into any electronic 'service provider reports' is automatically entered 45 into system databases 50 to be used later as necessary or appropriate in the process.

Service provider can send electronic invoice for charges 2240 and the seller can send electronic payments (ACH) 391 to third-party service providers for any services.

The seller can receive settlement statement sent (HUD-1) 372 and appropriate legal and title documents 368 from Virtual Settlement Office 35 (See FIG. 3*c*) for review prior to settlement and respond with questions, comments or changes back to Virtual Settlement Office 35 (See FIG. 3*c*).

The seller can electronically sign settlement statement (HUD-1) 372 and appropriate legal and title documents 368 and send to settlement company 35 (See FIG. 3*c*) to conduct electronic online settlement.

Seller can receive final, signed settlement statement (HUD-1) 372 and appropriate title and legal documents 368 sent from Virtual Settlement Office 35 (See FIG. 3*c*) including electronic confirmation of settlement and all final, signed post closing and post recording documents including for example, electronic certifications or verifications as necessary, appropriate or expedient.

The seller can electronically receive sale proceeds 391 from Virtual Settlement Office 35, 378 (See FIG. 3*c*) deposited directly into an account designated by seller 393 in the Seller Virtual Desktop.

Seller Virtual Desktop 10 (See FIG. 3*d*) can save 45, 50, either automatically or manually, all appropriate documentation, including for example e-mails 65, faxes, phone messages 60, sale contract, mortgage loan and title, legal and settlement documents for a complete record of the transaction, and view in an electronic File Drawer (See FIG. 8).

Seller Virtual Desktop automatically displays appropriate information about transaction schedules, events, meetings, and status of activities, for example, in an electronic calendar (See FIG. 7) or screen as necessary, appropriate or expedient for their tasks or functions.

Buyer Virtual Desktop

The Buyer (Borrower 16, (See FIGS. 1*b*, 1*c*, 2*a*) for refinancing) Virtual Desktop 15 (See FIG. 3*e*) allows the buyer to enter, receive, and send information to, and share documents with, others in the sale process (See FIGS. 1, 2, 3*a-e*). The Buyer Desktop (See FIG. 5) contains the Collaboration Navigator 510 and Collaboration View 520 including: Address Book, Unified Messaging Group, Instant Messaging & Application Sharing, and Group Calendar and the Work Area 550 and Tab Tables 560 to input and review information, and perform functions. Buyer can select a 'tab table' 560 in the Work Area by clicking on it, enter or view detailed information in that particular table such as 'Buyer Information' and buyer employment and financial information, (See FIG. 12), 'Sale Information' (See FIG. 14), ('Property Information' (See FIG. 11) and existing mortgage financing for a refinancing 16) order services, or view documents such as the sale contract documents, mortgage documents or legal and title documents and settlement documents, etc. in the File Drawer (See FIG. 8). Information entered, documents created, or functions performed by the buyer, or by the application server 45, are saved by the application server 45 into one or more databases 50, 75 and are made available for further functions to be performed, and appropriate documents and information made available to other people participating or steps in the transaction (See FIGS. 1, 2), for example, the seller, the real estate office personnel, the mortgage lender, the settlement company and service providers, as necessary, appropriate or expedient, through an automated or manual workflow process managed by the application server 45.

Specifically, the Buyer Virtual Desktop 15 (See FIG. 3*e*) has the following functionality:

The buyer can enter personal information 240 (See FIGS. 3*e*, 12).

The buyer can enter criteria such as, for example, price, style, number of bedrooms, number of baths, location, for home purchase 240, 1330 (See FIG. 3*e*, 13), search 245 home database (MLS Database or the Home Builder Inventory Database) 75, 85, 90, and retrieve home information 245, 1350 (See FIGS. 11, 13) including pictures, video and maps matching buyer's purchase criteria, and buyer can select one or more for viewing, and eventually one on which to submit a sale contract offer. Searches and search results can be saved 50 for use later.

In the case of a refinancing, borrower 16 (See FIGS. 1b, 1c, 2a) can also enter property information (See FIG. 11) and existing mortgage information to be paid off with new financing.

The buyer can prepare sale contract documents in Buyer Virtual Desktop 255, if for example buyer is a 'self-help' buyer, or receive sale contract documents 255 from Virtual Real Estate Office 20, 255 (See FIG. 3a), if there is a real estate sales agent, review and sign by electronic signature and send back to Virtual Real Estate Office (See FIG. 3a), or print, sign and deliver physically; buyer can receive back sale contract documents from either Virtual Seller Desktop 10 (See FIG. 3d) in the case of a 'for sale by owner,' or the Virtual Real Estate Office 20, 255 signed by seller; if a counter offer is made by the seller, the process is repeatable by parties negotiating the terms and conditions back and forth until a final agreement; or alternatively the parties may access the contract of sale and addenda simultaneously using application sharing and negotiate the terms and conditions on a real-time basis.

At some point in the contract process, the buyer can elect to send from the Buyer Virtual Desktop 15 (See FIG. 3e) an electronic payment of the contract of sale deposit 417 from an account designated 419 by the buyer to an escrow account previously designated in the Virtual Real Estate Office 285, 280 (See FIG. 3a).

The buyer 15 (Borrower 16 (See FIGS. 1b, 1c, 2a) for refinancing) can enter information, for example, about the buyer(s), income, debts, assets for down payment, 240, 1630 (See FIG. 16), and home purchase criteria 1330, 240 (See FIGS. 3e, 13) or sale contract information (See FIG. 15) (Borrower 16 (See FIGS. 1b, 1c, 2a) can enter property information (See FIG. 11) and existing mortgage financing for refinancing) and send 265 (See FIG. 3e) to one or more lenders' Virtual Mortgage Offices 265 (See FIGS. 3b, 25) for a manual quote made by one or more lenders, or to a centralized mortgage product and pricing database and automated underwriting system 105, 110 (See FIG. 1a) for mortgage loan quotes and application server 45 sends loan quote results 1660 (See FIG. 16) back to Buyer Virtual Desktop 265 (See FIG. 3e), to the Virtual Real Estate Office 265 (See FIG. 3a), and to respective lenders' Virtual Mortgage Office 265 (See FIGS. 3b, 25a). The users may elect to skip this step and it may be combined with the loan application steps 275 below to streamline the process.

Buyer can review mortgage loan quotes on the Buyer Virtual Desktop 265, 1660 (See FIGS. 3e, 16) and buyer can select a particular loan quote, and send a request 270 (See FIG. 3e) for prequalification or preapproval back to a particular lender 270 (See FIG. 3b).

Buyer can receive and accept a loan prequalification or preapproval letter 270 (See FIGS. 17, 3e) for a particular loan, together with other documents such as, for example, mortgage loan disclosures including Good Faith Estimate, Truth in Lending, and other disclosures, from lender 270 (See FIG. 3b); and lender receives back buyer's acceptance of loan prequalification or preapproval letter (See FIG. 17) in Virtual Mortgage Office 270 (See FIGS. 3b, 26, 26a), and acknowledgement of receipt of any disclosure documents as necessary.

Buyer Virtual Desktop and Virtual Mortgage Office can display buyer loan prequalification/preapproval summary information 270 (See FIGS. 3e, 26-26a).

Buyer Virtual Desktop can display one or more loan application screens, for example, Uniform Residential Loan Application Form 1003 or equivalent 275 (See FIGS. 3e, 27) containing all appropriate buyer, property, sale and loan information already entered into system 50, 75; or appropriate information can be entered or changed manually by buyer and electronically sign and send to mortgage lender 275 (See FIG. 3b), or by printing and physically signing and delivering or sending by facsimile to the mortgage lender; or the buyer, lender and real estate office may access the loan application simultaneously using application sharing and jointly enter or change information on a real-time basis.

Buyer Virtual Desktop 15, 275 (See FIG. 3e) can receive any verification forms including, for example, Verification of Employment, Verification of Deposit, Verification of Loan, or information required as a condition of loan sent by lender from Virtual Mortgage Office, enter and verify information, and send back to lender Virtual Mortgage Office 30, 275 (See FIG. 3b).

The buyer can send electronic payment 417 for, for example, any application, credit report or appraisal fees, etc. to lender 365 (See FIG. 3b) from Buyer Virtual Desktop 15 (See FIG. 3e).

Buyer Virtual Desktop can display loan application summary information 275 (See FIGS. 3e, 28a).

Buyer Virtual Desktop 15 can receive final loan approval, including summary information 275 (See FIG. 3e, 28a) and loan documents, including, for example loan commitment, disclosures and all appropriate loan documents sent from mortgage lender's Virtual Mortgage Office 30, 275 (See FIG. 3b). Buyer Virtual Desktop can display approved loan summary information (See FIG. 28a).

The buyer can order 421 (See FIGS. 3e, 19) and track services (See FIG. 7) from third-party service providers 25 (See FIGS. 6, 19, 22, 23) such as, for example, home inspections, home repairs, utilities changes, moving & storage services, etc.; all appropriate information already in system is automatically entered into appropriate fields; user can request and receive quotes (bidding) 421, 2030 (See FIG. 20) from one or more different service providers 25, 2130 (See FIG. 21) select a quote 2030 and order a service, receive a confirmation 2340 (See FIG. 23) from service provider 2220 (See FIG. 22), track services ordered in a calendar (See FIG. 7), and receive completed service provider reports 2120, 2210. All information entered by service provider, including, for example, into electronic service provider reports is automatically 45 entered into system databases 50, 75 to be used later as necessary in the process.

Service provider can send electronic invoice 417, 2240 (See FIG. 22) for charges and the buyer can send electronic payments 417 to third-party service providers for any services received.

The buyer 15 can receive the settlement statement (HUD-1) 372 and appropriate title and legal documents 368 sent from Virtual Settlement Office 35 (See FIG. 3c) by settlement company for review prior to settlement and respond with questions, comments or changes back to Virtual Settlement Office.

The buyer can electronically sign settlement statement (HUD-1) 372 and appropriate legal and title documents 368 and send to settlement company 35 (See FIG. 3c) to conduct electronic online settlement.

The buyer can send funds required on settlement statement electronically 417 from a separate account 419 designated by buyer in the Buyer Virtual Desktop to settlement company Virtual Settlement Office 35, 378, 376 (See FIG. 3c).

Buyer can receive final, signed settlement statement (HUD-1) 372 and appropriate title and legal documents 368 sent from Virtual Settlement Office 35 (See FIG. 3c) including electronic confirmation of settlement and all final, signed post closing and post recording documents including for example, electronic certifications or verifications as necessary, appropriate or expedient.

Buyer Virtual Desktop 15 can save 45, 50, either automatically or manually, all appropriate documentation, including for example e-mails 65, faxes, phone messages 60, sale contract, mortgage loan and title, legal and settlement documents for a complete record of the transaction, and view in an electronic File Drawer (See FIG. 8).

Buyer Virtual Desktop automatically displays appropriate information about transaction schedules, events, meetings, and status of activities in an electronic calendar 520, (See FIG. 7) or screen as necessary, appropriate or expedient, for their tasks or functions.

Service Provider Virtual Desktop and Virtual Office

The Service Provider Virtual Desktop 25 (See FIG. 6) or the Service Provider Virtual Office 25 (See FIG. 4) allows service providers such as, for example, a home inspection company, appraiser, pest inspection company, mortgage insurance company, title abstractor, or surveyor to receive a request for a bid (See FIG. 21), a quote, or a service (See FIG. 22), respond accordingly, by providing a bid or quote 2130 (See FIG. 21), or confirming an order 680, 2220 (See FIG. 22) sent to the user requesting the service 235, 335, 366, 385, 421. The computer program will allow a service provider to access electronic forms 670, 2120, 2210 (See FIG. 6) from a database of forms 111 appropriate to their functions, enter information and create service reports such as, for example, a pest inspection report, a mortgage insurance commitment, appraisal report or title search report (abstract of title), which can then be sent manually or automatically upon completion to the user requesting the service 235, 335, 366, 385, 421. Information entered, documents created, or functions performed by a service provider or by the application server 45, are saved by the application server 45 into one or more databases 50, 75 and are made available for further functions to be performed, and appropriate documents and information made available to other people participating or steps in the transaction, for example the seller 10, the buyer 15, the real estate office personnel 20, the mortgage lender 30, the settlement company 35 and other service providers 25, as necessary, appropriate or expedient, through an automated or manual workflow process managed by the application server 45.

Requests for services can be done manually by users, or programmed to automatically occur when users perform certain tasks.

The Service Provider Virtual Desktop 25 (See FIG. 6) contains the Collaboration Navigator 610 and Collaboration View 620 for communication with others in the transaction, and the Calendar (See FIG. 7) which displays information about appointments, or deadlines pertaining to the service provided.

The Service Provider Virtual Desktop also includes Work Area 650 (See FIG. 6) and Tab Tables 660 (See FIGS. 21, 22). A service provider can select a 'tab table' in the Work Area 660 (See FIGS. 21, 22), view information in that particular table such as 'Order Information' (See FIGS. 21-22) which contains order and service information, or buyer (See FIG. 12), seller (See FIG. 10), property (See FIG. 11) and transaction information, and other Tab Tables to enter information and perform functions necessary to respond to an order for the service requested, and send to the particular requesting user. The service provider can designate a financial account and can send electronic invoice for charges 2240, and the party requesting service can send electronic payments 285, 365, 378, 391, 417 for any services performed.

Alternatively, the Service Provider can also use a Service Provider Virtual Office configuration (See FIG. 4) containing the Transaction Navigator 430 and Transactions View 435, if, for example, the Service Provider is a frequent user of the system and wishes to have these features to keep track of more than one order. In some embodiments, all the other features and functions of the Service Provider Virtual Desktop described herein are available and can be performed from the Service Provider Virtual Office, and visa versa, In addition, a service provider can request services from additional third-party service providers, such as, for example a home improvement contractor requesting services from a landscaper.

Specifically, the Service Provider Virtual Desktop (See FIG. 6) or Service Provider Virtual Office (See FIG. 4) has the following functionality: the service provider 25 can receive a request for a bid, request for a quote (See FIG. 21) or request for service (See FIG. 22) and respond by providing a bid 2130, a quote or confirm an order 680, 2220, 2340 (See FIG. 22); the service provider can receive all information 460, 660 stored in or available from the system 45, 50, 75 as necessary, appropriate or expedient, for their tasks or functions; the service provider can access electronic forms 111, 440, 670, 2120, 2210 (See FIG. 6) appropriate to their functions such as, for example a pest inspection report, title abstracting report, appraisal report 2120, 2210, enter information and create service reports, electronically sign if appropriate; the service provider can create billing or invoice information 2240 for the service provided, the service provider can send service reports or confirmation of completed service and billing information, if any, to user requesting such service (See FIGS. 1, 1b); the computer process can save all service information 45, 50, 75 to be used in the process as necessary, appropriate or expedient; the service provider can receive payment for any charges for services electronically from separate account designated by user requesting service 285, 365, 378, 391, 417 to a separate account designated by a service provider; the service provider can save 45, 50, either automatically or manually, all appropriate documentation, including for example e-mails 65, faxes, phone messages 60, sale contract, mortgage loan and title, legal and settlement documents for a complete record of each transaction, and view in an electronic File Drawer (See FIG. 8); can automatically display appropriate information about transaction schedules, events, meetings, and status of activities is automatically displayed in an electronic calendar (See FIG. 7) or screen as necessary, appropriate or expedient, for their tasks or functions.

Virtual Mortgage Office

The Virtual Mortgage Office 30 (See FIG. 3b) will allow one or more persons including, for example the mortgage loan officer, loan processor, loan underwriter and loan closer to perform all tasks and activities associated with completion of the loan origination process from one comprehensive computer program; receive, communicate and exchange information with buyer 15 (See FIG. 3e), real estate agent or builder 20 (See FIG. 3a), receive requests for and send loan quotes 265, pre-qualify or pre-approve borrower 270 receive and enter loan application information 275 order and track verifications 340, order and track services such as, for example, appraisals, mortgage insurance, and credit reports 335, underwrite, process and approve the loan 300, either manually or using automated loan underwriting 110, and create 120, send and save loan documents 275, 50 including disclosures. Information entered, documents created, or functions performed by the mortgage office personnel, or by the application server 45, are saved by the application server 45 into one or more databases 50, 75 and are made available for further functions to be performed, and appropriate documents and information made available to other people participating or steps in the transaction, for example the buyer 15, the seller 10, the real estate office personnel 20, the settlement company 35 and service providers 25, as necessary, appropriate or expedient, through an automated or manual workflow process managed by the application server 45.

Specifically, the Virtual Mortgage Office has the following functionality:

The Virtual Mortgage Office 30 (See FIG. 3*b*) receives through the application server(s) 45 preliminary information 265 (See FIG. 25) including, for example, the type of transaction, buyer(s) employment, and financial information, income, debts, assets for down payment 1630 (See FIGS. 12, 16), home purchase criteria 1330 (See FIG. 13), sale contract information 255 (See FIGS. 14, 15), property information (See FIG. 11), type of loan product of interest entered into the Virtual Real Estate Office 265 (See FIG. 3*a*) by the real estate agent, or into the Buyer Virtual Desktop 265, 1630 (See FIGS. 3*e*, 16) by the buyer for loan quotes (See FIG. 25); or user can enter manually into screens, for example taking information on phone call or with borrower physically present. The users may elect to skip this step and it may be combined with the loan application steps, below, to streamline the process.

Mortgage personnel can manually enter and display qualifying loan products and pricing information 265 (See FIG. 25*a*) meeting buyer/borrower and transaction criteria, or alternatively information is sent by application server 45 to ancillary product and pricing database 105 and 'automated underwriting' (AU) programs 110 retrieving and displaying qualifying loan products and pricing information, loan quotes meeting buyer/borrower criteria and transaction (See FIG. 25*a*). The users may elect to skip this step and it may be combined with the loan application steps, below, to streamline the process.

Loan quotes meeting criteria are sent back manually or by application server 45 and displayed (See FIG. 16) in Virtual Mortgage Office 30, 265 (See FIGS. 3*b*, 25*a*), the Buyer Virtual Desktop 15, 265 (See FIGS. 3*e*, 16) and Virtual Real Estate Office 20, 265 (FIGS. 3*a*, 16) from which buyer can select a quote 1660 and send a prequalification or preapproval request to the lender 270.

The Virtual Mortgage Office 30 receives from the application server 45 the prequalification or pre-approval request 270 (See FIG. 3*b*) sent from Buyer Virtual Desktop 15, 270 (See FIG. 3*e*) or Virtual Real Estate Office 20, 270, 1660 (See FIGS. 3*a*, 16).

Personnel 30 can manually or the application server 45 can automatically create, save and send loan prequalification or preapproval letter (See FIG. 17) to Buyer Virtual Desktop 15, 270 and Virtual Real Estate Office 20, 270 including, for example, any Good Faith Estimate, Truth in Lending, and other disclosures, and summary loan information is displayed (See FIG. 18) in the Virtual Mortgage Office (See FIG. 3*b*), Buyer Virtual Desktop (See FIG. 3*e*), and Virtual Real Estate Office (See FIG. 3*a*).

Virtual Mortgage Office 30 (See FIG. 3*b*) receives buyer/borrower's electronically signed acceptance of loan prequalification or preapproval letter or agreement and any other documents necessary 270 from buyer/borrower either from the Buyer Virtual Desktop 15 or Virtual Real Estate Office 20.

Virtual Mortgage Office 30 can display prequalification or preapproval summary information (See FIGS. 26, 26*a*).

Virtual Mortgage Office 30 (See FIG. 3*b*) can display one or more loan application screens 275 (See FIG. 27) for example a Uniform Residential Loan Application Form 1003 or equivalent containing all appropriate buyer, property, sale and loan information already entered into system, or user can enter and save information manually, for example taking information on phone call or with buyer present; or buyer and real estate agent may access loan application screens and enter or change information directly from the Buyer Virtual Desktop 15, 275, (See FIGS. 3*e*, 27) and Virtual Real Estate Office 275 (See FIGS. 3*a*, 27) or, the buyer, lender and real estate office may access the loan application simultaneously using application sharing and jointly enter or change information on a real-time basis.

Virtual Mortgage Office can send 340 any request for verification forms 120 required as a condition of loan to Buyer Virtual Desktop 15, 275 and receive back information or documents completed and electronically signed by buyer/borrower.

Virtual Mortgage Office 30 can send requests for verification 340 including, for example, Verification of Employment, Verification of Deposit, Verification of Loan, etc. to appropriate third-parties electronically, for example, by sending e-mail with directions to a URL to confirm information which third-parties, such as banks, lenders, creditors can access to review, change, add or verify information, electronically sign and return, and Virtual Mortgage Office 30 can receive back electronically signed verification responses 340 (See FIG. 3*b*).

Virtual Mortgage Office 30 can receive electronic payment of any mortgage, credit report or appraisal fees 365 from buyer/borrower from Buyer Virtual Desktop 15, 417 (See FIG. 3*e*).

Virtual Mortgage Office 30, Buyer Virtual Desktop 15, and Virtual Real Estate Office 20 can display loan application summary information (See FIG. 28*a*).

Virtual Mortgage Office 30 can order 335, (See FIG. 19) and track 2420 (See FIGS. 24, 7) services from third-party service providers 25, either manually or automatically such as, for example, appraisal, mortgage insurance, tax and flood certifications, credit information and scores, or settlement services, or receive information from ancillary databases 112, 114, 115, 125, 130, 135, 140 (See FIG. 1*a*) either directly 75 or through an automated underwriting system 110; all appropriate information already in system is automatically entered into appropriate fields in request forms; or user can request and receive quotes (bidding) from one or more different service providers 25 (See FIGS. 20, 21), select a quote 2030 and order a service, receive a confirmation from service provider 2340 (See FIG. 23), track services ordered 2420 (See FIGS. 7, 24), and receive completed service provider reports and documents 335, 2210, 2120. All information entered into electronic Service Provider Desktop or Virtual Office 25, (See FIGS. 21, 22), or reports 2120, 2210 or from ancillary databases or systems 75, 112, 114, 115, 125, 130, 135 (See FIG. 1*a*) is automatically entered by application server 45 into system databases 50 to be used later as necessary in the process for the particular loan.

Service provider 25 can send electronic invoice 2240 for charges and the lender can receive and send electronic payments 365 to third-party service providers for any service charges.

The mortgage lender can manually underwrite the loan 275, 300 (See FIGS. 3b, 28), or application server 45 can send final loan application information including, for example type of transaction, buyer/borrower, sale, property, and type loan-product, and any credit, appraisal, mortgage insurance, etc. information to an automated underwriting program 110 (See FIGS. 1a, 3b), including credit reporting systems 112, automated appraisal 114 and automated mortgage insurance underwriting and approval 115, and receive back final underwriting approval (See FIGS. 28, 28a) with any conditions (or rejection).

The program sends loan information package including, for example, transmittal, appraisal, loan application, credit report to third-party mortgage investor 345, including for example Freddie Mac or Fannie Mae for investor purchase commitment with conditions if loan is to be sold to investor or marketed on the secondary market.

Final underwriting review and approval of loan can be done manually 300 or automatically 110 (See FIGS. 28, 28a) and can be approved or rejected with conditions.

Final underwriting results and approval (or rejection) including conditions are presented to lender in Virtual Mortgage Office 30, 275 (See FIGS. 3b, 28, 28a).

Computer program displays summary loan information in the Buyer Virtual Desktop 15, 275 (See FIGS. 3e, 28a) and Virtual Real Estate Office 20, 275 (See FIGS. 3a, 28a) and the Virtual Mortgage Office 30, 275 (See FIGS. 3d, 28, 28a).

Computer program 45 sends approved loan information to mortgage document database 120 (See FIGS. 1a, 3b) and prepares and sends, for example, loan commitment, instructions and loan documents including any necessary 'disclosures' to the 'Virtual Mortgage Office' for review, additions or corrections 275, if any, and saves for display (See FIG. 8) in File Drawer.

Appropriate loan documents including, for example commitment, Good Faith Estimate, Truth in Lending, and other disclosures loan terms and conditions to are sent 275 either manually or automatically by application server 45 to all appropriate parties, including, Buyer Virtual Desktop 15 and 'Virtual Real Estate Office' 20 for review and acceptance by buyer/borrower 275 (See FIG. 3e).

Virtual Mortgage Office 30 receives back any loan documents 275, including for example, any Good Faith Estimate, Truth in Lending, and other disclosures accepted and electronically signed by buyer from Buyer Virtual Desktop 15, 275 or Virtual Real Estate Office 20, 275.

Virtual Mortgage Office 30 can prepare appropriate loan documents 120 including, for example commitment, disclosures, note, deed of trust or mortgage, loan terms and conditions, settlement instructions, including electronic signatures, are sent 275 either manually, or automatically by application server 45 to Virtual Settlement Office 371 (See FIG. 3c) for settlement.

Virtual Mortgage Office 30 (See FIG. 3b) can receive, for example, settlement statement (HUD-1) and appropriate title, legal and settlement documents sent from Virtual Settlement Office 368, 372 for review prior to settlement, and respond with questions, comments, approvals, electronic signatures, or changes back to Virtual Settlement Office 35 (See FIG. 3c).

Lender can send electronic payment of mortgage funds 365 to the Virtual Settlement Office 378, 376 for disbursement according to settlement instructions.

The lender personnel 30 can electronically sign settlement statement (HUD-1) 372 and appropriate legal and title documents 368 and send to settlement company 35 to conduct electronic online settlement.

Virtual Mortgage Office (See FIG. 3b) can receive final, signed settlement statement (HUD-1) 372 and appropriate title and legal documents 368 sent from Virtual Settlement Office 35, (See FIG. 3c), including electronic confirmation of settlement and all final, signed post closing and post recording documents including for example, electronic certifications or verifications as necessary, appropriate or expedient.

Lender personnel 30 (See FIG. 3b) or application 45 can automatically enter all appropriate information about the loan 50, including a complete electronic 'file' of all documents into one or more mortgage loan servicing systems 122.

Virtual Mortgage Office 35 (See FIG. 3b) can save 45, 50, either automatically or manually, all appropriate documentation, including for example e-mails 65, faxes 60, phone messages 60, sale contract, mortgage loan and title, legal and settlement documents for a complete record of each transaction, and view in an electronic File Drawer (See FIG. 8).

Virtual Mortgage Office Transaction Navigator 430, 2410 (See FIGS. 4, 24) automatically tracks stages of each transaction, for example 'Loan Prospect,' 'Prequalified,' 'Preapproved,' 'Application,' 'Approved,' 'Settled,' etc.

Virtual Mortgage Office Transaction View 435, 2420 (See FIGS. 4, 24) automatically tracks, organizes, and summarizes status of activities for all transactions, for example 'appraisal,' 'credit score,' etc. and displays the status for example 'ordered,' 'past due,' 'received,' 'approved,' etc.

Virtual Mortgage Office 30 (See FIG. 3b) also automatically displays appropriate information about transaction schedules, events, meetings, and status of activities in an electronic calendar (See FIG. 7) or screen as necessary, appropriate or expedient for their tasks or functions.

Virtual Settlement Office

The Virtual Settlement Office 35 (See FIG. 3c) will allow the settlement company personnel to perform all their tasks and activities associated with completion of the title and settlement process from one comprehensive computer program; receive, communicate and exchange 45 information with seller 10, buyer 15, real estate agent or builder 20, mortgage lender 30 and service providers 25 (See FIGS. 1, 2, 3c) order and track services 366, 2920 such as surveys, title searches, and loan payoff information and create and save settlement 372, title and legal documents 368 and receive and disburse settlement proceeds 378 electronically. Information entered, documents created, or functions performed by the settlement office personnel, or by the application server 45 or from ancillary databases and systems 75, are saved by the application server 45 into one or more databases 50, 75 and are made available for further functions to be performed, and documents and information made available to other people participating or steps in the transaction (See FIGS. 1, 2), including for example the seller, the buyer, the real estate office personnel, the mortgage lender, and service providers, as necessary, appropriate or expedient, through an automated or manual workflow process managed by the application server 45.

Specifically, the Virtual Settlement Office has the following functionality:

The Virtual Settlement Office 35 (See FIG. 3c) can automatically receive 45 settlement orders (See FIGS. 3c, 29, 30) including information on the buyer (See FIG. 12), seller (See FIG. 10), property (See FIG. 11), sale information (See FIG. 14) including sale contract information and documents (See FIG. 15) and mortgage information and documents from the Seller Virtual Desktop, 10 Buyer Virtual Desktop, 15 Virtual Real Estate Office 20 or Virtual Mortgage Office 30 via the network 40, or user can enter information on screens manually, for example taking information by phone.

The Virtual Settlement Office user 35 (See FIG. 3c) can confirm order electronically (See FIG. 30).

The Virtual Settlement Office 35 (See FIG. 3c) can order 366 (See FIG. 19) and track 2920 (See FIGS. 29, 7) services from third-party service providers 25, either manually or automatically such as, for example title search (title abstract), real estate tax information, HOA documents, a loan payoff statement, and survey services, or request and receive information from ancillary databases 75, 130, 135, 140; all appropriate information already in system is automatically entered into appropriate fields; or user can request and receive quotes (bidding) from one or more different service providers 25 (See FIGS. 20, 21), select a quote 2030 and order a service, receive a confirmation from service provider 2340 (See FIG. 23), track services ordered 2920 (See FIGS. 7, 29), and receive completed electronic service provider reports 2120, 2210. All information entered into electronic service provider reports 2120, 2210 is automatically entered by application server 45 into system databases 50, 75 to be used later as necessary, appropriate or expedient in the process.

Service provider can send electronic invoice 2240 for charges and the settlement company can send electronic payments 378 to third-party service providers for any services.

Virtual Settlement Office 35 (See FIG. 3c) can receive settlement instructions 371 and all mortgage loan documents from the lender Virtual Mortgage Office 30 as necessary, appropriate or expedient.

Virtual Settlement Office 35 can receive 378 (See FIG. 33) mortgage proceeds from the lender 30 365 (See FIG. 3b).

Computer program application server 45 can access ancillary databases 75 for land title 140 real estate tax information 130 and transfer taxes and recording charge information 135 and automatically enter information, for example real estate tax prorations, recording and transfer charges, etc. into for example the settlement statement (HUD-1), including performing all usual calculations and prorations normally performed in preparing the settlement statement, and all settlement documents 372 (See FIG. 32), and other title and legal documents, such as, for example title report, title commitment and title policy (See FIG. 31), affidavits, deeds, recording forms, etc. 368 as necessary, appropriate or expedient or user can enter, change or add information manually.

The computer program 45 enters all appropriate information 50 on, for example, the buyer, seller, property, sale, mortgage information, title information, and information ordered and received from services providers 366 such as, for example, pay-off amounts, survey charges, title or abstract charges, automatically into, for example, all legal and title documents and other closing documents 368 and into the settlement statement (HUD-1) 372, including performing all usual calculations and prorations normally performed in preparing the settlement statement (See FIG. 32), and other settlement documents, 372 (See FIG. 32) as necessary, appropriate or expedient or user can enter, change or add information manually.

The computer program 45 causes the settlement statement (HUD-1) and other settlement documents 372 (See FIG. 32) to exchange information between an escrow accounting system 376 (See FIGS. 3c, 33, 34) allowing user to perform complete escrow and accounting functions 376 including, for example, electronic receipts, disbursements, reconciliation, statements and reports 378 (See FIG. 34) as necessary, appropriate or expedient.

Virtual Settlement Office user 35 (See FIG. 3c) can through the application server 45 send settlement statement (HUD-1) and settlement documents 372 and all appropriate title and legal documents such as, for example, the title insurance binder, title report, commitment or policy 368 to the Seller Virtual Desktop 10 Buyer Virtual Desktop 15 Virtual Real Estate Office 20 and Virtual Mortgage Office 30 for review and approval by respective parties prior to settlement.

Virtual Settlement Office 35 (See FIG. 3c) can conduct on-line settlement through application server 45 with for example one or more of a buyer 15, seller 10, lender 30 or others with, for example, electronic signatures of all settlement, title and legal documents including for example using real-time application sharing as necessary, appropriate or expedient.

Figure 33:
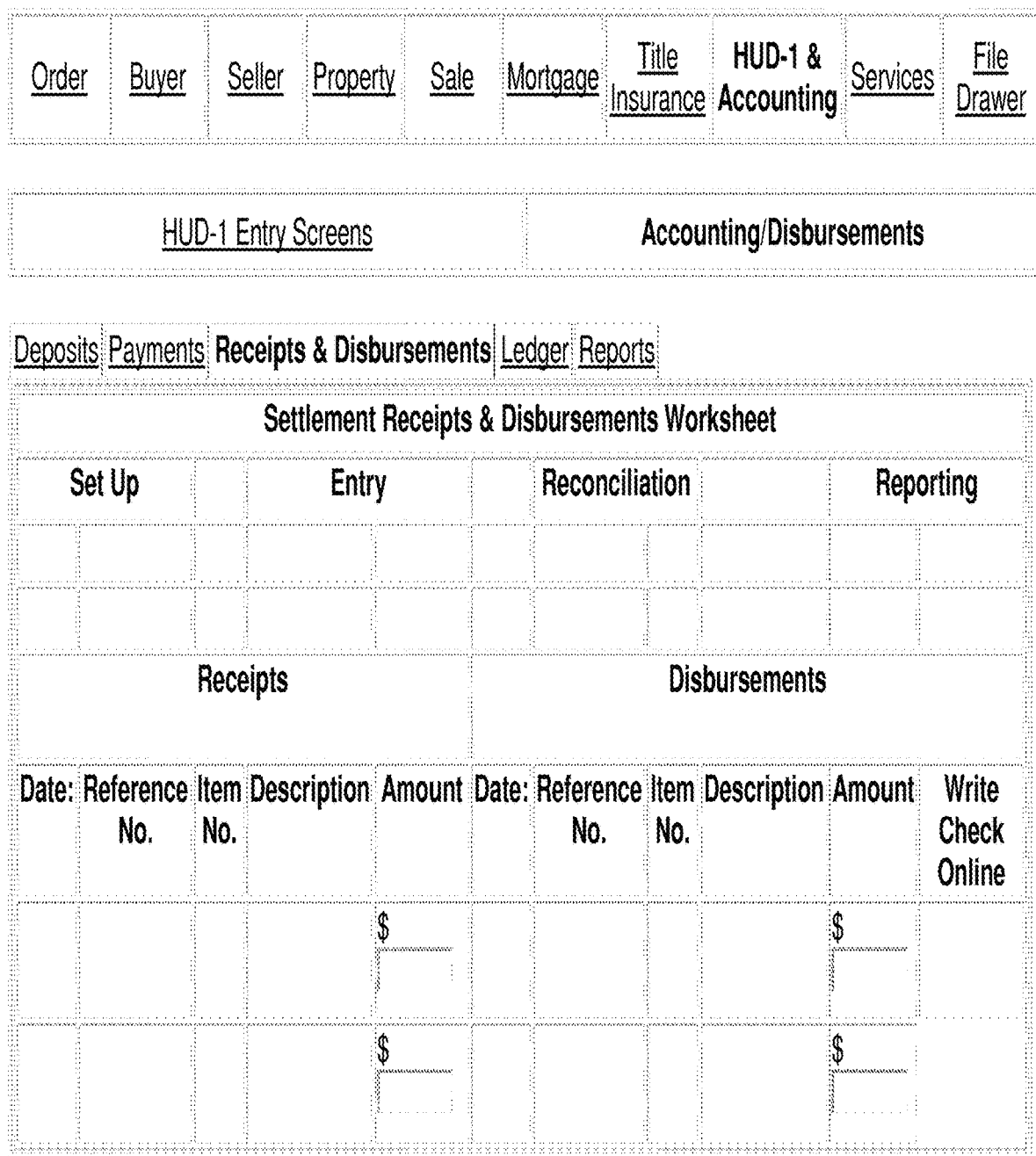
FIG. 33 is a view depicting Virtual Settlement Office Escrow Accounting Entry Tab Tables.

The computer program allows electronic receipts, such as for example receipt of mortgage funds from the lender 365 and buyer 417 proceeds 378 (See FIGS. 3b, 33), and electronic disbursements such as, for example service provider charges, disbursing seller proceeds, real estate broker fees, real estate taxes, governmental recording and transfer charges, real estate taxes, water charges, utility charges and loan payoffs to third-party lenders 378 (See FIGS. 3c, 33, 34).

Virtual Settlement Office 35 (See FIG. 3c) can receive electronically any third-party documents including, for example third-party loan payoff documents, certificate of satisfaction, appropriately marked as paid and satisfied in full, including electronic signatures, and all requisite documents for releasing any third-party loan liens of record electronically.

Virtual Settlement Office 35, (See FIG. 3c) can electronically send all documents, including for example deed, certificate of satisfaction, affidavits, governmental recording forms to, for example, appropriate public land record, court or other databases or systems for electronic recording and releasing of documents in public records 75, 140, 382 (See FIGS. 35, 3c) as necessary, appropriate or expedient, and receive back electronic certifications or verifications of recording and releasing of documents from the appropriate governmental departments or agencies.

Virtual Settlement Office 35 (See FIG. 3c) can send electronically confirmation of settlement and all final, signed post closing and post recording documents to appropriate parties including, for example buyer, seller, lender, or third-party payoff lenders (See FIG. 36) including for example, electronic certifications or verifications as necessary, appropriate or expedient.

Virtual Settlement Office 35 (See FIG. 3c) can save 45, 50, either automatically or manually, all appropriate documentation, including title documents, HUD-1, e-mails 65, faxes, phone messages 60, sale contract documents 255 and loan documents 371 for a complete record of each transaction, and view in an electronic File Drawer (See FIG. 8) as necessary, appropriate or expedient.

Virtual Settlement Office 35 (See FIG. 3c) Transaction Navigator 430, 2910 (See FIGS. 4, 29) automatically tracks stage of each transaction, for example New Order, Scheduled, Settled, etc.

Virtual Settlement Office 35 (See FIG. 3c) Transaction View 435, 2920 (See FIGS. 4, 29) automatically tracks, organizes, and summarizes status of for example, tasks and activities for all transactions, for example Abstract, Survey, HOA Documents, etc. and displays the status for example ordered, received, approved, past due, etc.

Virtual Settlement Office 35 (See FIG. 3c) also automatically displays appropriate information about transaction schedules, events, meetings, and status of activities in an electronic calendar (See FIG. 7) or screens as necessary, appropriate or expedient.

Alternative Embodiments—Description

Combining Preferred Embodiments with Extrinsic Technology

Figure 1D:
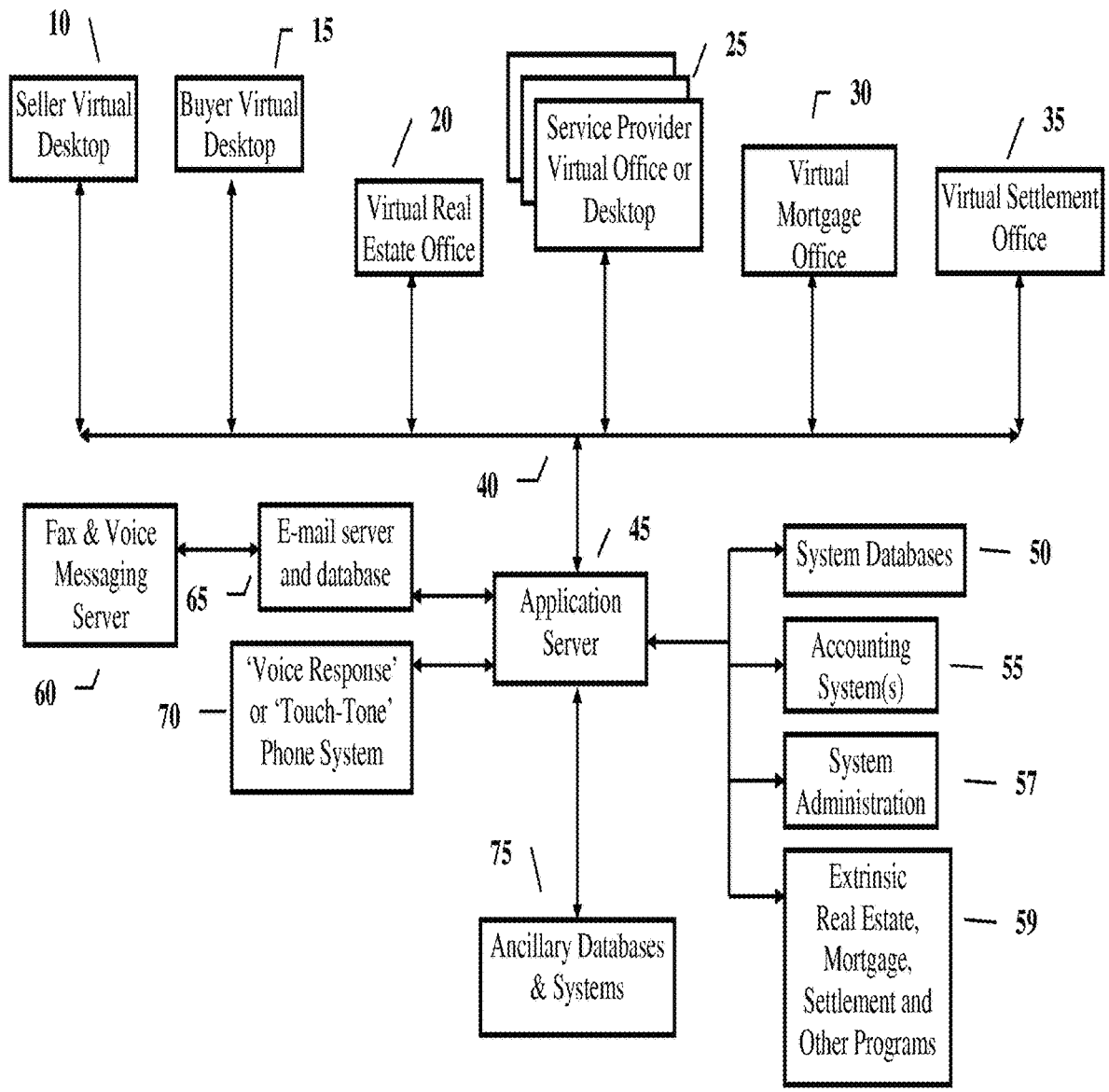
FIG. 1d is a System Overview and Architecture of a Home Sale, Mortgage Financing and Settlement Computer Process Integrated with Extrinsic Real Estate, Mortgage, Settlement and Other Programs.

While the preferred embodiments, as described above, preferably includes one or more common applications 45 and databases 50, 75, other embodiments can include a system which operates in combination, and is integrated with one or more extrinsic real estate, mortgage, settlement and other programs 59 (See FIG. 1d) whereby processing information and performing of functions may be performed by one or more of the application server 45 and one or more extrinsic real estate, mortgage, settlement and other programs 59 (See FIG. 1d) and users may view, enter, receive, manipulate information and perform functions in one or more of the application and one or more extrinsic real estate, mortgage, settlement and other programs 59 (See FIG. 1d) to perform the overall process described above.

Combining, Simplifying or Modifying Processes.

One of the prime advantages of a comprehensive technology, such as, e.g., may be afforded by various embodiments herein, is the many possibilities that arise for simplifying, streamlining the process, and combining one or more functions. This complicated processes can be simplified, streamlined and made more user friendly by combining, eliminating one or more functions or steps, or presenting information or allowing functions to be performed in a more understandable and efficient manner.

While there are many such possibilities, one example is if a buyer is prequalified, preapproved 270 or approved 275, combining the buyer search for home function 240, 245, 1330, 1350 (See FIGS. 3e, 13) with mortgage prequalification, preapproval 270 (See FIG. 3e), or approved loan 275 (See FIG. 3e) summary information, such that, for example, the system can immediately display and buyer or agent can immediately view 1360 (See FIG. 13a) financial information including, for example, down payment, settlement costs 372 and monthly payments (PITI), including showing a Good Faith Estimate 1360 (See FIG. 13a), and this financial information can include not only PITI but also other costs of ownership 1360 (See FIG. 13a), such as, for example, HOA dues and utility costs obtained from service providers, utility provider systems 97 or entered by the seller for a particular property (See FIG. 11). This could also allow the user to change financing products or assumptions 240, 245, 265 (See FIGS. 3e, 16) in real time 'on the fly' for a particular property.

An advantage of this embodiment would be in allowing the buyer to see a more complete picture and the ramifications of selecting a particular property and type of financing prior to signing a binding contract 255 and then finding out later there are surprises. This can be of particular importance and value when you consider that purchasing a home is the largest single financial decision for most people and families and particularly so for lower or moderate income families with limited sophistication.

Another example of combining functions would be to display and incorporate appropriate loan summary information, such as the loan amount and terms (See FIGS. 26a, 28a) automatically in the sale contract documents 255, 1510 (See FIG. 15) which terms require the buyer to obtain certain financing as a condition of the sale, or including actual settlement costs 372, 130, 135 and who will pay them directly in the contract of sale documents 1520 (See FIG. 15) or as an exhibit, including the total amount of cash the buyer will need and how much the seller will actually receive at settlement thus eliminating surprises and uncertainty for the parties.

Yet another modification may include in some markets some of the activities and functions of the real estate agent 20 (See FIG. 3a) such as, for example, preparing the sale contract documents 255 (See FIG. 15) and receiving and holding the escrow deposit from the buyer 285 being performed, for example, by an attorney who will also perform the functions of the settlement company 35 (See FIG. 3c) in closing or settling the sale that is described in the preferred embodiments as being done by the settlement company.

Another example of combining functions or streamlining the process would be to combine one or more virtual offices or desktops. For example, since the process can be so highly automated with automated loan underwriting, documents, etc. it is possible to combine the Virtual Real Estate Office 20 (See FIG. 3a) and the Virtual Mortgage Office 30 (See FIG. 3b) into one, and consolidate the screens, and have an office assistant perform the mortgage process for a real estate agent totally eliminating the loan officer in the process.

Yet another example of modifying the process is a 'self-help' system for a buyer or seller to use, for example, a 'for sale by owner' FSBO solution, without the help of a real estate agent or sales person in the sale process. Such a system would eliminate the Virtual Real Estate Office 20 (See FIG. 3a) and include certain functions in the Seller and Buyer Virtual Desktops 10, 15 such as, for example, entering property information into a database 210, 85 searching the home database 245, creating and negotiating a contract 255 (See FIG. 15) directly between buyer and seller, ordering all services 385, 421 including those which the agent might order 235, etc. The buyer 15 could also perform an entirely automated loan process without a Virtual Mortgage Office 30 directly with an automated loan application, verification and underwriting process 105, 110.

Still other modifications could be used on a kiosk in a public location, for example in a shopping mall, or could be adapted to be used with a 'move consultant or 'transaction coordinator,' or equivalent, to help track the sale, order services, notify parties of deadlines, etc. Such 'move consultant or 'transaction coordinator' would have features for ordering services, tracking.

Commercial Real Estate

While the preferred embodiment as described the home sale, mortgage and settlement process, the process can be also used, with any modifications necessary, for the commercial real estate market including, for example, the buying and selling of commercial buildings, apartment buildings and land.

Other Markets

The system design, the workflow, (See FIGS. 1, 1a) virtual office (See FIG. 4) and virtual desktop (See FIGS. 5, 6) can be adapted for use in other markets or industries. Some other markets or industries can include, for example, international trade and shipping. The seller, buyer, real estate agent, mortgage lender, settlement and service provider functions, activities, and documents could be changed to provide functions, activities, and documents, for example, for the manufacturer, shipping agent, shipping company, customs agents, bank financing, insurance and bonding, warehousing, etc. all of whom are in diverse locations worldwide.

Conclusion, Ramifications, and Scope of Some Embodiments of the Invention

Unobviousness and Unexpected Results not Suggested by Background References

There has been a long-felt but unsolved need to make the real estate sale, mortgage and settlement process more efficient. However, there has been nothing but a series of failures by others who have tried going about it with improperly designed or incomplete solutions. Some have tried by automating only portions of the entire process. That would be like designing a trip from New York to Los Angeles; first you take a train to Pittsburgh, then you switch to a bus to get to Chicago, then you rent a car to Denver and finally take a plane to Los Angeles. This leaves gaps in the process and is complicated, expensive and results in less functionality and value for users.

Still others have tried to take what they perceived to be an easy shortcut approach of connecting together existing real estate sale, mortgage and settlement programs, still leaving users with their old outdated technologies, with different functions and structures, to perform their activities in the transaction. This approach is like patching together parts of 5 or 10 old cars and hoping the result will be a new car that runs better. It too just hasn't worked. This approach is not efficient, and leaves gaps in the process, is complicated, expensive and results in less functionality for users.

Not one of the foregoing approaches has met with commercial success despite pouring literally tens of millions into their expensive solutions, and many have gone out of business.

The correct solutions, identified in this patent application, have been unobvious and have escaped others for years.

The methods and processes described herein, however, can, e.g., eliminate and solve the unrecognized problems of, inter alia, complexity, cost and relative lack of functionality which others have encountered.

The preferred embodiments, among other things: 1. integrates the entire process as one single, complete process, from A to Z, and 2. incorporates functions of the parties performed, the buyer, seller, real estate agent, lender, settlement company, and service providers into the process. Accordingly, the preferred embodiments include a system from A to Z and a process from the 'ground up' not just connecting parties' existing programs together, but taking into account what functions each participant performs in the process and building those functions into the system, for a basic, complete design. Thus, although others did not recognize it, this approach provides a simpler system which turns out to be less costly to build, maintain and upgrade, have more functionality, and still provide a much more efficient process.

Objects and Advantages

In some preferred embodiments, objectives and advantages achieved of such a comprehensive computer system for the entire home sale, mortgage origination and settlement process which should be evident from the forgoing descriptions can include one or more of the following: 1. it reduces work by all parties allowing the process to be highly automated, eliminating and reducing work currently being performed manually; 2. it reduces redundant and repetitive tasks of manually entering the same information numerous times in different computer programs, so information can be entered once for the entire transaction, not just portions of the transaction; 3. it reduces work, time, cost and chances of error associated with having to manually rehandle information numerous times, first having the real estate agent reenter information to perform tasks or transfer to more than one program, having the mortgage company reenter information to perform tasks or transfer to other programs, and then having the settlement personnel have to once again reenter or transfer information to other programs; 4. it allows transaction information to be instantly available to immediately perform additional tasks anywhere in the process; 5. it allows transaction information and status information to be instantly available to all parties as appropriate, thus reducing confusion, delays and uncertainty and chances of errors in the process; 6. it reduces the cost of completing a transaction; 7. it reduces the number of personnel necessary to complete a transaction; 8. it reduces or even eliminates waiting time and reduces the overall time required to complete a transaction; 9. it provides greater reliability can be built into the process; 10. it assures that important sale and mortgage disclosure information and documents required by law be given to the seller or the buyer, or the refinancing home owner, on a timely basis; 11. it greatly reduces the cost, complexity, unreliability, and design limitations of trying to connect together, or 'integrate' different computer systems, one for the real estate agent, another for the mortgage company, and another for the settlement company, etc., in an effort to perform this process; 12. it results in a system with greater and more functional features for users; 13. it provides a more highly automated system without gaps in the process; in other words, for example, the instant the loan officer does something to approve the loan, the documents can be automatically prepared and sent to the settlement company and the borrower in seconds; 14. it is easier and cheaper to change or modify, add features, or upgrade the system from time to time; this is important with ever-changing technology and constantly changing market conditions; 15. such a comprehensively designed system is more reliable and less likely to malfunction or 'crash;' 16. it is less costly to build and maintain; and/or 17. the process can be simplified, streamlined and made more user friendly by combining; eliminating one or more functions or steps, or presenting information or allowing functions to be performed in a more understandable and efficient way.

Broad Scope of the Invention

While illustrative embodiments of the invention have been described herein, the present invention is not limited to the various preferred embodiments described herein, but includes any and all embodiments having modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In addition, in this disclosure, the terminology "invention" is intended to encompass numerous independent inventive aspects. References to the "invention" in this disclosure can refer to one or more of the various aspects of the invention. The use of the language "invention" or "present invention" should not be in any way construed as limiting the broad reach of the claims and/or in any way limiting the scope of the claims and/or all aspects of the invention.

I claim:

1. A computer implemented method with improved display, network, computing processor, and database configurations in connection with facilitating a home sale transaction; the improved method including performing the steps of:

maintaining a computing processor; the computing processor in communication with a plurality of geographically remote computing devices via a geographically distributed computing network including using an Internet website; the remote computing devices including a home buyer remote computing device; one or more of the plurality of geographically remote computing devices including the home buyer remote computing device configured with an input device and a display device with a graphical user interface to display a webpage including a composite webpage on the Internet website;

providing by the computing processor to the remote home buyer computing device a webpage on the Internet website;

receiving by the computing processor from the remote home buyer computing device, one or more requests for data; the one or more requests for data including home purchase criteria and a request for loan pricing;

providing by the computing processor the requests for data to a centralized source for providing filtered data;

retrieving by the computing processor filtered data from the centralized source for providing filtered data; the filtered data including:

filtered home data pertaining to a plurality of homes conforming to the home purchase criteria; and filtered loan pricing data conforming to the request for loan pricing; the filtered conforming loan pricing data pertaining to a plurality of loans for purchasing at least one filtered associated conforming home;

transmitting, by the computing processor, to the home buyer computing device display a a webpage including a composite webpage on the Internet website that displays:

the filtered home data pertaining to a plurality of homes conforming to the home purchase criteria; and the filtered associated loan pricing data pertaining to a plurality of loans for purchasing at least one filtered conforming home; and receiving by the computing processor from the remote home buyer computing device, a request for additional data for a selection of a filtered conforming home, a selection of a filtered associated loan, or both;

whereby the computer implemented method with improved display, network, computing processor, and database configurations provides a home buyer with filtered home data and more accurate filtered loan pricing data for purchasing a filtered home more efficiently without leaving the Internet website.

2. The method of claim 1, wherein:

the centralized source for providing filtered data includes a centralized database and a centralized computing processor for providing a plurality of filtering processes;

the data in the centralized database includes:

home data pertaining to a plurality of homes offered for sale; the home data at the database being individually customizable from a geographically remote computing device;

loan data for a plurality of loans, the loan data at the database being individually customizable from a geographically remote computing device; the loan data at the database for providing loan pricing data; and the centralized database being responsive to requests from the centralized computing processor for providing a plurality of filtering processes; and the plurality of filtering processes by the centralized computing processor for providing a plurality of filtering processes including:

receiving from the computing processor a request for data:

selecting from the centralized database home data pertaining to a plurality of homes conforming to the home purchase criteria;

selecting from the centralized database loan data pertaining to a plurality of loans;

associating the selected loan data pertaining to a plurality of loans with a conforming home data; and applying a plurality of loan pricing processes to the data in the request for data and the associated conforming home data and associated loan data; with the plurality of loan pricing processes providing loan pricing data for a plurality of loans for purchasing an associated, conforming home; and returning to the computing processor filtered conforming home data and filtered associated loan pricing data.

3. The method of claim 2, wherein the centralized database is configured to receive data electronically from a plurality of geographically remote computing devices via the geographically distributed computing network; and/or wherein the centralized database and the centralized computing processor for providing a plurality of filtering processes include a shared loan product and pricing database and a shared processor configured to provide a plurality of loan pricing processes simultaneously for a plurality of loans in real time or near real time; and/or the plurality of filtering processes by the centralized computing processor including executing shared computer code for providing filtered data.

4. The method of claim 1, including a database of data for formatting and displaying a webpage including a composite webpage on the Internet website to receive and display user input and the computing processor output on a remote computing device display device;

the method including: selecting, by the computing processor from the database, data for formatting and displaying a webpage including a composite webpage; compiling and transmitting, by the computing processor, including to the home buyer computing device display, a webpage including a composite webpage on the Internet website that displays filtered data.

5. The method of claim 1, wherein:
the request for home data includes home purchase criteria including at least one of: a home location, a home price, and at least one home type criteria; and/or
wherein the request for loan pricing includes a selection of a filtered conforming home from among the plurality of filtered conforming homes.

6. The method of claim 1, wherein the request for data includes: at least one of:
contract offer data;
contract counteroffer data; and
final contract data;
for a home buyer selection of a filtered conforming home; and
optionally, a home buyer selection of a loan from the plurality of filtered associated loans for purchasing the home buyer selection of the filtered conforming home;
providing, by the centralized computing processor for providing a plurality of filtering processes, a plurality of filtering processes for the request; the plurality of filtering processes including:
applying a plurality of loan pricing processes to the data in the request;
compiling and transmitting electronically via the network including to the home buyer computing device display on the Internet website a webpage including a composite webpage that displays:
at least one of the:
contract offer data;
contract counteroffer data; and
final contract data;
for purchasing the home buyer selection of the filtered conforming home; and
filtered associated loan pricing data pertaining to:
a plurality of loans for purchasing the buyer selection of the filtered conforming home; or
optionally, a buyer selection of a loan from the plurality of filtered associated loans for purchasing the buyer selection of the filtered conforming home.

7. The method of claim 1, wherein the request for loan pricing includes home buyer data including one or more of a: buyer down payment data, buyer income data, and buyer debt data; and/or wherein the request for loan pricing includes at least one of: a request for a loan quote, a request for a loan preapproval, a request for a loan approval, and a loan application; and/or wherein the request for loan pricing includes at least one of: a request for a loan approval, and a loan application; and/or wherein the plurality of loan pricing processes include one or more of: a process to calculate a debt-to-income ratio, a process to calculate a loan-to-value, and a loan underwriting process; and/or wherein the plurality of loan pricing processes include a loan underwriting process; and/or wherein the filtered loan pricing data pertaining to a plurality of loans can be offered by a plurality of lenders; and/or wherein the plurality of loans can be offered by: a mortgage broker, a direct mortgage lender, or both.

8. The method of claim 1, wherein the filtered loan pricing data includes:
at least one of a loan amount data, and a periodic loan payment data; and
optionally, at least one of:
a good faith estimate data,
a truth-in-lending data, and
a loan cost to be paid at settlement; and
wherein the periodic loan payment data optionally includes a payment for at least one of:
a real estate tax payment,
a homeowner insurance premium payment, and
a mortgage insurance premium payment.

9. The method of claim 1, wherein
the data in the centralized database includes home sale transaction data; the home sale transaction data at the centralized database being individually customizable from a geographically remote computing device; and
the plurality of filtering processes by the centralized computing processor for providing a plurality of filtering processes further including:
selecting home sale transaction data from the centralized database, providing a home sale transaction process, or both; with the home sale transaction processes providing processed home sale transaction data;
associating the selected or processed home sale transaction data with an associated loan data pertaining to a plurality of loans and conforming home data and
applying a plurality of loan pricing processes to the data in the request for data, and the associated home sale transaction data, loan data pertaining to a plurality of loans, and conforming home data;
retrieving filtered data from the centralized source for providing filtered data and transmitting, by the computing processor, to the home buyer computing device display a webpage including a composite webpage on the Internet website that displays:
a filtered associated home sale transaction data, loan data pertaining to a plurality of loans, and conforming home data;
wherein the filtered transaction data includes transaction data pertaining to at least one of: a real estate agent service, a real estate broker service, a home inspection service, a home warranty service, a real estate tax, homeowner insurance, a settlement service, a home title, title insurance, and recording a transfer of title;
wherein at least one filtered home sale transaction data includes at least one of: cost data, bid data, lowest cost data, and lowest bid data.

10. The method of claim 1, including:
saving to a database a filtered data; the saved filtered data being available to a computing processor on demand;
receiving via the network from the home buyer computing device, from a second computing device, or both, a request that includes a request for:
saved filtered data; and/or
one or more documents;
wherein the second computing device includes at least one of a geographically remote: home seller, real estate agent, real estate broker, lender, and settlement service provider computing device in communication electronically with the computing processor using the Internet website webpage including composite webpage via the computing network;
retrieving from the database, compiling and transmitting, by the computing processor, including to the home buyer computing device display and one or more second computing device displays via the computing network, a webpage including a composite webpage that displays on the Internet website:
saved filtered data; and/or
a document including one or more: home sale contract, loan application, loan disclosure, loan note, loan security instrument, settlement statement, and deed;
wherein a plurality of transmitted documents collectively includes the retrieved filtered data.

11. The method of claim 1, wherein the computing processor includes a plurality of connected processors, servers or both able to communicate data with each other including via the network; and/or wherein the Internet website includes at least one Internet website served by the computing processor; and/or wherein the Internet website is a shared Internet website shared by one or more of: a plurality of home buyers, a plurality of home sellers, a plurality of real estate agents, a plurality of lenders, and a plurality of settlement providers; and/or wherein a composite webpage simultaneously displays filtered associated home data, loan pricing data and home sale transaction data.

12. A non-transitory computer-readable medium capable of communication with a data apparatus, including a geographically distributed computing network, the non-transitory computer-readable medium including an executable software code stored thereon, the code including instructions for causing a computer to perform the method steps of claim 1.

13. A computing apparatus with improved centralized computing processor and database configuration in connection with facilitating a home sale transaction, the apparatus comprising:
  a centralized computing processor and a centralized database;
  the centralized database containing data including:
    home data pertaining to a plurality of homes offered for sale by a plurality of home sellers; with the home data at the centralized database being individually customizable from a geographically remote computing device via the network;
    loan data which enables the centralized computing processor to provide loan pricing data for a plurality of loans; with loan data at the centralized database being individually customizable from a geographically remote computing device via the network;
    with the centralized database being responsive to requests for data from the centralized computing processor;
  the centralized computing processor configured to:
    generate a webpage including a composite webpage on an Internet website to communicate data electronically with a geographically remote home buyer computing device via a geographically distributed computing network;
    receive, electronically via the network from the remote home buyer computing device, a request for data; the request for data including a home criteria and a request for loan pricing data;
    provide a plurality of filtering processes in response to the request; the plurality of filtering processes that:
      select from the centralized database, home data pertaining to a plurality of homes conforming to the request for home data criteria;
      select from the centralized database loan data pertaining to a plurality of loans;
      associate the selected loan data pertaining to a plurality of loans with the conforming home data; and
      apply a plurality of loan pricing processes to: data in the request for data and the associated home data and loan data;
    compile and transmit electronically via the network to the home buyer computing device display:
      a webpage including a composite webpage on the Internet website that displays filtered home data pertaining to a plurality of homes conforming to the home purchase criteria; and
      filtered loan pricing data for a plurality of loans conforming to the loan pricing processes for purchasing at least one associated filtered conforming home;
  whereby the computing apparatus improved display, network, computing processor, and database configurations more quickly and easily provide home buyers with filtered home data and more accurate filtered loan pricing data for purchasing a filtered home without leaving the Internet website.

14. The apparatus of claim 13, wherein:
  the centralized database includes data to format and display a webpage including a composite webpage to receive and display user input and the centralized computing processor output on the Internet website on a remote computing device display device; and
  the centralized computing processor is configured to select from the centralized database data to format and display a webpage including a composite webpage, compile and transmit electronically via the network including to the remote home buyer computing device display, the webpage including the composite webpage that displays filtered data on the Internet website.

15. The apparatus of claim 13, wherein the home purchase criteria include at least one of: a home location and a home price; and
  wherein the filtered home data includes at least one of: a home location and a home price conforming to the home purchase criteria.

16. The apparatus of claim 13, wherein the centralized computing processor is further configured to:
  receive a request for data that includes:
    at least one of:
      a home buyer selection of a filtered conforming home; and
    at least one of:
      contract offer data;
      contract counteroffer data; and
      final contract data;
        for a home buyer selection of a filtered conforming home; and
    optionally, a home buyer selection of a loan from the plurality of filtered associated loans for purchasing the home buyer selection of the filtered home;
  provide a plurality of filtering processes in response to the request; the plurality of filtering processes that:
  apply a plurality of loan pricing processes to data in the request;
  compile and transmit to the home buyer computing device display a webpage including a composite webpage that displays:
    at least one of:
      the home buyer selection of a filtered home; and
      at least one of the:
        contract offer data;
        contract counteroffer data; and
        final contract data;
          for a home buyer selection of a filtered home; and
    at least one of:
      filtered associated loan pricing data pertaining to a plurality of loans for purchasing the home buyer selection of a filtered home, and
      optionally, filtered loan pricing data pertaining to the home buyer selection of a loan from the plurality of filtered associated loans for purchasing the home buyer selection of a filtered home.

17. The apparatus of claim 13, wherein the request for loan pricing includes one or more of a: home buyer down payment data, buyer income data, and buyer debt data; and/or wherein the request for loan pricing includes at least one of: a request for a loan quote, a request for a loan preapproval, a request for a loan approval, and a loan application; and/or wherein the plurality of loan pricing processes include one or more of: a process to calculate a debt-to-income ratio, a process to calculate a loan-to-value, and a loan underwriting process; and/or wherein the plurality of filtered loans are offered by a single lender or a plurality of lenders; and/or wherein the centralized database and the centralized computing processor include a centralized loan product and pricing database and processor configured to provide a plurality of loan pricing processes for a plurality of loans in real time or near real time; and/or wherein a lender includes a mortgage broker, a direct mortgage lender, or both.

18. The apparatus of claim 13, wherein the filtered conforming loan pricing data includes at least one of:
a loan amount data and a periodic loan payment data; and
at least one of:
good faith estimate data,
truth-in-lending data, and
a loan cost to be paid at settlement; and
wherein the periodic loan payment data optionally includes a payment for at least one of:
a real estate tax payment,
a homeowner insurance premium payment, and
a mortgage insurance premium payment.

19. The apparatus of claim 13,
wherein the data at the centralized database includes home sale transaction data; with the home sale transaction data at the centralized database being individually customizable from a plurality of geographically remote computing devices via the network;
the centralized computing processor configured to provide the plurality of filtering processes in response to a request for data including:
select a home sale transaction data from the centralized database, provide a home sale transaction process, or both; wherein the home sale transaction process provides a home sale transaction data;
associate and apply a plurality of loan pricing processes to the request for data, the associated home data and loan data, and at least one of the selected and processed associated home sale transaction data; with the plurality of loan pricing processes providing loan pricing data for an associated loan for purchasing an associated home;
compile and transmit electronically via the network to the home buyer computing device display a webpage including a composite webpage on the Internet website that displays: home data for a filtered associated home, loan pricing data for the at least one filtered associated loan, or both, and filtered associated home sale transaction data;
wherein the filtered associated home sale transaction data includes transaction data pertaining to at least one of: a real estate agent service, a real estate broker service, a home inspection service, a home warranty, a real estate tax, homeowner insurance, an appraisal, a mortgage insurance, a settlement service, a home title, title insurance, and recording a transfer of title; and
wherein at least one filtered associated home sale transaction data includes at least one of: cost data, and lowest cost data.

20. The apparatus of claim 13, wherein the centralized computing processor is further configured to:
save to the centralized database filtered data; with the saved data being available to the centralized computing processor on request;
receive electronically via the network from the home buyer computing device, from a second computing device, or both, a request that includes a request for saved filtered data and/or a document; wherein the second computing device includes at least one of a geographically remote: home seller, real estate agent, real estate broker, lender, and settlement service provider computing device in communication electronically with the centralized computing processor using the shared Internet website via the geographically distributed computing network;
compile and transmit electronically via the network, including to the home buyer computing device display and one or more second computing device display, a webpage including a composite webpage that displays on the shared Internet website:
the filtered associated home data, filtered associated loan pricing data, and filtered associated home sale transaction data; and/or
a document including at least one of a: home sale contract, loan application, loan disclosure, loan note, loan security instrument, settlement statement, and deed; with a plurality of transmitted documents collectively including the filtered associated home data, filtered associated loan pricing data, and filtered associated home sale transaction data.

21. The apparatus of claim 13, wherein the centralized computing processor includes a plurality of connected processors, servers or both able to communicate data with each other; and/or wherein the Internet website includes at least one shared Internet in communication with the centralized computing processor via the network; and/or wherein the Internet website is a website shared by one or more of: a plurality of home buyers, a plurality of home sellers, a plurality of lenders, and a plurality of settlement providers; and/or wherein the centralized computing processor is accessible by one or more of: a plurality of home buyers, a plurality of home sellers, a plurality of lenders, and a plurality of settlement providers; and/or wherein the centralized computing processor is configured to execute shared computer code to provide the plurality of filtering processes.

22. The apparatus of claim 13, wherein the database includes data for formatting and displaying a composite webpage to receive and display user input and filtered data on the shared Internet website on a computing device display device; and
the centralized computing processor is further configured to select form data from the database, compile and transmit electronically via the network including to the home buyer computing device display, one or more composite webpages that display filtered associated data on the shared Internet website using the selected form data.

23. A computer implemented method using improved display, network, processor, and database configurations in connection with facilitating a plurality of home sale transactions on a home sale Internet website; the improved method including the steps of:
maintaining a shared computing processor; the shared computing processor in communication with: a plurality of geographically remote home buyer computing devices using a shared Internet website via a geographically distributed computing network and a shared database; with a home buyer remote computing device including an input device configured to receive user input and a display device graphical user interface to display a composite webpage on the shared Internet website;

with data in the shared database including:
home data pertaining to a plurality of homes offered for sale;
loan data which enables the shared computing processor to provide loan pricing data for a plurality of loans;
home sale transaction data; and
data for formatting and displaying a composite webpage on the shared Internet website;
wherein home data, loan data, and home sale transaction data in the shared database can be entered and modified electronically from a geographically remote computing device via the computing network;

with the shared processor being responsive to a plurality of simultaneous or near simultaneous requests from the plurality of remote home buyer computing devices in real time or near real time;

receiving electronically via the network, by the shared processor from a remote home buyer computing device, a request for data that includes a request for home data and a request for loan pricing data; the request for home data including at least one of a home: location, price and type criteria; and the request for loan pricing data including at least one of a home buyer: down payment and income data;

providing, by the shared processor, a plurality of filtering processes in response to for the requests; the plurality of filtering processes including executing shared computer code for:
selecting from the shared database, home data pertaining to a plurality of homes conforming to the request for home data;
selecting from the shared database, loan data pertaining to a plurality of loans;
selecting home sale transaction data from the shared database;
associating the selected loan data, home sale transaction data, and selected conforming home data; and
applying a plurality of loan pricing processes to: the data in the request and the associated home data, loan data, and home sale transaction data; the plurality of loan pricing processes for providing loan pricing data for a plurality of loans for purchasing a filtered associated conforming home;

selecting, by the shared processor from the shared database, data for formatting and displaying a composite webpage on the shared Internet website;

compiling and transmitting electronically via the network, by the shared processor, including to the home buyer computing device display, a composite webpage on the shared Internet website that displays:
filtered home data pertaining to a plurality of homes conforming to the request for home data;
filtered associated loan pricing data conforming to the loan pricing processes pertaining to a plurality of loans for purchasing at least one filtered associated conforming home; and
filtered associated home sale transaction data;
wherein the filtered associated loan pricing data includes a loan amount and a periodic loan payment;

whereby the computer implemented method using improved display, network, processor, and database configurations provides a home buyer with filtered home data, loan pricing data, and transaction data for purchasing a home more efficiently without leaving the shared Internet website.

24. A computer implemented method using improved display, network, computing processor, and database configurations in connection with facilitating a home sale transaction on an Internet website; the improved method including performing the steps of:

providing, by a computing processor in communication with a plurality of geographically remote computing devices via a geographically distributed computing network, a webpage including a composite webpage on an Internet website to one or more of the plurality of geographically remote computing devices including a remote home buyer computing device; the one or more of the plurality of geographically remote computing devices including the remote home buyer computing device configured with a display device graphical user interface to display a webpage including a composite webpage on the Internet website;

receiving by the computing processor from the remote home buyer computing device using the Internet website webpage including composite webpage, one or more requests for data; the one or more requests for data including home purchase criteria and a request for loan pricing;

transmitting, by the computing processor, the requests for data to a centralized processor for filtering data;

retrieving by the computing processor filtered data from the centralized processor for filtering data; the filtered data including:
filtered home data pertaining to a plurality of homes offered for sale conforming to the home purchase criteria; and
filtered loan pricing data conforming to the request for loan pricing; the filtered conforming loan pricing data pertaining to a plurality of loans for purchasing an associated filtered home;

transmitting to the remote home buyer computing device display a composite webpage on the Internet website that displays:
the filtered home data pertaining to a plurality of homes conforming to the home purchase criteria; and
the filtered loan pricing data pertaining to a plurality of loans for purchasing at least one associated filtered home; and receiving by the computing processor from the remote home buyer computing device a selection of a filtered home, a selection of an associated filtered loan, or both;

whereby the improved display, network, computing processor, and database configurations enable home buyers to more easily and quickly search for filtered home data and more accurate filtered loan pricing data for purchasing a filtered home without leaving the Internet website.

25. The method of claim 24 including providing a plurality of filtering processes by the centralized processor for filtering data; the plurality of filtering processes by the centralized processor for filtering data including executing shared computer code for:
receiving the requests for data;
selecting from a database home data pertaining to a plurality of homes offered for sale conforming to the home purchase criteria;

selecting from a database loan data pertaining to a plurality of loans; the loan data at the database for providing loan pricing data; the database being responsive to requests from the centralized processor for filtering data;

associating the selected loan data pertaining to a plurality of loans with at least one selected conforming home; and applying a plurality of loan pricing processes to the data in the request for data and the conforming home data and associated loan data; with the plurality of loan pricing processes providing loan pricing data for a loan for purchasing an associated filtered home.

26. The method of claim 25 wherein the database includes a centralized database; with the data at the centralized database being individually customizable from a plurality of geographically remote computing devices via the network.

27. The method of claim 24 including selecting, by the computing processor from a database, form data for formatting and displaying a composite webpage; compiling and transmitting, by the computing processor, including to one or more of the plurality of geographically remote computing devices displays including the remote home buyer computing device display, a composite webpage on the Internet website to receive user input and display the filtered data.

28. The method of claim 24, wherein
the home purchase criteria include: a home location and home price criteria; and/or wherein the request for loan pricing includes a home buyer selection of a home from the filtered home data pertaining to a plurality of homes conforming to the home purchase criteria and at least one of a home buyer income data and a down payment data.

29. The method of claim 24, further including
receiving by the computer processor from the home buyer computing device a request for loan pricing data including at least one of:
contract offer data;
contract counteroffer data; and
final contract data;
for a home buyer selection of a filtered home; and
optionally, a home buyer selection of a loan from the plurality of filtered loans for purchasing the home buyer selection of the associated filtered home;
transmitting, by the computing processor, the request for loan pricing data to the centralized processor for filtering data;
providing, by the centralized processor for filtering data, a plurality of filtering processes for the request; the plurality of filtering processes including applying a plurality of loan pricing processes to the data in the request for loan pricing;
retrieving by the computing processor filtered data from the centralized processor for filtering data; and
transmitting by the computing processor including to the home buyer computing device display on the Internet website a composite webpage that displays:
at least one of the:
contract offer data;
contract counteroffer data; and
final contract data:
for the home buyer selection of the filtered home; and
filtered loan pricing data pertaining to:
a plurality of associated filtered loans for purchasing the home buyer selection of the filtered home; or
optionally, the home buyer selection of a loan from the plurality of filtered loans for purchasing the home buyer selection of the associated filtered home.

30. The method of claim 24, wherein the request for loan pricing includes one or more of a home buyer: down payment data, income data, and debt data; and/or wherein the request for loan pricing includes at least one of: a request for a loan quote, a request for a loan preapproval, a request for a loan approval, and a loan application; and/or wherein the plurality of loan pricing processes include one or more of: a process to calculate a debt-to-income ratio, a process to calculate a loan-to-value, and a loan underwriting process; and/or wherein the filtered conforming loan pricing data pertaining to a plurality of loans can be offered by a single lender, a plurality of lenders, or both; and/or wherein the plurality of loans can be offered by: a mortgage broker, a direct mortgage lender, or both.

31. The method of claim 24, wherein the centralized processor for filtering data and the database include a centralized loan product and pricing database and automated underwriting system for providing a plurality of loan pricing processes for a plurality of loans; the automated underwriting system executing shared computer code for providing a plurality of loan pricing processes for a plurality of loans.

32. The method of claim 24, wherein the filtered loan pricing data includes: at least one of a loan amount and a periodic loan payment; wherein the periodic loan payment data optionally includes a payment for at least one of: a real estate tax payment, a homeowner insurance premium payment, and a mortgage insurance premium payment; and/or wherein the filtered conforming loan pricing data includes at least one of: a good faith estimate data, a truth-in-lending data, and a loan cost to be paid at settlement.

33. The method of claim 24, further including:
receiving, by the computing processor from the remote home buyer computing device using the Internet website composite webpage, a request for home sale transaction data; the request for home sale transaction data including filtered home data for at least one filtered home, filtered loan data for at least one associated loan, or both;
transmitting, by the computing processor, the request for home sale transaction data to the centralized processor for filtering data;
providing a plurality of filtering processes by the centralized processor for filtering data using the request for home sale transaction data; the plurality of filtering processes including:
selecting home sale transaction data from the database, providing a home sale transaction process, or both; with the home sale transaction processes providing processed home sale transaction data; with the database including a centralized database; with the home sale transaction data at the centralized database being individually customizable from a geographically remote computing device via the network;
associating and applying a plurality of loan pricing processes to at least one of the selected and processed home sale transaction data and the request for home sale transaction data; with the plurality of loan pricing processes providing loan pricing data for a filtered associated loan for purchasing a filtered home using at least one filtered associated home sale transaction data;
retrieving filtered data from centralized processor for filtering data;

compiling and transmitting by the computing processor via the network to the home buyer computing device display a composite web page on the Internet website that displays:
the filtered home data for at least one home, the filtered loan data for at least one associated loan, or both and the filtered associated home sale transaction data;
wherein the filtered associated transaction data includes at least one of a data pertaining to: a real estate agent service, a real estate broker service, a home inspection service, a home warranty service, a real estate tax, homeowner insurance, an appraisal, a mortgage insurance, a settlement service, a home title, title insurance, and recording a transfer of title; and
wherein at least one filtered associated home sale transaction data includes at least one of a: cost data, and lowest cost data.

34. The method of claim 24, including:
saving to a database: the filtered home data, filtered associated loan pricing data, and filtered associated home sale transaction data; the saved filtered data being available to the computing processor on demand;
receiving via the network, by the computing processor from the home buyer computing device, from a second computing device, or both, a request that includes:
a request for one or more: filtered home data, filtered associated loan pricing data, and filtered associated home sale transaction data; and/or
a request for a document;
wherein the second computing device includes at least one of a geographically remote: home seller, real estate agent, real estate broker, lender, and settlement service provider computing device in communication with the computing processor via the computing network using the Internet website; and
compiling and transmitting, by the computing processor, including to the home buyer computing device display and one or more second computing device displays via the computing network, a composite webpage that displays on the Internet website:
one or more: filtered home data, filtered associated loan pricing data, and filtered associated home sale transaction data; and/or
a document including one or more: home sale contract, loan application, loan disclosure, loan note, loan security instrument, settlement statement, and deed; with the plurality of transmitted documents collectively including the filtered home data, the filtered associated loan pricing data, and the filtered associated home sale transaction data.

35. The method of claim 24, wherein the computing processor, the centralized processor for filtering data, include a plurality of connected processors able to communicate data with each other via the network; and/or wherein the Internet website includes one or more Internet websites served by the computing processor; and/or wherein the Internet website is a shared Internet website shared by one or more of: a plurality of home buyers, a plurality of home sellers, a plurality of real estate agents, a plurality of lenders, and a plurality of settlement providers; and/or wherein the computing processor and the database can include one or more of: a centralized computing processor, the centralized computing processor for providing a plurality of filtering processes, and the centralized database; and/or wherein the centralized computing processor is accessible by one or more of: a plurality of home buyers, a plurality of home sellers, a plurality of lenders, and a plurality of settlement providers.

36. A improved computerized method for providing filtered loan pricing data;
the method including the steps of:
receiving, by a shared computing processor for providing filtered loan pricing data, a request for filtered loan pricing data from a remote home buyer computing device using an Internet home search website; the request for filtered loan pricing data including:
an asking price and a location for at least one home offered for sale selected by a home buyer from a plurality of homes offered for sale conforming to a home buyer home search request on the Internet website;
and
home buyer data including at least one of a: down payment, income and debt data;
executing, by the shared computing processor for providing filtered loan pricing data, shared computer code for providing a plurality of loan pricing filtering processes on:
the data in the request for filtered loan pricing data;
and
loan data pertaining to a plurality of loans provided by at least one of a plurality of geographically remote lender computing devices that provide loan data to the shared computing processor for providing filtered loan pricing data;
and
transmitting, by the shared computing processor for providing filtered loan pricing data to the remote home buyer computing device for display simultaneously on a composite webpage:
filtered loan pricing data pertaining to a plurality of loans including a loan amount and a periodic loan payment for the at least one home buyer selected home offered for sale;
and
data pertaining to the at least one home buyer selected home offered for sale;
whereby the improved computerized method for providing filtered loan pricing data provides a home buyer with more accurate filtered loan pricing data more efficiently on a composite webpage.

37. The computerized method of claim 36 wherein: the data in the request for filtered loan pricing data includes at least one of: a real estate tax payment and a homeowner association payment for the at least one home buyer selected home offered for sale; and wherein the periodic loan payment includes a payment for at least one of: a real estate tax, a homeowner insurance premium, and a mortgage insurance premium; and/or wherein the filtered loan pricing data includes at least one of an interest rate, an annual percentage rate, and a lender points; and/or wherein the plurality of loan pricing filtering processes include one or more of: a process to calculate a debt-to-income ratio, a process to calculate a loan-to-value, and a loan underwriting process; and/or the shared computing processor is configured to execute shared computer code to provide a plurality of loan pricing filtering processes on loan data pertaining to a plurality of loans from a geographically remote lender computing device selected from a shared loan product and pricing database; wherein a plurality of geographically remote lender computing devices provides individually customizable loan data to the shared loan product and pricing database.

38. A computing apparatus with an improved shared computing processor configuration in connection with providing filtered loan pricing data to a home buyer; the apparatus comprising:
- a shared computing processor configured to:
  - receive a request for filtered loan pricing data from a remote home buyer computing device; the request for filtered loan pricing data including:
    - an asking price and a location for at least one home offered for sale selected by a home buyer from among a plurality of homes offered for sale on an Internet home search website conforming to a home buyer home search request on the Internet home search website; and
    - home buyer data including at least one of a: down payment data, income data, and debt data;
  - execute shared computer code to provide a plurality of filtering loan pricing processes on: the data in the request for filtered loan pricing data; and
  - loan data pertaining to a plurality of loans provided to the shared computing processor by a geographically remote lender computing device from among a plurality of geographically remote lender computing devices that provide loan data to the shared computing processor; and
  - transmit, to the remote home buyer computing device for display simultaneously on a composite webpage:
    - filtered loan pricing data pertaining to a plurality of loans; the filtered loan pricing data displayed on the composite webpage including: a loan amount and a periodic loan payment for one or more of the plurality of filtered loans; and
    - data pertaining to the at least one home buyer selected home offered for sale conforming to the home search request;
  - whereby the improved shared computing processor configuration provides a home buyer with more accurate filtered loan pricing data on a composite webpage more efficiently.

39. The computing apparatus of claim 38, wherein the data in the request for filtered loan pricing data includes at least one of: a real estate tax payment and a homeowner association payment for the at least one home buyer selected home offered for sale; and wherein the periodic loan payment optionally includes a payment for at least one of: a real estate tax, a homeowner insurance premium, and a mortgage insurance premium; and/or wherein the filtered loan pricing data includes at least one of an interest rate, an annual percentage rate, and a lender points; and/or wherein the plurality of filtering loan pricing processes include one or more of: a process to calculate a debt-to-income ratio, a process to calculate a loan-to-value, and a loan underwriting process; and/or the shared computing processor is configured to execute shared computer code to provide a plurality of filtering loan pricing processes on loan data pertaining to a plurality of loans from a geographically remote lender computing device selected from a shared loan product and pricing database; wherein a plurality of geographically remote lender computing devices provides individually customizable loan data to the shared loan product and pricing database.

* * * * *